INVENTOR
Edwin O. Blodgett
BY Robert S. Dunham
ATTORNEY

Jan. 25, 1955 E. O. BLODGETT 2,700,446

TAPE CONTROLLED TYPEWRITER

Filed Oct. 13, 1950 33 Sheets-Sheet 2

INVENTOR
Edwin O. Blodgett
BY Robert S. Dunham
ATTORNEY

TAPE CONTROLLED TYPEWRITER

Filed Oct. 13, 1950 33 Sheets-Sheet 3

INVENTOR
Edwin O. Blodgett
BY Robert S. Dunham
ATTORNEY

INVENTOR
Edwin O. Blodgett
BY Robert S. Dunham
ATTORNEY

Jan. 25, 1955 E. O. BLODGETT 2,700,446

TAPE CONTROLLED TYPEWRITER

Filed Oct. 13, 1950 33 Sheets-Sheet 5

INVENTOR
Edwin O. Blodgett
BY Robert S. Dunham
ATTORNEY

Jan. 25, 1955 E. O. BLODGETT 2,700,446

TAPE CONTROLLED TYPEWRITER

Filed Oct. 13, 1950 33 Sheets-Sheet 6

INVENTOR
Edwin O. Blodgett
BY Robert S. Dunham
ATTORNEY

INVENTOR
Edwin O. Blodgett
BY Robert S. Dunham
ATTORNEY

INVENTOR
Edwin O. Blodgett
BY Robert S. Dunham
ATTORNEY

Jan. 25, 1955 E. O. BLODGETT 2,700,446

TAPE CONTROLLED TYPEWRITER

Filed Oct. 13, 1950 33 Sheets-Sheet 9

Inventor

Edwin O. Blodgett

By Robert S. Dunham

Attorney

INVENTOR
Edwin O. Blodgett
BY Robert S. Dunham
ATTORNEY

INVENTOR
Edwin O. Blodgett
BY Robert S. Dunham
ATTORNEY

Jan. 25, 1955 E. O. BLODGETT 2,700,446

TAPE CONTROLLED TYPEWRITER

Filed Oct. 13, 1950 33 Sheets-Sheet 12

INVENTOR.
Edwin O. Blodgett
BY Robert S. Dunham
ATTORNEY

INVENTOR.
Edwin O. Blodgett
BY Robert S. Dunham
ATTORNEY

INVENTOR
Edwin O. Blodgett
BY Robert S. Dunham
ATTORNEY

Jan. 25, 1955 E. O. BLODGETT 2,700,446

TAPE CONTROLLED TYPEWRITER

Filed Oct. 13, 1950 33 Sheets-Sheet 15

INVENTOR
Edwin O. Blodgett
BY Robert S. Dunham
ATTORNEY

INVENTOR
Edwin O. Blodgett
BY Robert S. Dunham
ATTORNEY

Jan. 25, 1955 E. O. BLODGETT 2,700,446

TAPE CONTROLLED TYPEWRITER

Filed Oct. 13, 1950 33 Sheets-Sheet 17

INVENTOR
Edwin O. Blodgett
BY Robert S. Dunham
ATTORNEY

Jan. 25, 1955

E. O. BLODGETT 2,700,446

TAPE CONTROLLED TYPEWRITER

Filed Oct. 13, 1950

33 Sheets-Sheet 18

INVENTOR
Edwin O. Blodgett
BY Robert S. Dunham
ATTORNEY

INVENTOR
Edwin O. Blodgett
BY Robert S. Dunham
ATTORNEY

Jan. 25, 1955 E. O. BLODGETT 2,700,446

TAPE CONTROLLED TYPEWRITER

Filed Oct. 13, 1950 33 Sheets-Sheet 20

INVENTOR
Edwin O. Blodgett
BY Robert S. Dunham
ATTORNEY

Jan. 25, 1955 E. O. BLODGETT 2,700,446

TAPE CONTROLLED TYPEWRITER

Filed Oct. 13, 1950 33 Sheets-Sheet 21

INVENTOR
Edwin O. Blodgett
BY Robert S. Dunham
ATTORNEY

Jan. 25, 1955 E. O. BLODGETT 2,700,446

TAPE CONTROLLED TYPEWRITER

Filed Oct. 13, 1950 33 Sheets-Sheet 22

INVENTOR.
Edwin O. Blodgett
BY Robert S. Dunham
ATTORNEY

INVENTOR
Edwin O. Blodgett
BY Robert S. Dunham
ATTORNEY

INVENTOR
Edwin O. Blodgett
BY Robert S. Dunham
ATTORNEY

INVENTOR
Edwin O. Blodgett
BY Robert S. Dunham
ATTORNEY

Jan. 25, 1955 E. O. BLODGETT 2,700,446

TAPE CONTROLLED TYPEWRITER

Filed Oct. 13, 1950

33 Sheets-Sheet 26

INVENTOR
Edwin O. Blodgett
BY Robert S. Dunham
ATTORNEY

INVENTOR
Edwin O. Blodgett
BY Robert S. Dunham
ATTORNEY

INVENTOR
Edwin O. Blodgett
BY Robert S. Dunham
ATTORNEY

INVENTOR.
Edwin O. Blodgett
BY Robert S. Dunham
ATTORNEY

Jan. 25, 1955 E. O. BLODGETT 2,700,446

TAPE CONTROLLED TYPEWRITER

Filed Oct. 13, 1950

33 Sheets-Sheet 30

INVENTOR.
Edwin O. Blodgett
BY

ATTORNEY

INVENTOR
Edwin O. Blodgett
BY Robert S. Dunham
ATTORNEY

INVENTOR
Edwin O. Blodgett
BY Robert S. Dunham
ATTORNEY

Jan. 25, 1955

E. O. BLODGETT 2,700,446

TAPE CONTROLLED TYPEWRITER

Filed Oct. 13, 1950

33 Sheets-Sheet 33

INVENTOR.
Edwin O. Blodgett
BY Robert S. Dunlam
ATTORNEY

United States Patent Office 2,700,446

Patented Jan. 25, 1955

2,700,446

TAPE CONTROLLED TYPEWRITER

Edwin O. Blodgett, Rochester, N. Y., assignor to Commercial Controls Corporation, Rochester, N. Y., a corporation of Delaware Application October 13, 1950, Serial No. 189,980

14 Claims. (Cl. 197—20)

This invention relates to a tape controlled writing machine. More particularly, it relates to a machine in which a control tape may be coded by perforating and in which such control tape may then be used for the automatic control of the writing machine in reproducing copy.

It is an object of this invention to provide a machine of the character indicated wherein the several operative units are substantially self-contained so that they may be assembled in a common base for producing a machine which may serve as a recorder-reproducer, a recorder alone, or a reproducer alone. The invention thereby affords a high degree of flexibility in the manner in which such machines may be constituted and in the end functions obtained therefrom.

It is a specific object of the invention to provide an improved case shift mechanism having a key lever controlled cam for operating the type basket in one direction and a different key lever controlled cam for operating the basket in the other direction, the cams being operative to break a toggle which provides the desired accelerated motion and also serves to lock the basket in each position of operation.

It is a further specific object of the invention to provide an improved carriage return mechanism wherein a key lever controlled cam operates a carriage return clutch which is held engaged until the carriage, upon reaching its fully returned position, trips a second cam which furnishes the power for disengaging the clutch, whereby the clutch is allowed to slip momentarily at the end of the carriage return while the second cam is operated, thereby dissipating the rebound force.

It is a further specific object of the invention to provide power controlled ribbon shift mechanism operable upon depression of a key lever to shift the ribbon between two printing fields.

It is a further specific object of the invention to provide an integrated writing machine structure wherein a punch mechanism, a tape reader and code translating mechanism are all driven from a single power shaft to provide increased flexibility and ease of operation.

It is a further specific object of the invention to provide tape reader controlled circuits where codes having one characteristic are effective to automatically stop operation of the reader until started by a function of the writing machine, and codes having another characteristic which are effective to automatically stop operation of the writing machine until started manually.

It is a further object of the invention to provide in a writing machine having a keyboard and a paper carriage, an escapement mechanism adapted to variably release the carriage in letter spacing in proportion to the width of the letter impressions and under the control of a plurality of electromagnetic devices for variably controlling the escapement of the carriage. To this end a selector mechanism is provided under the control of the keys of the keyboard, and there are means under control of the selector mechanism for energizing the electromagnetic escapement devices either singly or in combination.

It is a further object of the invention to provide a carriage rebound control mechanism which includes a tabulating stop for arresting movement of the carriage together with a latch device operative upon contact with the tabulation stop for engaging the stop to latch the carriage against rebound thereof.

It is a further object of the invention to provide an improved type action for power operated typewriters which includes a toggle linkage having means for adjusting the effective length thereof.

To the end that the general objectives of the invention may be attained, the machine herein comprises a power operated writing machine having code selecting means operative upon depression of a key lever to select a code representative of the character controlled by such lever, together with a tape punch controlled by the key controlled selector for producing in a tape combinational code perforations. The machine also includes means for sensing a tape perforated as stated and for translating such perforations to the end that the power operated type action may be under the control of the perforated tape for transcribing in printed form. Withal it is the purpose of the invention to provide a writing machine which may be used as a conventional typewriter without in any way disturbing the code producing or code controlled mechanism provided therein.

It is an important object of the invention to provide a perforated tape controlled writing machine which is capable of duplicating all or any part of the control tape while the machine is operating under the influence of such control tape.

Specific objects, features and advantages of the invention will become clear as the description of the machine is read in light of the drawings in which.

Figure 19:
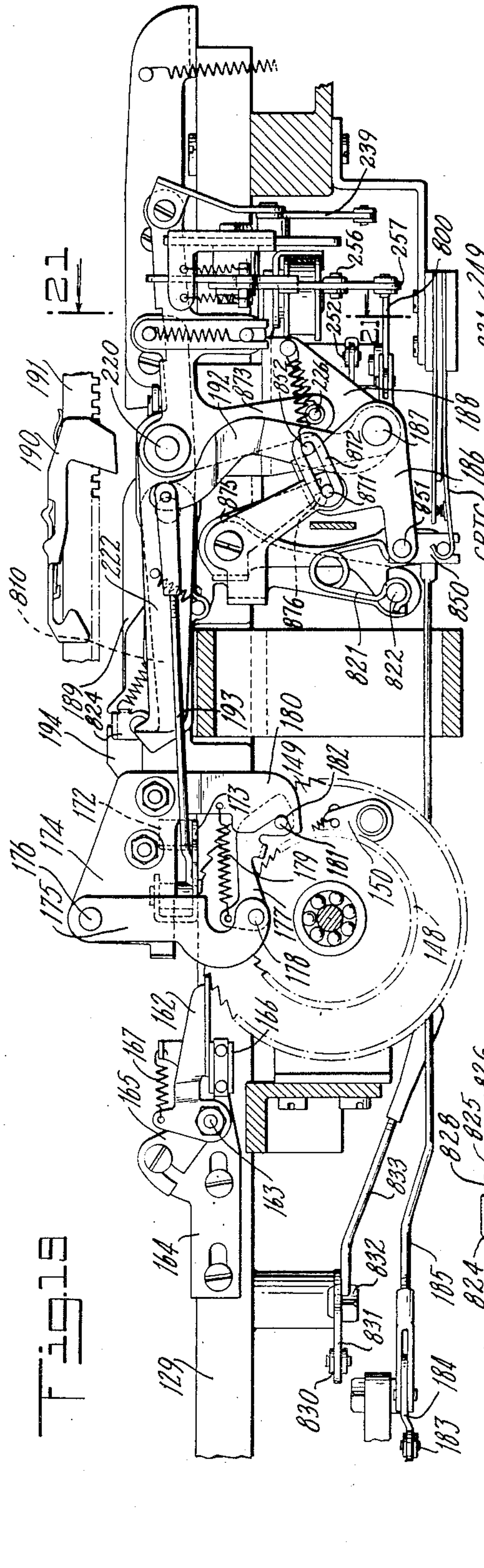
Fig. 19 is a rear elevation of the tabulating and carriage release mechanism.
Figure 21:
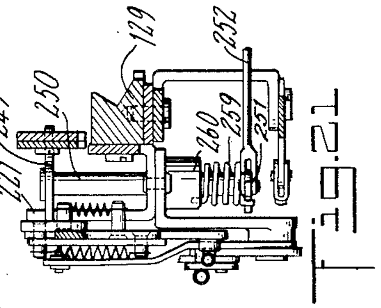
Figure 20:
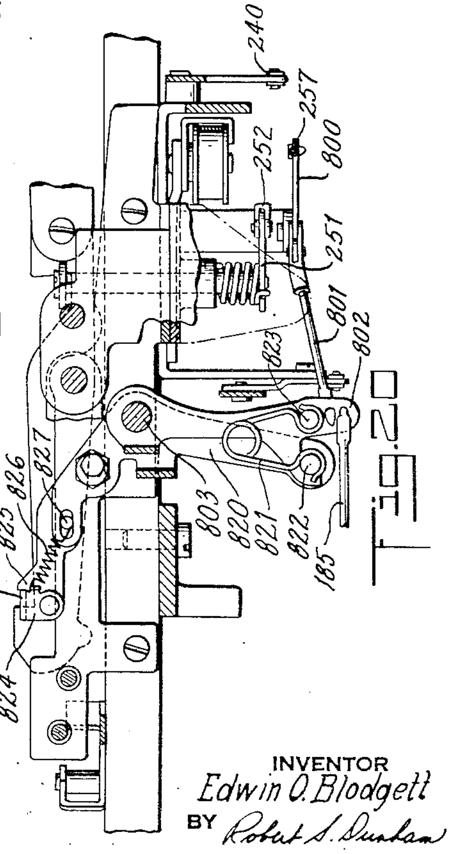
Figure 19A:
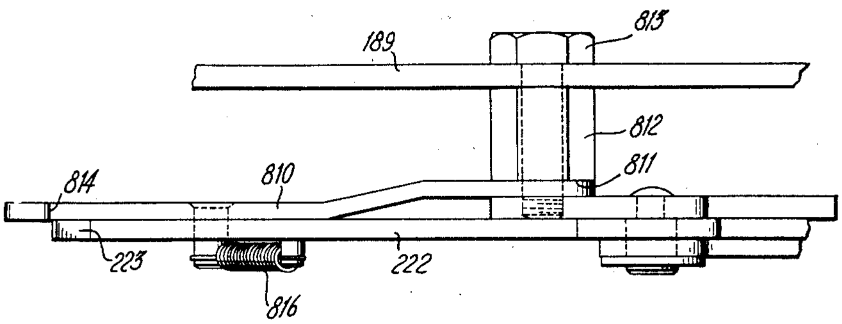
Figure 19B:
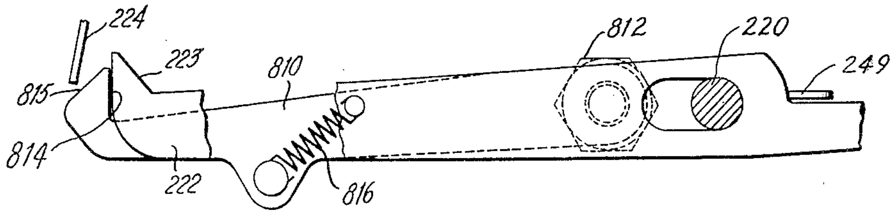
Figure 20A:
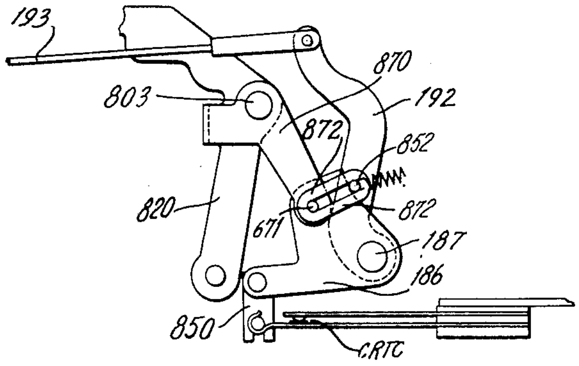
Figure 20B:
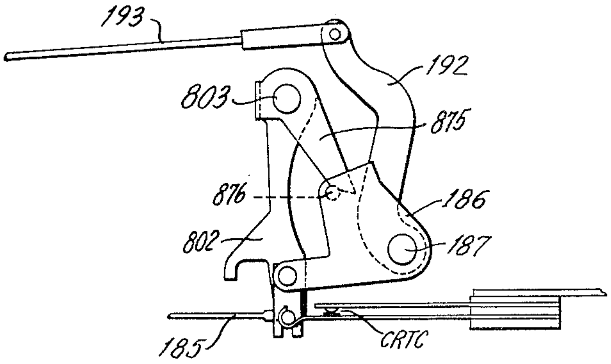
Figure 22:
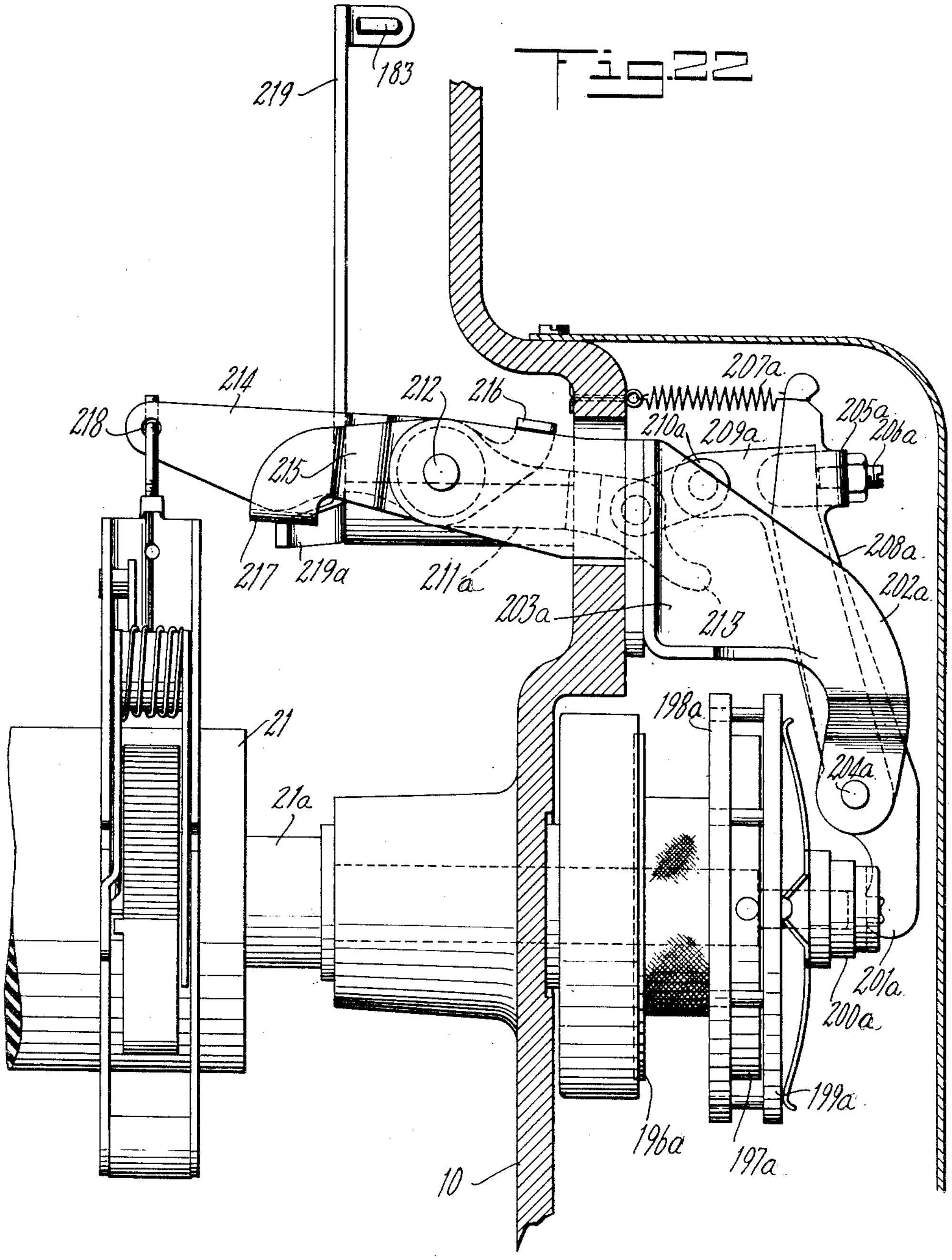
Figure 23:
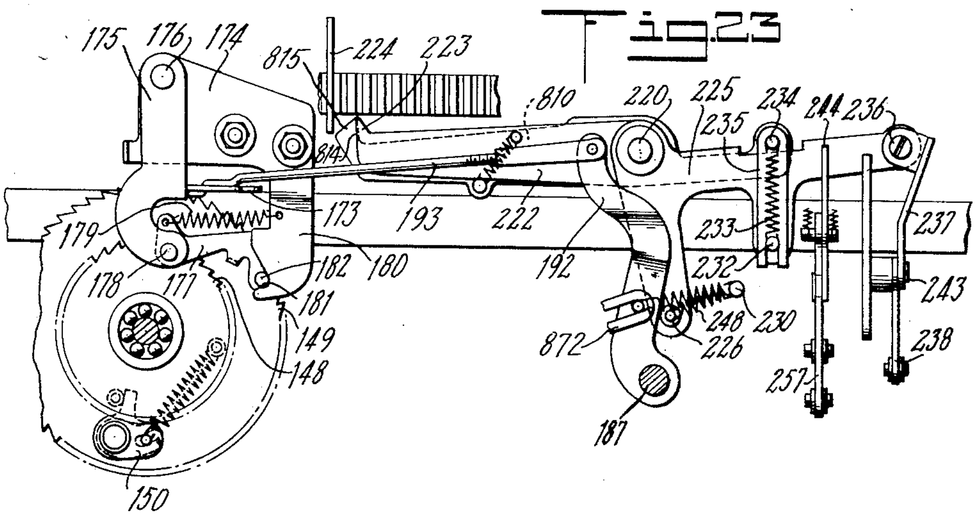
Figure 24:
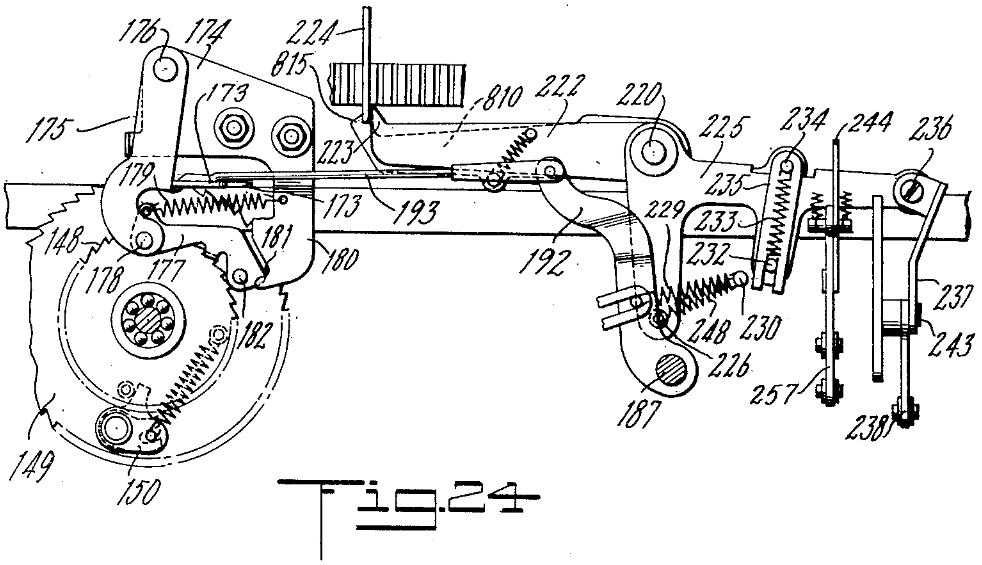
Figures 25, 26:
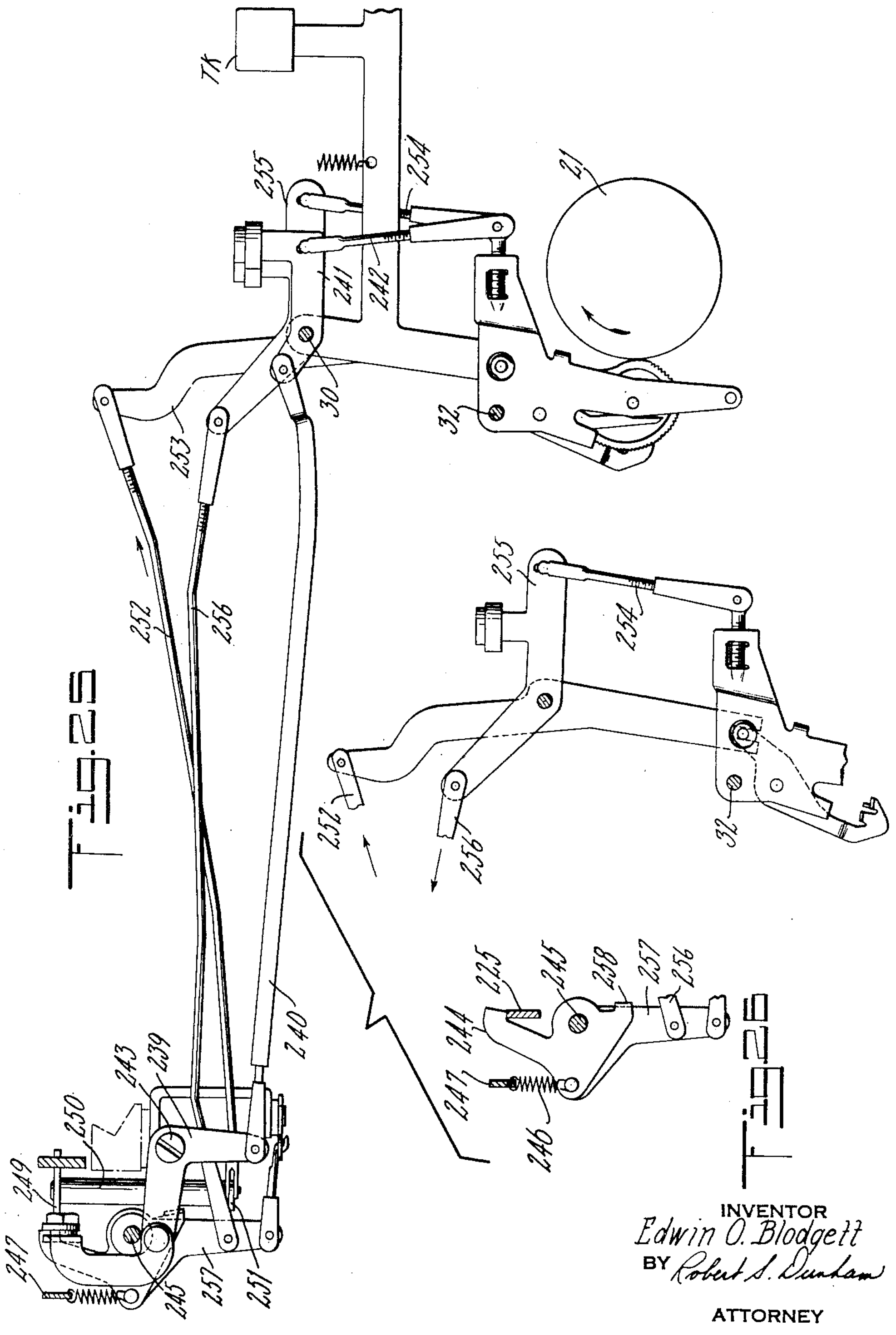
Figure 27:
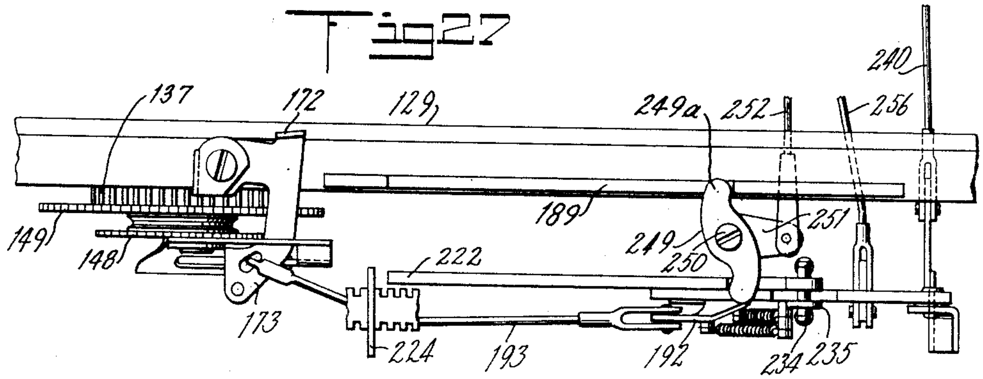
Figure 28:
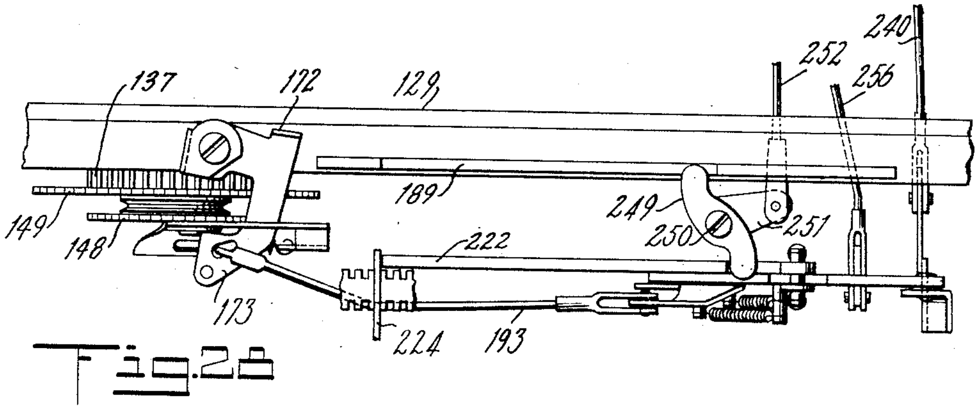
Figure 29:
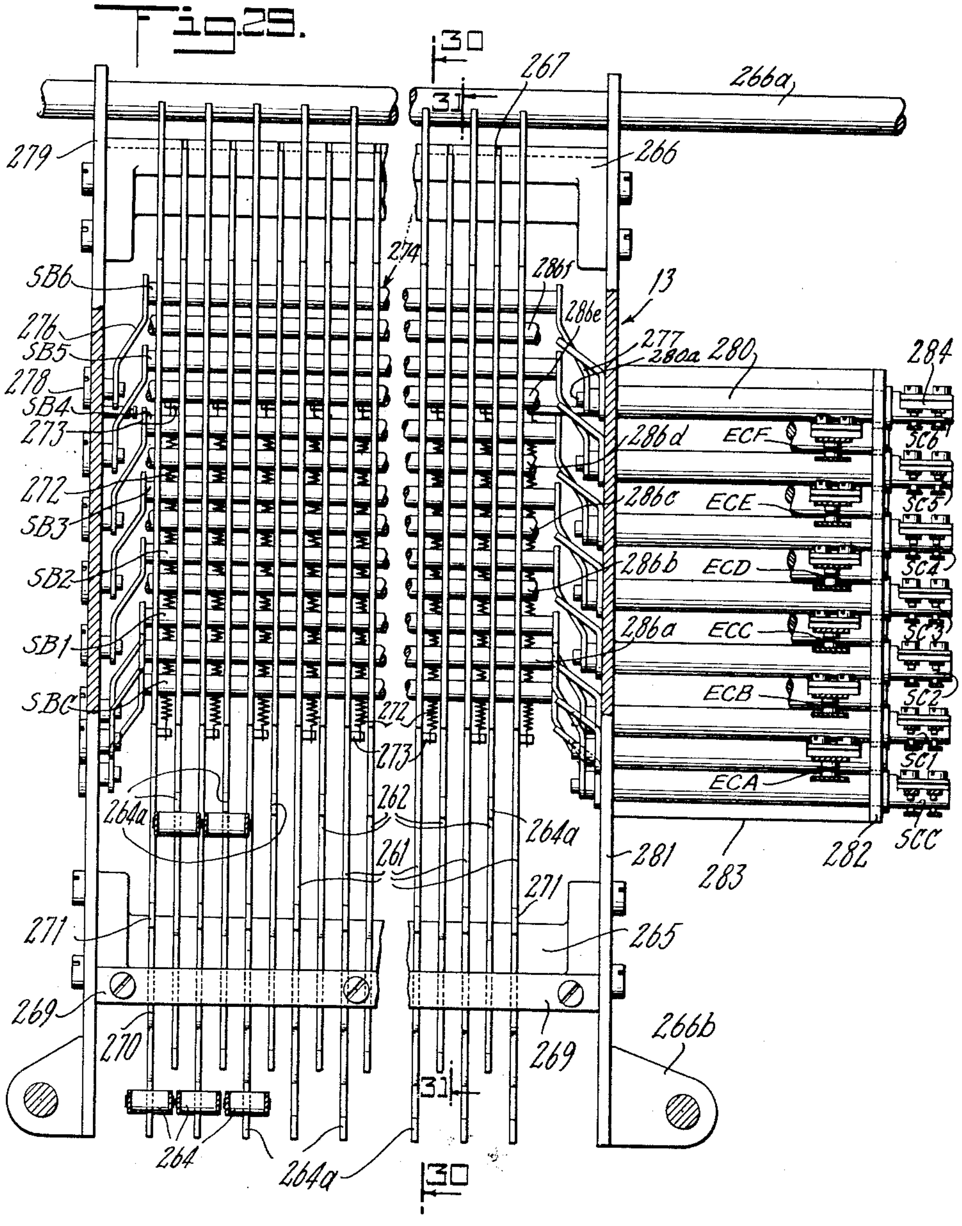
Figure 30:
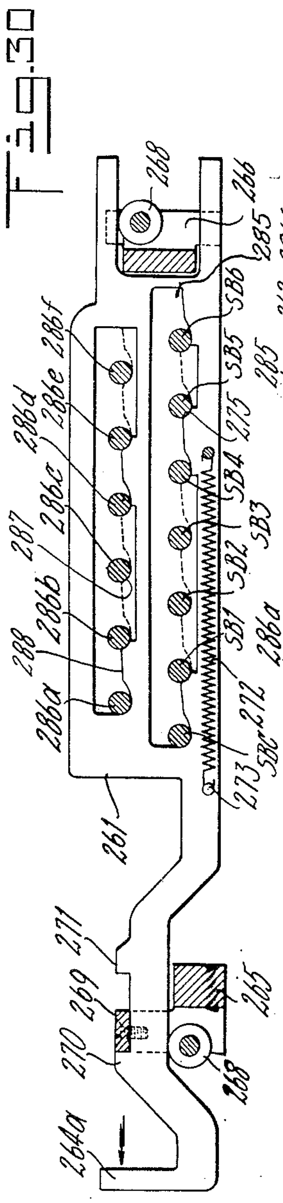
Figure 31:
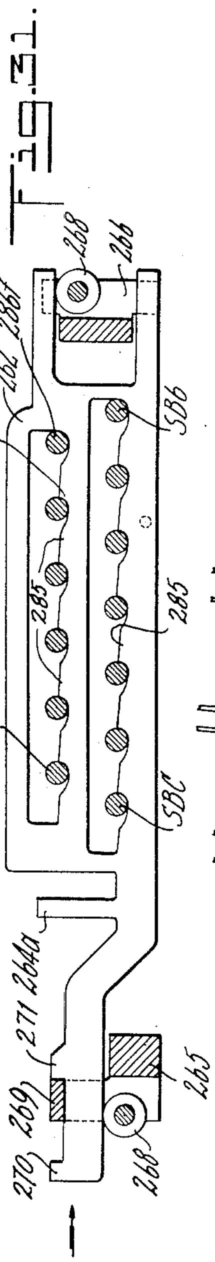
Figure 32:
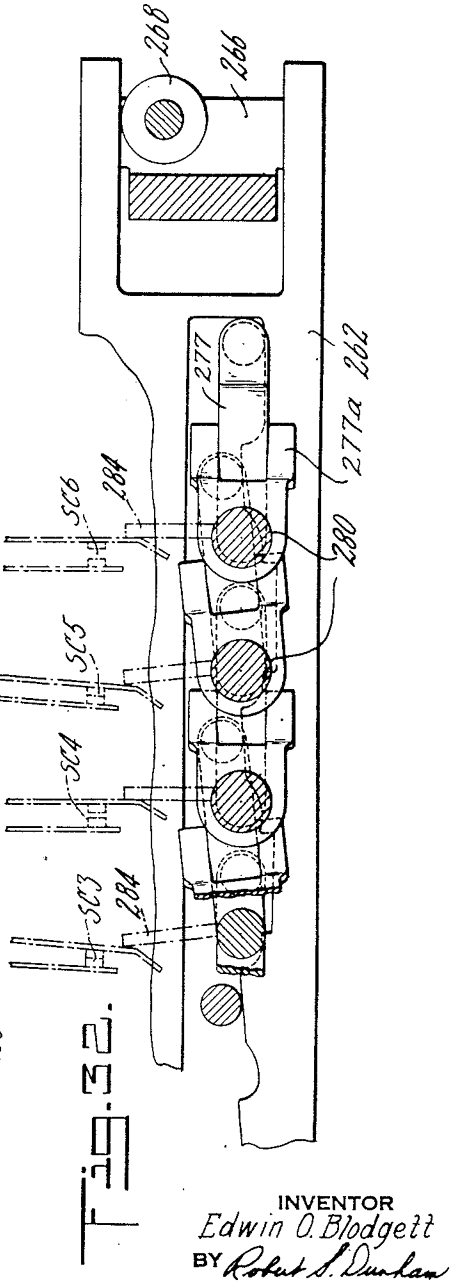
Figure 33:
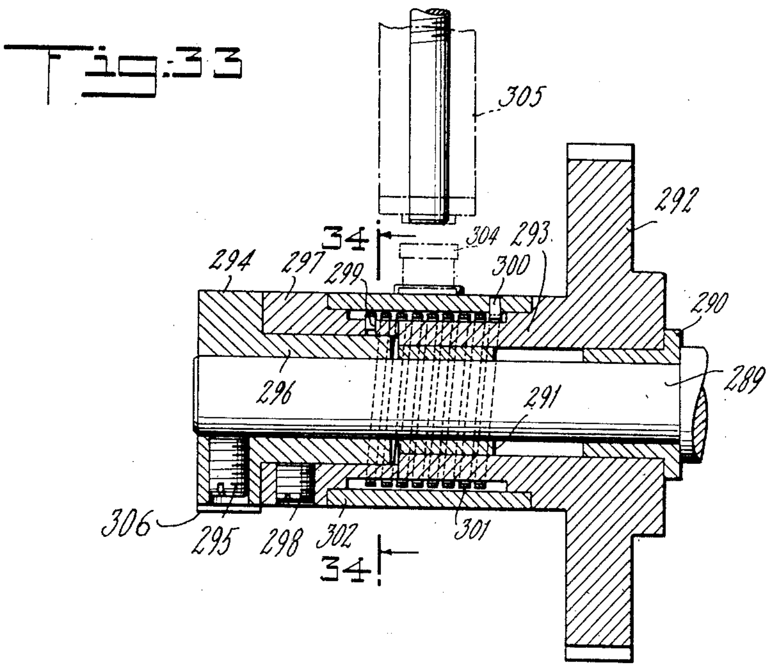
Figure 34:
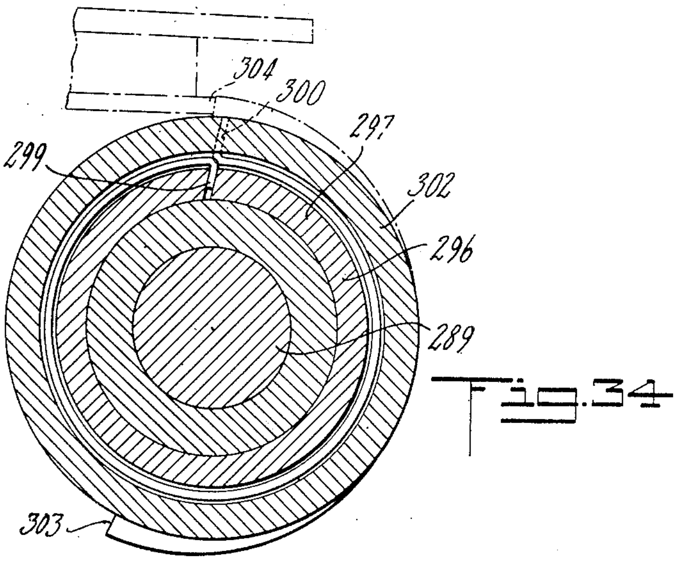
Figure 35:
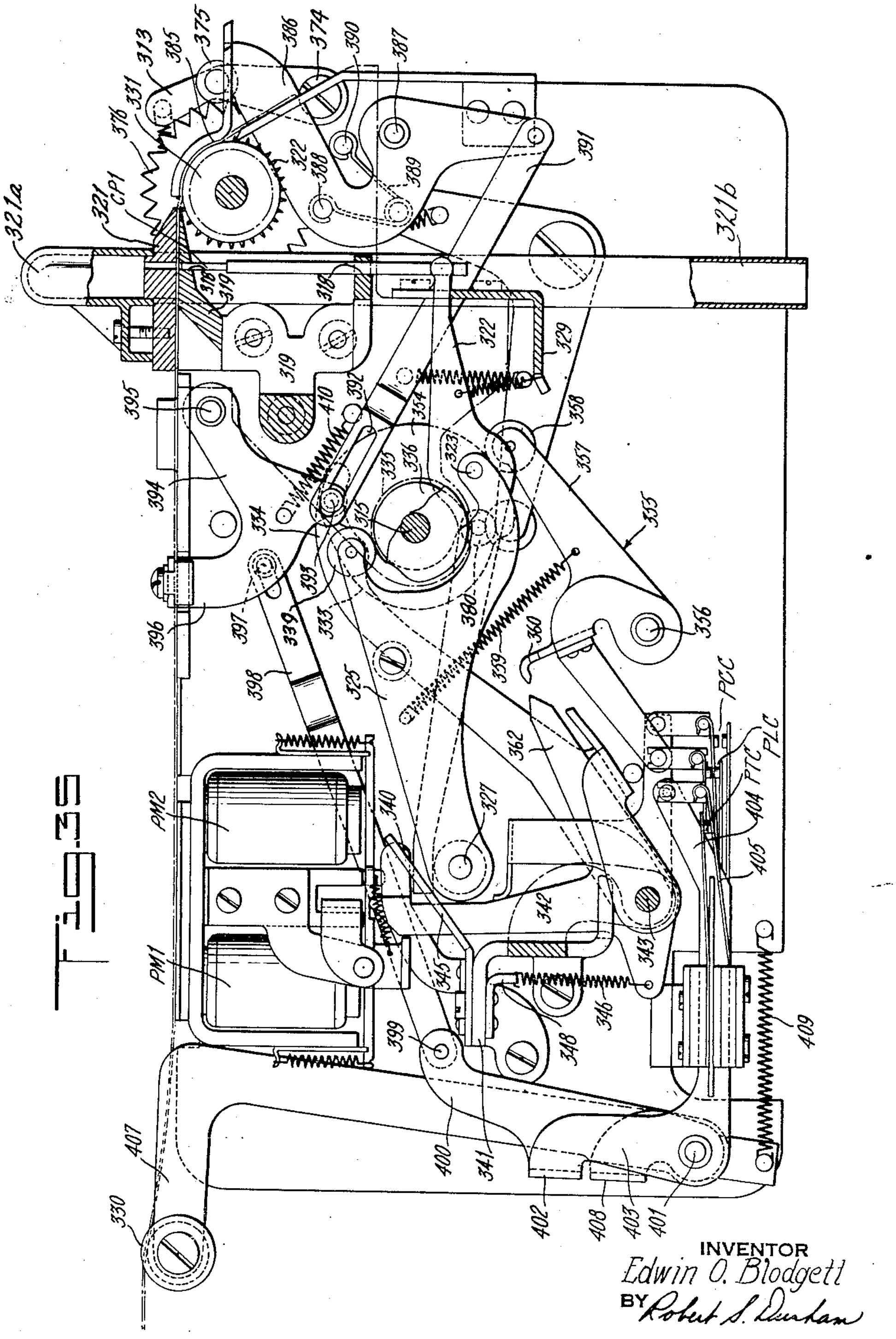
Figure 36:
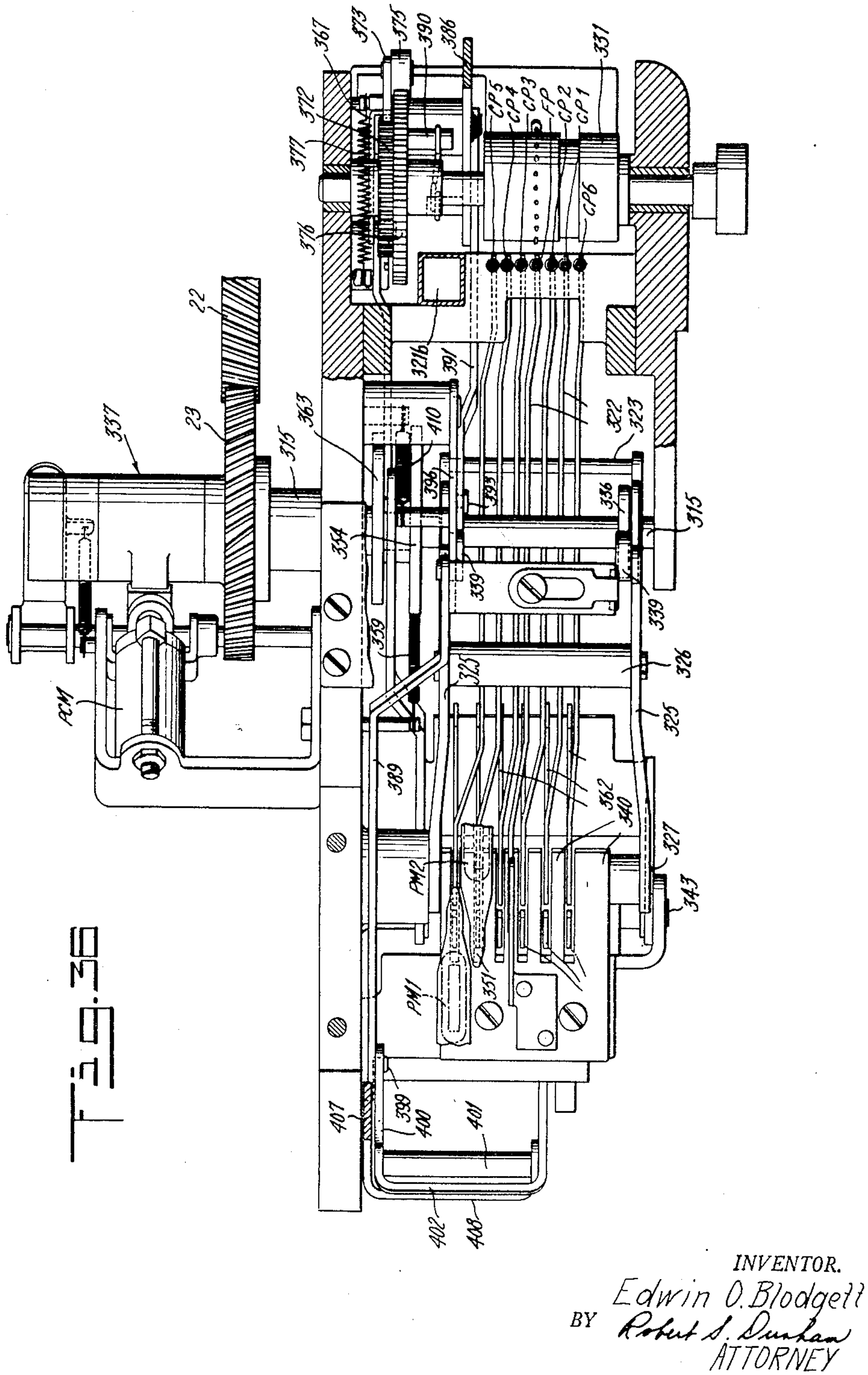
Figure 37:
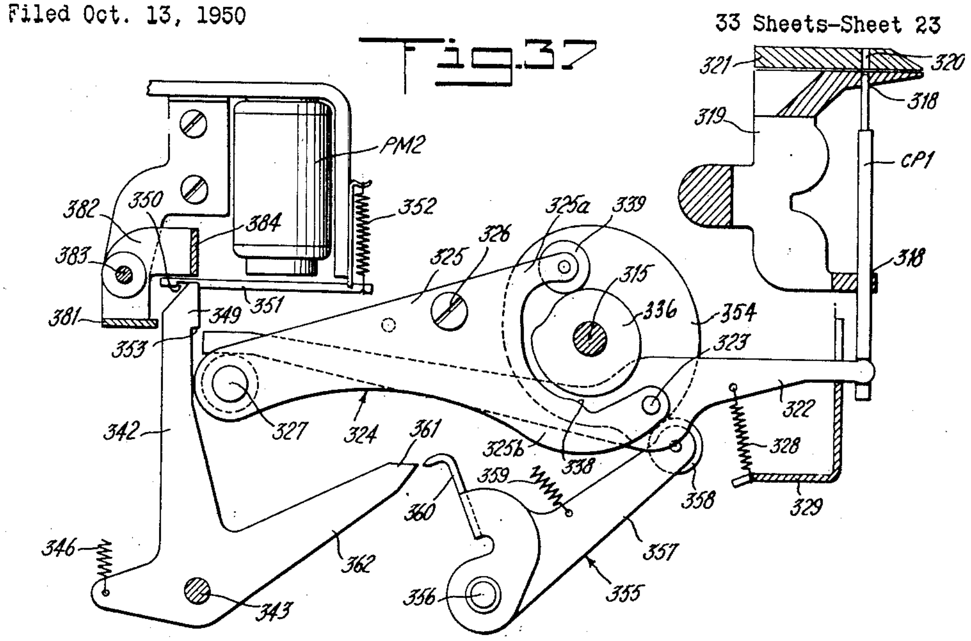
Figures 38, 39:
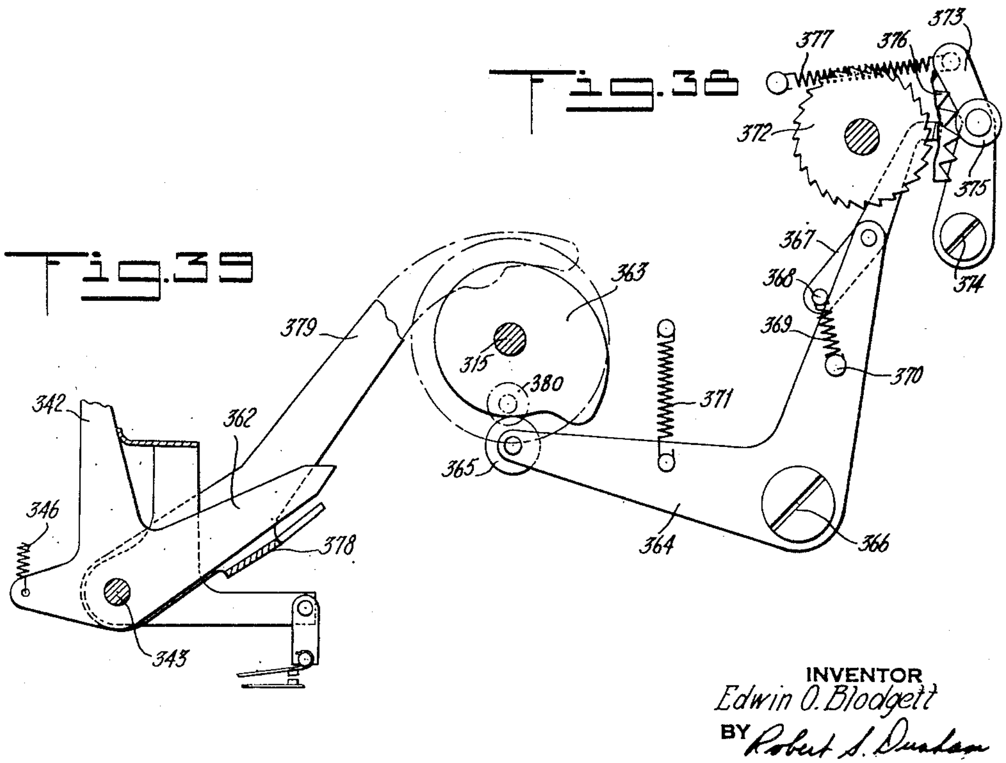
Figure 40:
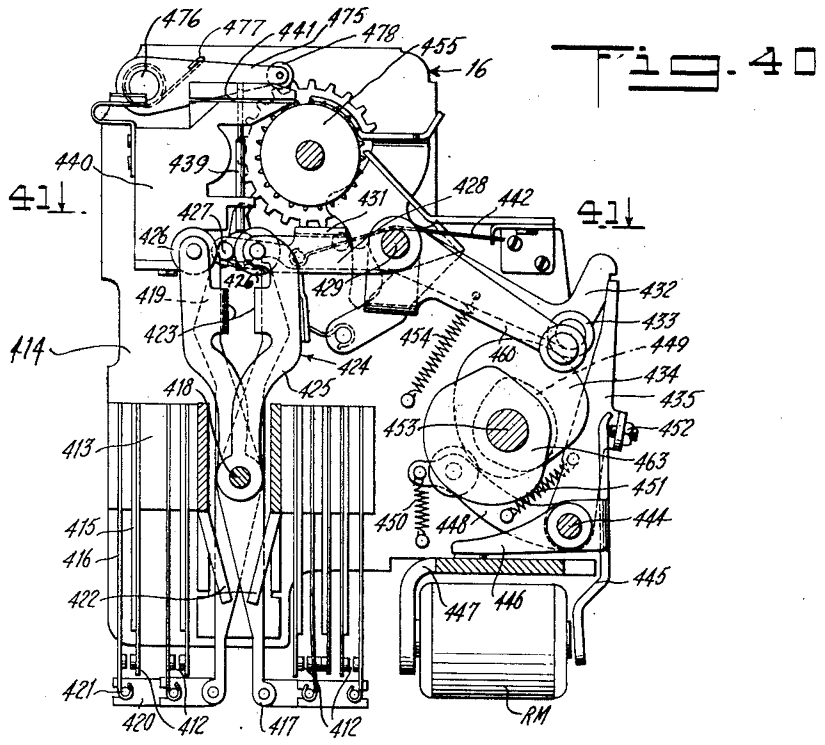
Figure 41:
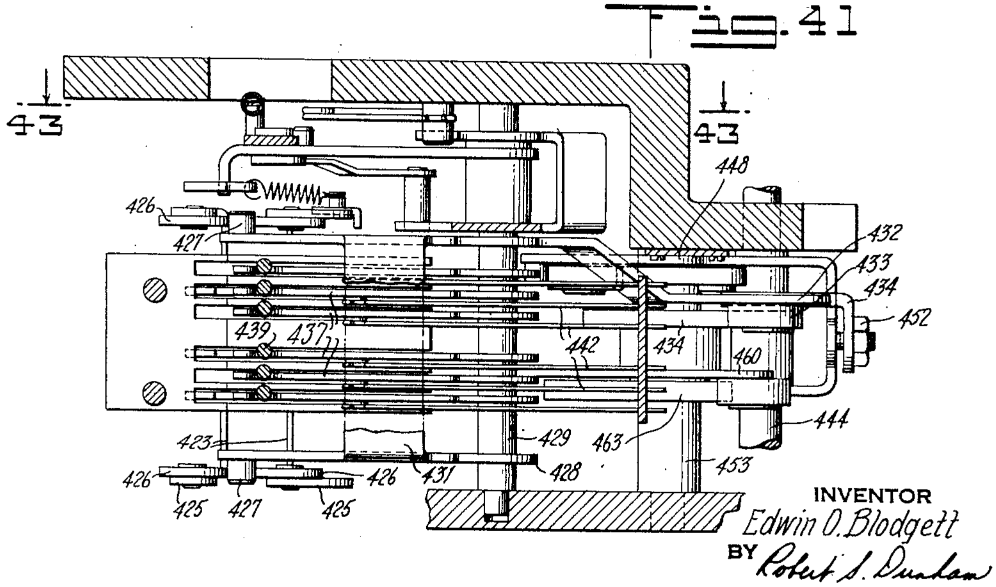
Figure 42:
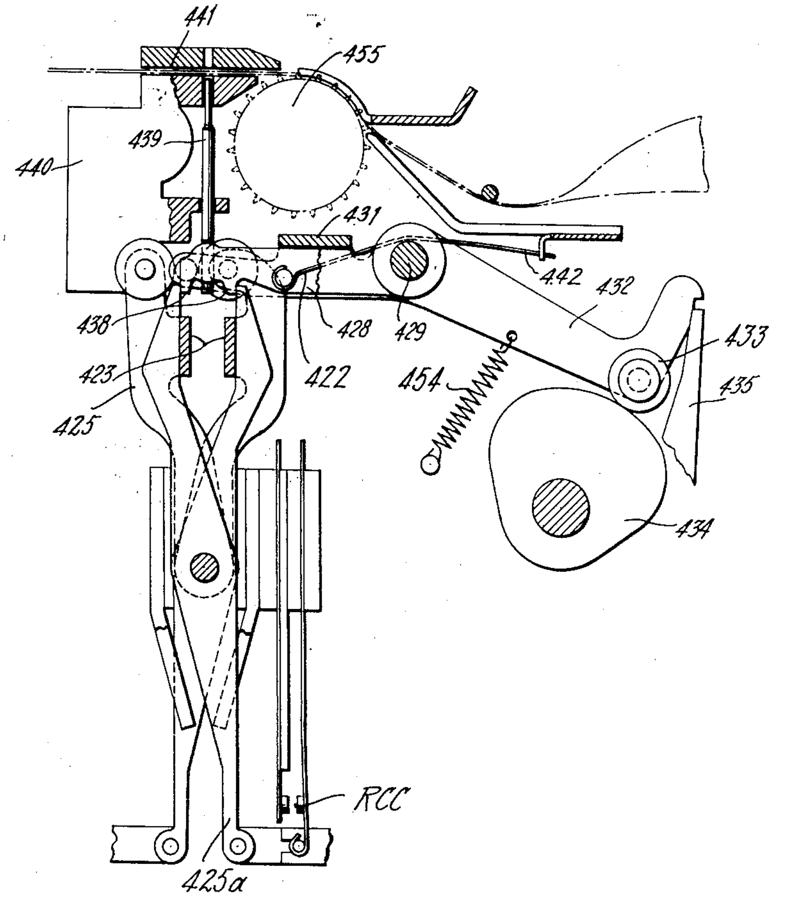
Figure 43:
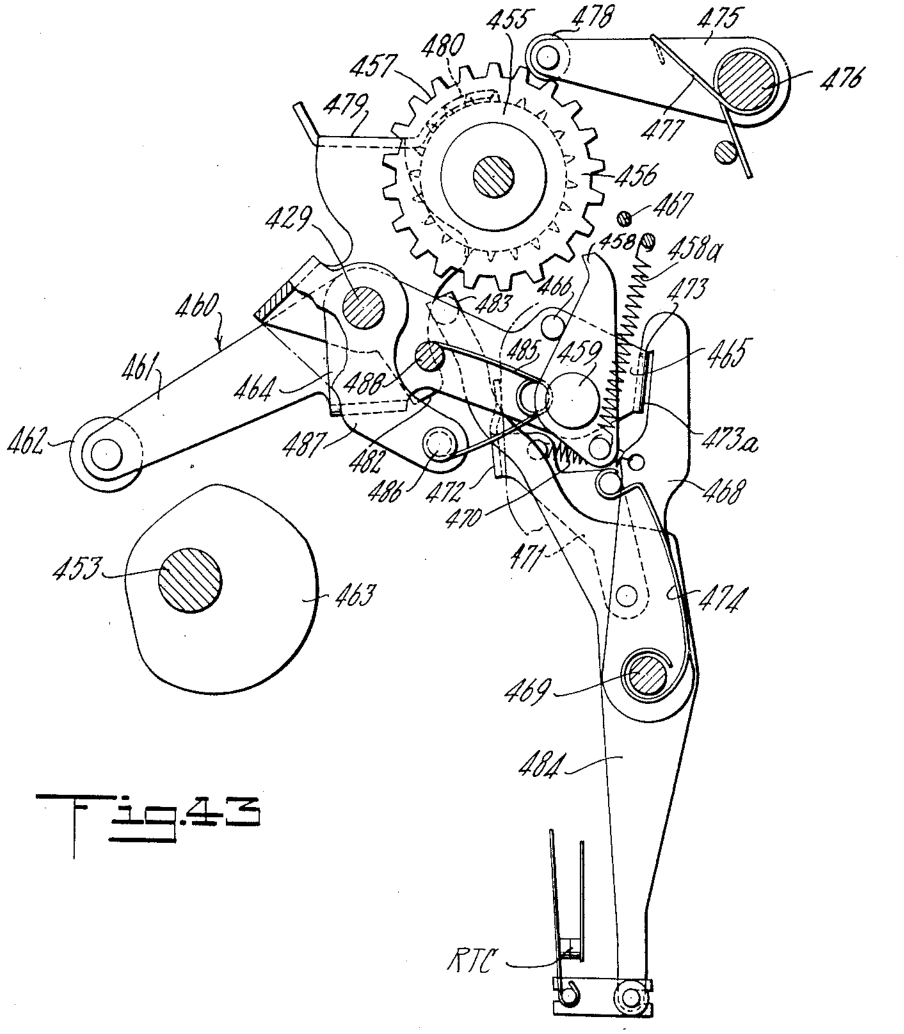
Figure 44:
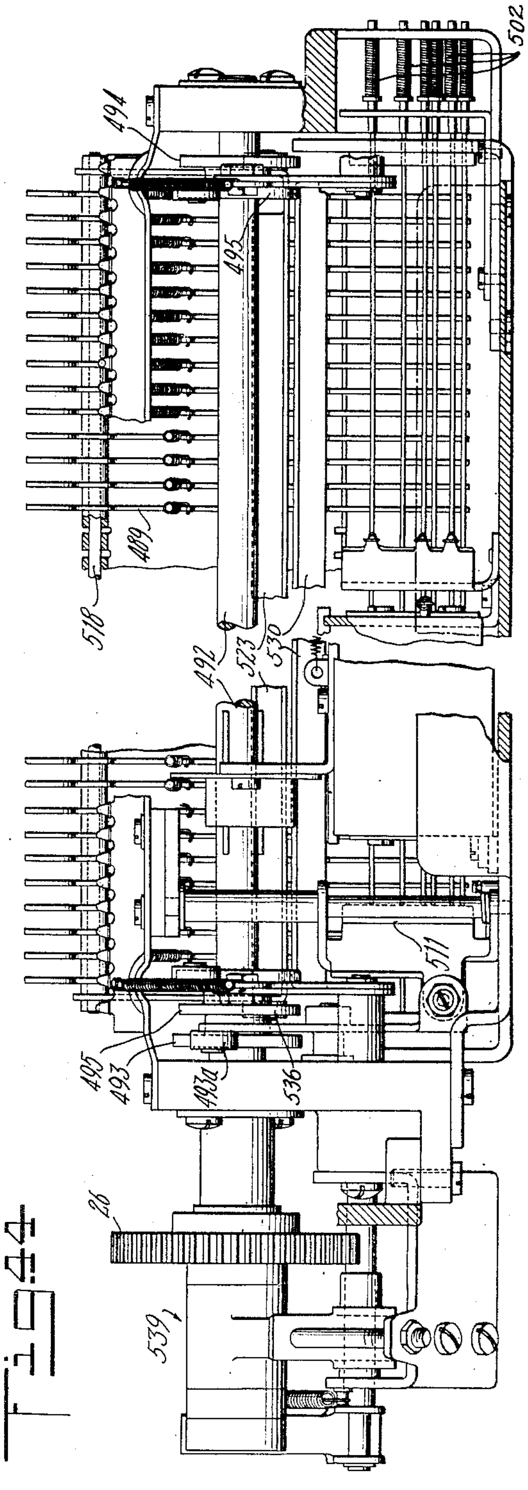
Figure 45:
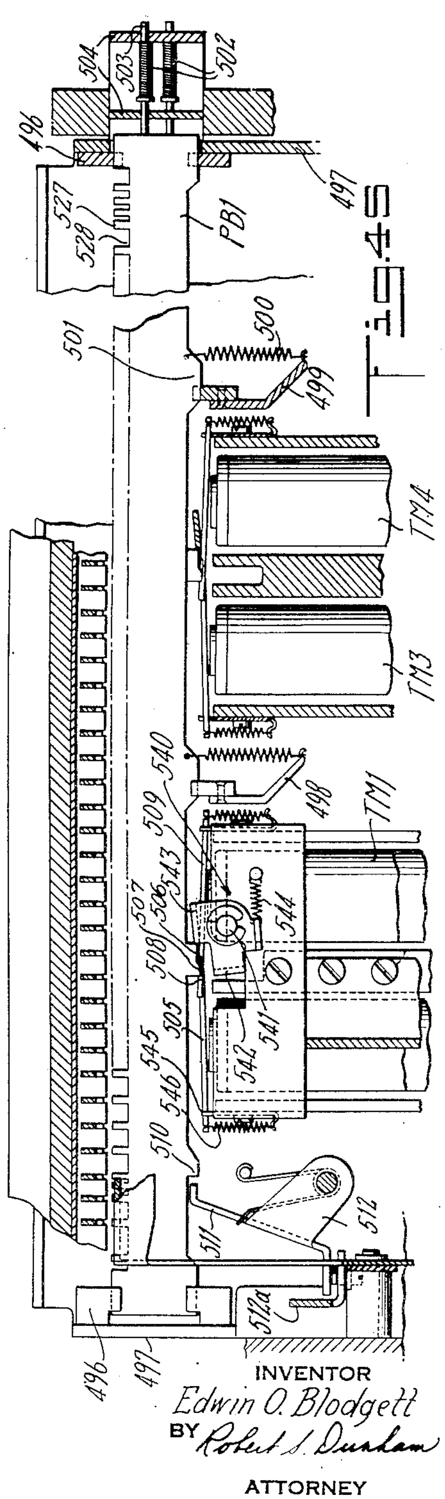
Figure 46:
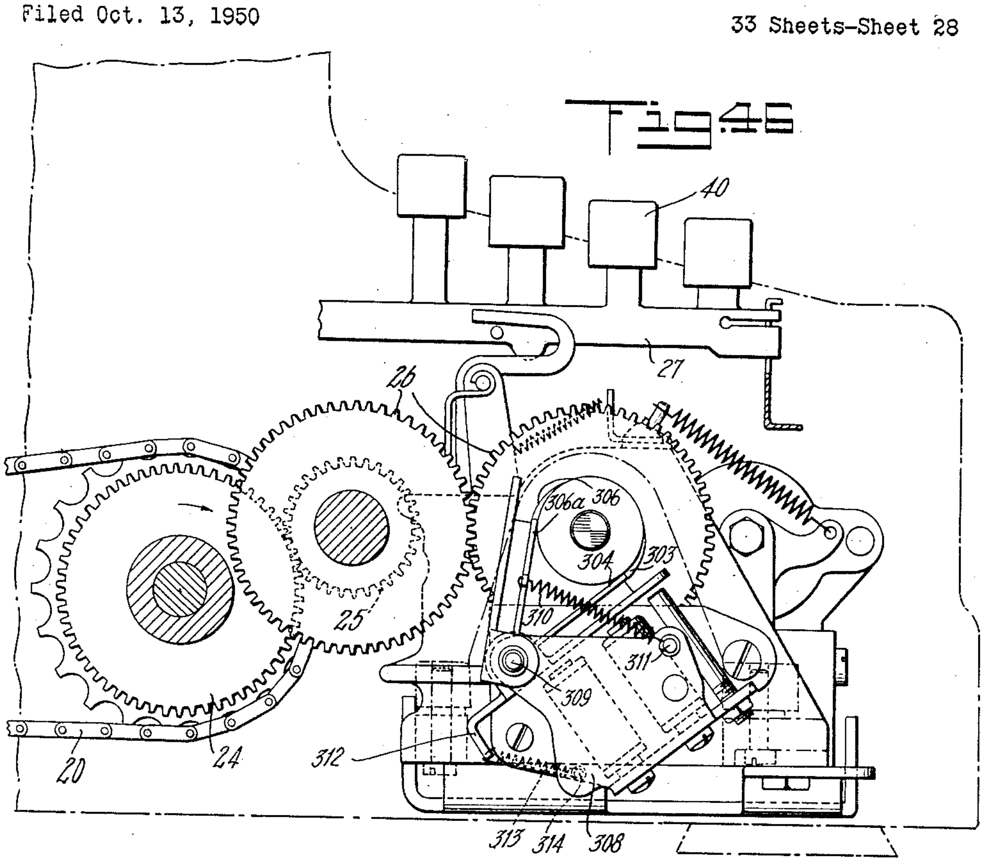
Figure 47:
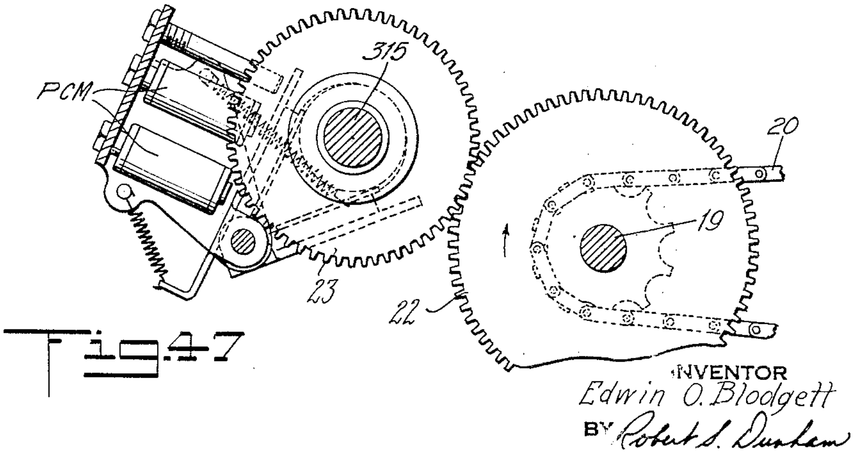
Figure 48:
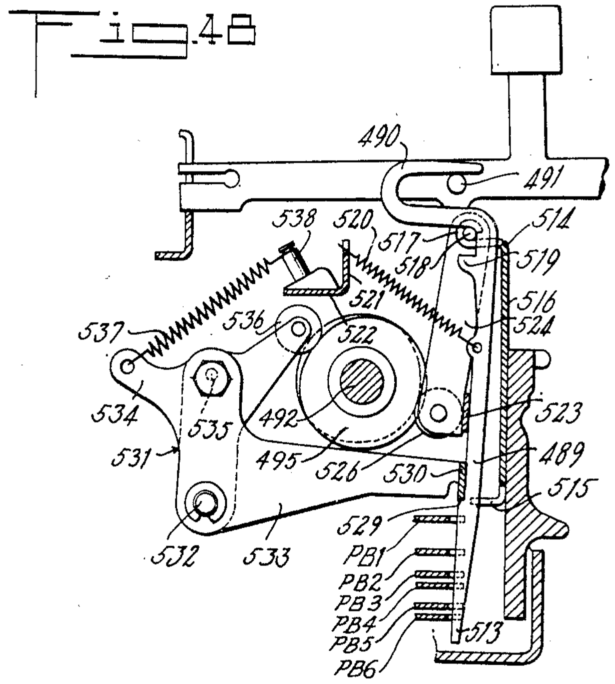
Figure 49:
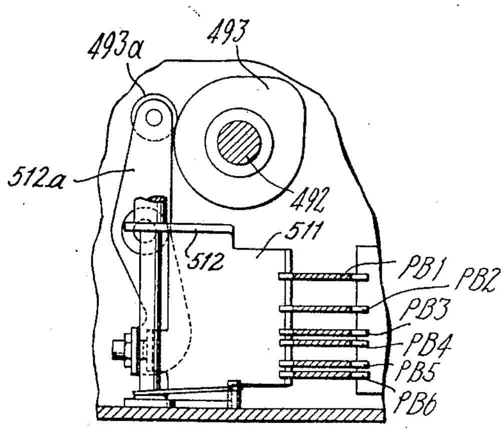
Figure 50:
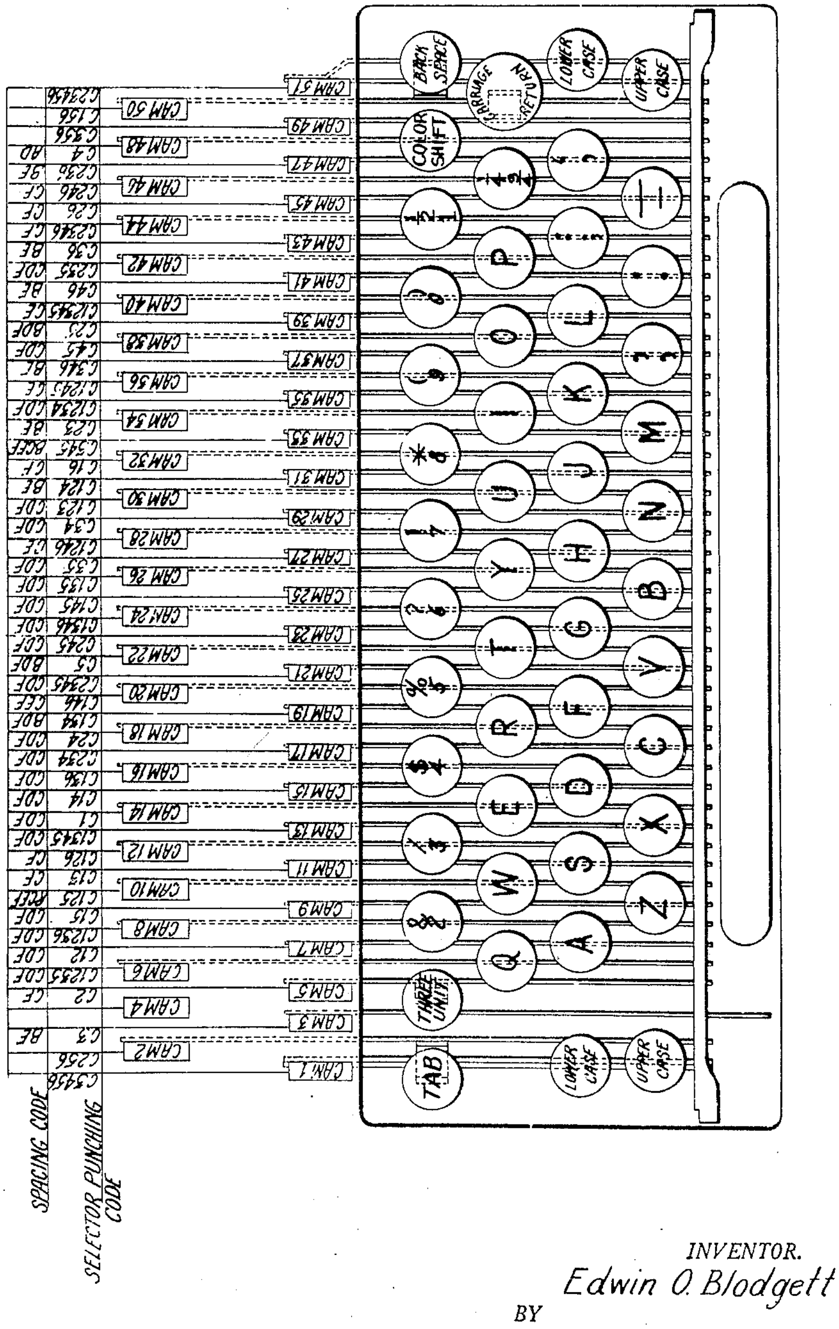
Figure 51:
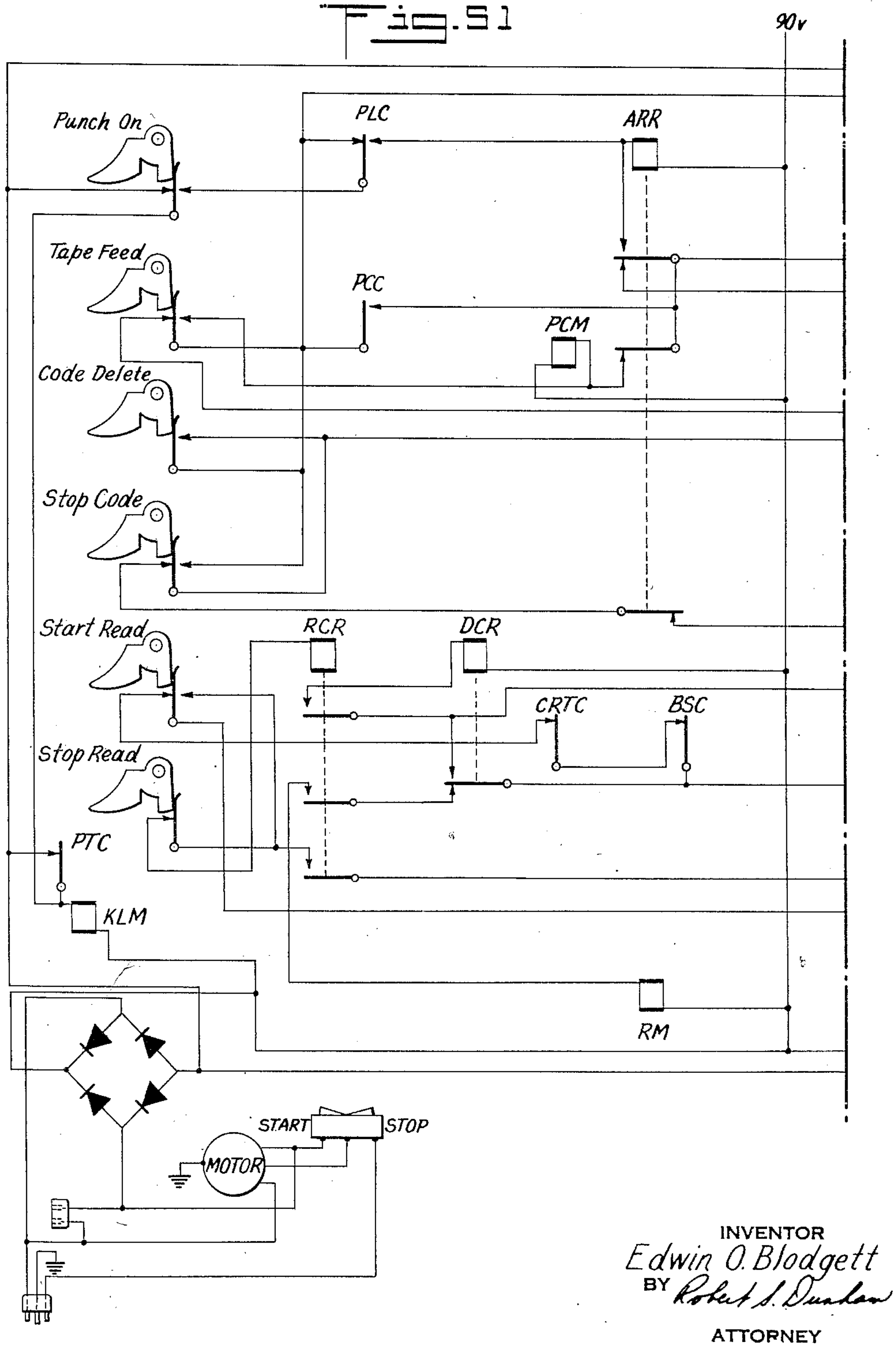

Fig. 19*a* is a fragmentary plan view made in section of Fig. 19 showing carriage rebound latch;

Fig. 19*b* is a fragmentary elevational view of the rebound latch shown in Fig. 19*a*;

Fig. 20 is a rear elevation of a part of the carriage release and tabulating mechanism, certain parts having been removed to show underlying structure;

Fig. 20*a* is a fragmentary detail in elevation of carriage return linkage of Fig. 19 arranged to operate a carriage return contact;

Fig. 20*b* is a fragmentary view in elevation of linkage shown in Fig. 19 for operating a carriage control contact during line spacing operations;

Fig. 21 is a sectional view on line 21—21 of Fig. 19;

Fig. 22 illustrates the carriage return control clutch and its associated operating mechanism, the view being along the clutch axis;

Fig. 23 is a rear plan view of the tabulating mechanism showing the parts in one position of operation;

Fig. 24 is a rear plan view of the tabulating mechanism shown in Fig. 23, but showing the parts thereof in a different position of operation;

Fig. 25 is a vertical section transversely of the platen carriage of the writing machine, including tabulating key linkage and power mechanism;

Fig. 26 shows a tabulating release lever latch and its associated operating linkage;

Fig. 27 is a plan view of the tabulating mechanism shown in Fig. 23;

Fig. 28 is a plan view of the tabulating mechanism shown in Fig. 24;

Fig. 29 is a top plan view of a code selector mechanism and associated code selector contacts;

Fig. 30 is a longitudinal sectional view through the code selector mechanism on line 30—30 of Fig. 29 showing one of the selector slides;

Fig. 31 is a view similar to that of Fig. 30 showing, however, a section on line 31—31;

Fig. 32 is an enlarged fragmentary sectional view through selector mechanism indicating its relationship to code selecting contacts;

Fig. 33 is an axial sectional view through an electromagnetic clutch used in connection with the tape punch and the translating unit forming a part of the invention;

Fig. 34 is a transverse vertical section on line 34—34 of Fig. 33;

Fig. 35 is a longitudinal view in elevation through the tape punch forming part of the invention, some portions being shown in section;

Fig. 36 is a top plan view of the tape punch shown in Fig. 35;

Fig. 37 is a detail view of the punch control mechanism;

Fig. 38 is a detail view of the tape feeding mechanism constituting part of the punch unit;

Fig. 39 is a detail view of certain of the punch mechanism;

Fig. 40 is an elevational view of the tape reading mechanism;

Fig. 41 is a sectional view on line 41—41 of Fig. 40;

Fig. 42 is a detail view of the control mechanism for the tape reading pins and associated mechanism;

Fig. 43 is a detail view of the mechanism for feeding tape through the tape reader;

Fig. 44 is a front elevational view along the axis of the code translator forming a part of this invention;

Fig. 45 is a top plan view of the mechanism shown in Fig. 44, portions being shown in section;

Fig. 46 is an end elevational view of the code translating unit;

Fig. 47 is a detail view of the translator drive and its magnetic clutch control;

Fig. 48 is a transverse sectional view through the code translator;

Fig. 49 is a detail view showing code bar restoring mechanism;

Fig. 50 is a keyboard layout diagram;

Figs. 51 and *51a* together constitute the electrical control circuits; and

Figure 52:
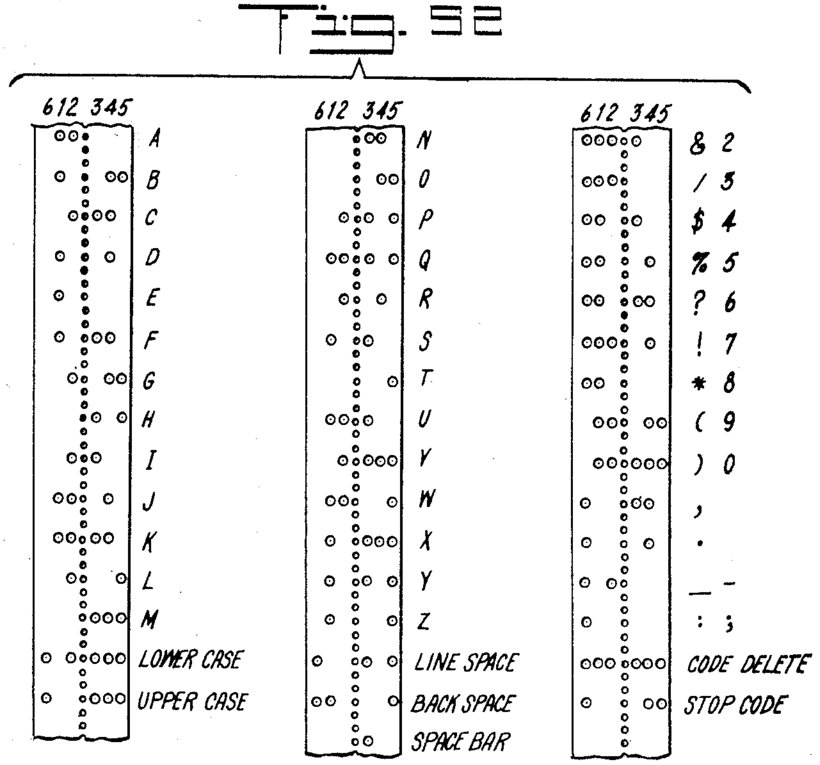
Figure 52A:
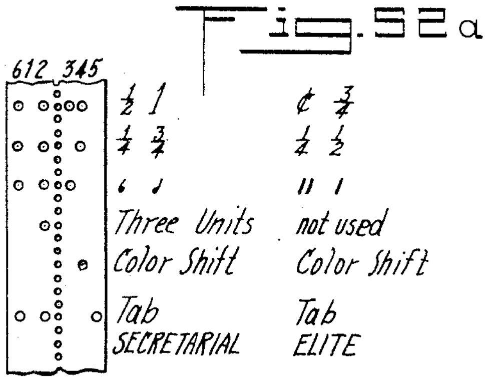

Figs. 52 and *52a* illustrate a control tape having code perforations punched therein.

In order to render the detailed description of the mechanism herein easier of understanding it is perhaps appropriate to first describe in a rather general way the structure and function of the machine.

*General*

The machine is assembled around a four-sided base 10 which supports a power frame assembly 12, a code selector 13, a tape punch 15, a tape reader 16 and a code translator 14. An electric motor 17 is adapted to drive a power shaft 19 from which power is transmitted through gears 22 and 23 to the tape punch 15. A chain 20 transmits power to a power roller 21 from which the type action is operated. A gear 24 on the end of the power roll shaft transmits rotary motion through a gear 25 from which the tape reader 16 is driven. Gears 26 supply power to the code translating unit 14.

A die-cast power frame 39 is mounted within the base casting. Assembled on the power frame are the key levers 27 and the power operated type actions comprising levers 34, 35, 36, 45 and 46. Each key lever 27 is operable to control an associated power cam 31 with a minimum of effort. A normally energized magnetic lock 28 is provided for the keyboard to prevent effective operation of the keys when the power is off or when the keys should not be operated for any other reason.

Each key lever 27 controls a cam assembly 12 coacting with a constantly running power roll 21. Each cam 31 furnishes the power for operating a type bar 36 through a bell crank arrangement consisting of levers 34, 35, and toggle 45—46. The cam also operates a slide of a code selector mechanism 13 when required. The extent of movement imparted to each type bar 36 by its associated cam 31 is variable by a turnbuckle adjusting arrangement 44 so that exactly the right printing impression may be obtained for each character.

A selection between upper and lower case printing is effected by shifting the type basket 52 as shown in Figs. 4 through 7 of the drawings. A key lever 67 and its associated cam is provided for shifting the basket to upper case position, and a separate key lever 73 and its associated cam is provided for shifting the basket to the lower case position. This provides positive, fast, automatic operation of the case shift mechanism by the code translator as will be more specifically pointed out hereinafter. Two oppositely arranged toggle mechanisms consisting of levers 56, 58, 59 and 69 (Figs. 4 and 6) adjustably hold the basket in its two shifted positions, and the power from each of the shifting cams is applied to move the basket by breaking its associated toggle. This results in an easy, accelerated motion of the basket, which greatly reduces power roll wear, and makes the shifting operation so fast that in automatic operation the tape reader does not have to be delayed during case shifting movement.

Figures 8, 9, 10:
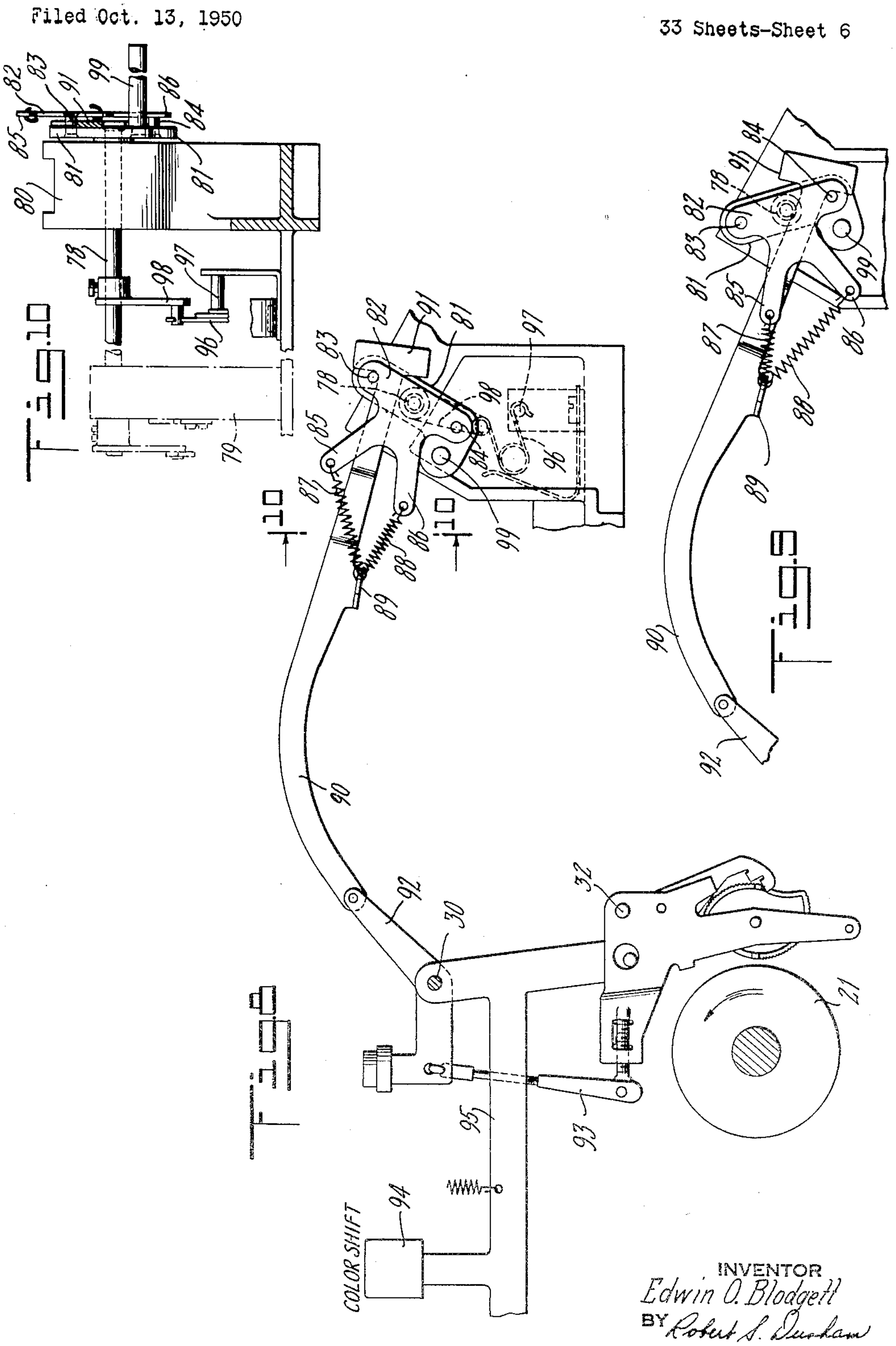
Fig. 8 is a detail view of the ribbon shifting mechanism.
Fig. 9 is a view of the mechanism at the right hand portion of Fig. 8, showing the elements in shifted position.
Fig. 10 is a view taken on line 10—10 of Fig. 8.

In Figs. 8 through 10 there is illustrated an automatic ribbon shift mechanism wherein depression of a color shift key 94 operates a key lever 95 to render operative an assocaited cam unit so that the ribbon may be shifted from one field to another by power operating from the power roller 21 through a linkage system including the levers 90, 92 and 93.

Figure 14:
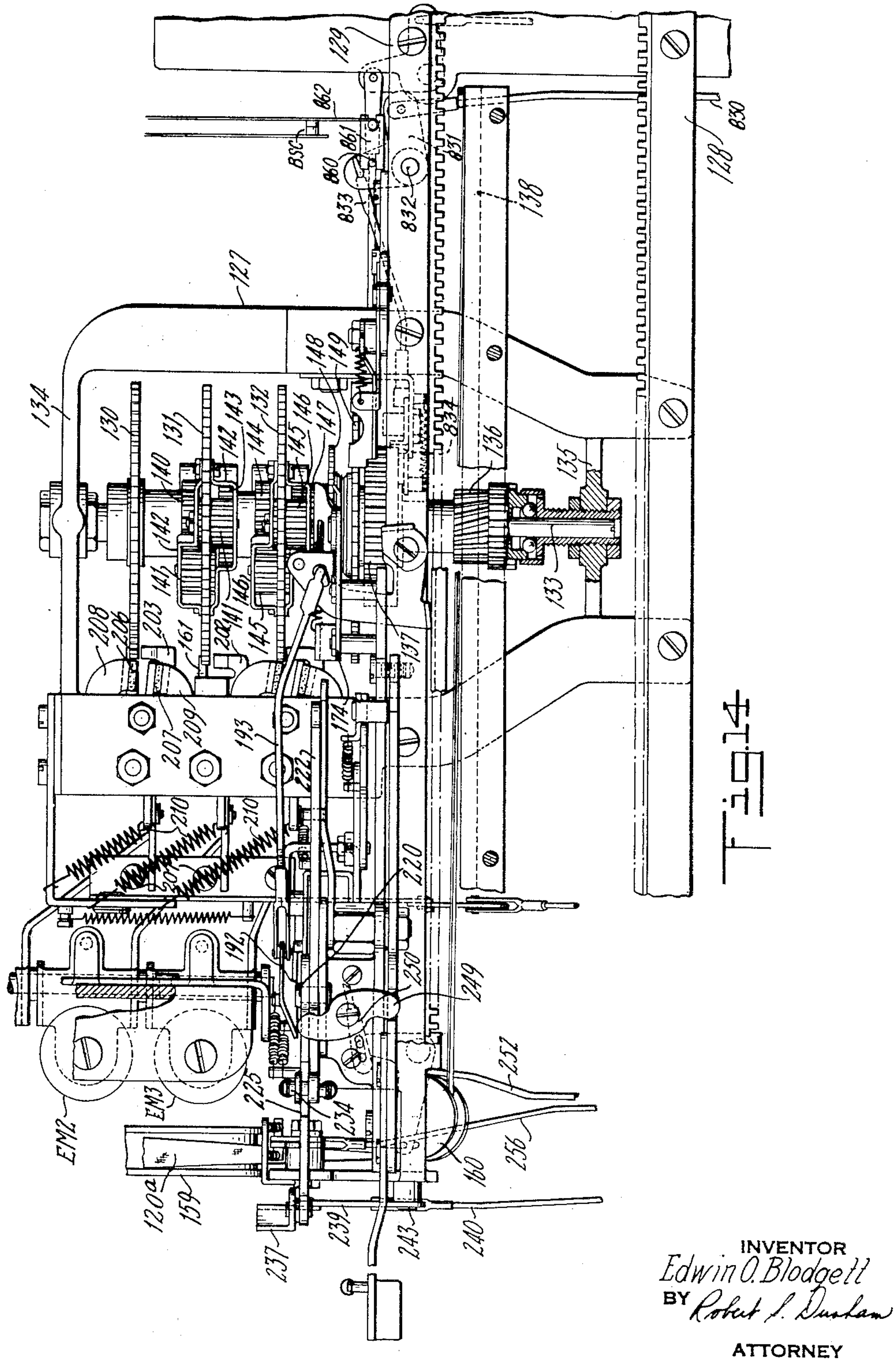
Fig. 14 is a plan view of the escapement mechanism.
Figure 15:
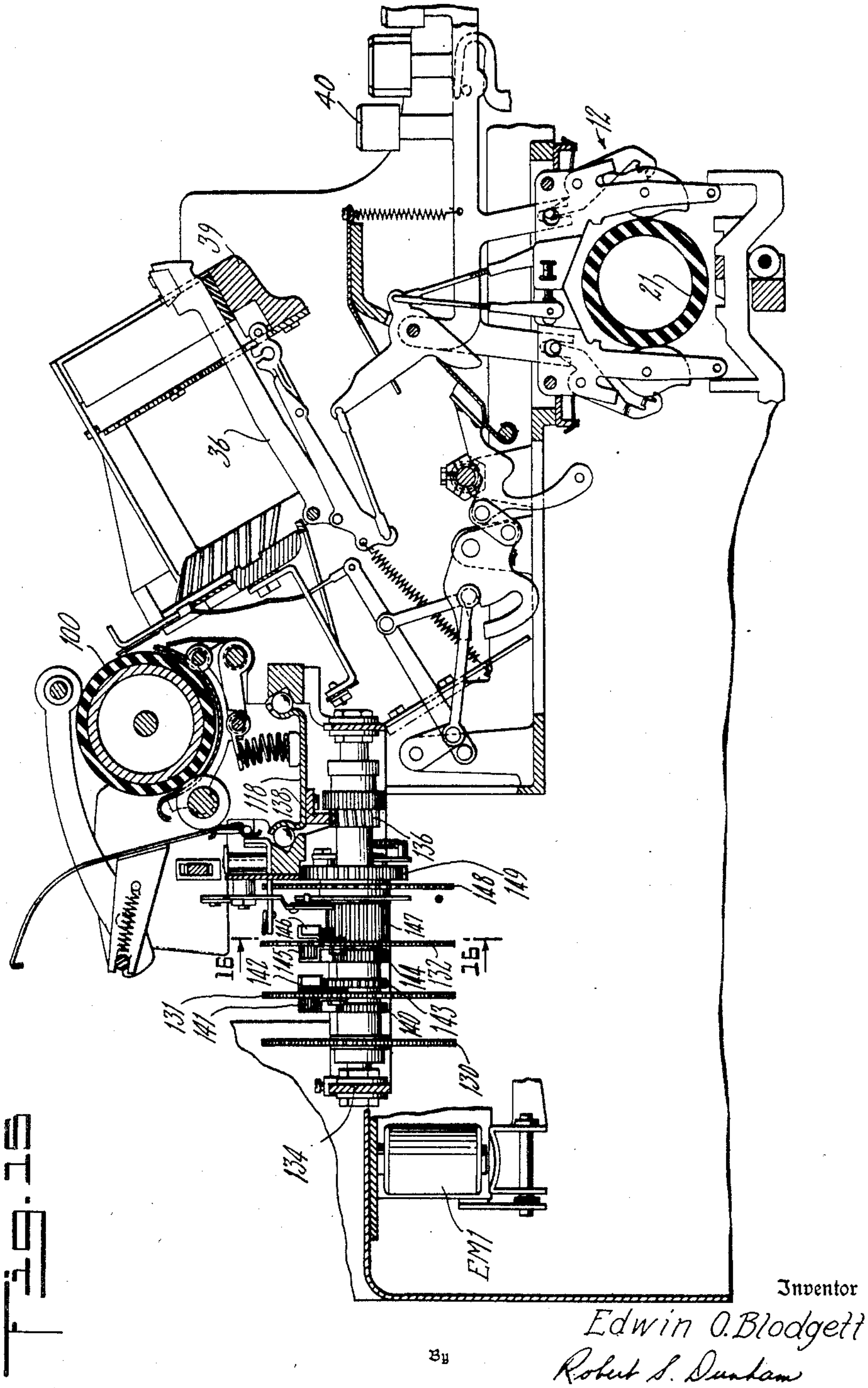
Fig. 15 is a vertical sectional view through the power roller, the type basket, the carriage and the escapement mechanism.

All spacing movements of the carriage are controlled by letter spacing mechanism shown in general in Fig. 14 of the drawings. This includes a rotary ratchet wheel 136 which is operated by the segment universal bar 138. For producing proportional letter spacing, three differentially connected escapement wheels 130, 131 and 132 are used in combinations to provide from one to six units of spacing. The selection of the proper combination of operations of the three wheels is made for each character by three magnets EM1, EM2 and EM3 (Figs. 2, 14 and 15) under control of the code selector 13. Three contacts ECA, ECB and ECC (Fig. 29) on the code selector control the lower case spacing, and three other contacts ECD, ECE and ECF control the upper case spacing. Case shift contacts CSC (Fig. 4) operated by the type basket select which of the two groups of three contacts are effective to control the three magnets.

A friction clutch (Fig. 22) operated by a toggle mechanism consisting of levers 201, 202, 210 and 211 controls return of the carriage. The platen is line spaced as it is returned under control of the clutch. The toggle linkage for operating the clutch is straightened by a carriage return cam which is controlled by a key lever. At the end of the carriage return movement, a carriage margin stop engages and moves a stop lever 189 on the frame (Fig. 19) which in turn trips a cam lever to furnish the power for disengaging the clutch by breaking the toggle.

The code selector unit 13 comprises a rectangular frame (Fig. 29) which carries coded slides 261 and 262 which are operated by downward extensions 264 of the cam units 12. There is one slide for each of the cam units, the slides 261 for the front row of cams moving forwardly, and the slides 262 for the rear row of cams moving rearwardly. The forwardly moving slides 261 are interspaced with the rearwardly moving slides 262, and a single return spring 272 between adjacent pairs of slides normally holds the slides against a common stop bar 269. Provision is made for pivotally mounting thirteen bails 274 transversely across the slides, there being seven bails in a lower row and six bails in an upper row (Figs. 30, 31 and 32). Each slide 261—262 may be provided with a cam portion 285 for operating each of the thirteen bails, but certain of these cam portions are removed as shown in dotted lines in Fig. 30 so that only the bails involved in the code for each particular slide are operated by the moving of that slide; thus, all slides 261—262 are different, because of the removal of different combinations of the cam portions 285.

The bails 274 are connected to companion contact operating shafts 280 which carry actuators for operating associated contacts SC1 through SC6 and SCC mounted on a plate 282 (Fig. 29). Six of the lower row of bails SB1 through SB6 and their associated contacts SC1 through SC6 select a six unit code and control the punching of the selected code in a tape. The seventh bail SBC controls the contact SCC which is common to the code selecting contacts. The upper row of six bails **286*a* through 286*f* and their associated contacts ECA through ECF are used for selecting the unit spacing of the carriage for securing proportional letter spacing. The bails 286*a*, 286*b* and 286*c* control the letter spacing for lower case printing while bails 286*d*, 286*e* and 286*f*** control the letter spacing for upper case printing.

The rear portion of the code selector assembly 13 is pivotally mounted on a cross-shaft **266*a* carried by the main frame 10, and the front end is held to the main frame by screws extending through lugs 266*b*. This permits the selector unit to swing away from the power roll about the shaft 266*a*, and, in doing so, the contacts mounted on the plate 282 are not disturbed. The selector unit 13 may be completely removed from the machine by removing the pivot shaft 266*a***.

The tape punch 15, driven from the power shaft 19, through gears 22 and 23, is removably mounted at the left hand rear portion of the main frame 10. A normally stationary rotary shaft 315 (Fig. 35) makes one revolution under control of a magnetically operated clutch for each punch cycle (Figs. 33 and 34). The tape to be punched is obtained from a supply spool 316 removably mounted at the rear of the machine. The tape passes over the top of the punch unit, and the holes are punched upwardly at the front of the unit for convenient manipulation and observation of the tape by the operator. The tape is fed for spacing of the holes by a pin wheel 331 during each punch cycle, but the pin wheel may be manually turned to move the tape in either direction. The tape may be easily inserted edgewise into the punch block 319 (Fig. 37).

The selector contacts SC1 through SC6 and SCC determine the code holes to be punched in the tape by energizing the associated ones of six code magnets PM1 through PM6, which, by attracting their armatures 351 release associated punch lever latches 342 (Fig. 37). The punch clutch magnet is jointly controlled by a contact operated by the release of any one or more of these latches, and by the common selector contact SCC. During the initial rotation of the punch shaft 315, the latches which were released are locked in their released position and the ones which were not released are locked in their normal position by means of a locking bail 360.

The punches CP1–CP6 (Fig. 37) are each operated upwardly through the paper tape by an associated punch lever 322 pivotally mounted between its ends on a shaft 323. The shaft 323 is positively raised and lowered during the punch cycle by identical cams 335 and 336 at each end of the shaft 323. The front end of each punch lever 322 is connected to its punch CP, and the rear end of each lever coacts with an associated latch 353. When the latch 353 is released, due to energization of its code magnet PM, the rear end of the punch lever is restrained from moving upwardly so that upward movement of the operating shaft 323 forces the punch through the paper. However, when a latch is not released because its code magnet PM was not energized, the rear end of the punch lever 322 is free to move upwardly, thereby allowing the front end of the lever and its punch to remain stationary while the operating shaft 323 moves upwardly. The cams 335 and 336 are arranged to quickly and positively withdraw the punches from the paper after a punching operation, and, during this part of the cycle, the latches 342 are mechanically restored to their normal position and the armatures are forcibly moved away from their code magnets. At the end of the punching cycle, a feed pawl 367 operated by a cam 363 (Fig. 38) operates a ratchet wheel 372 on the pin wheel shaft to feed the tape one space.

The tape reader 16 is mounted at the left hand side of the main frame 10 at a point directly in front of the tape punch 15. The tape reading unit has a continuously operating cam shaft 453 (Fig. 40) and its reading operation is controlled by a magnet DCR, which when energized, allows a roller 433 to follow the rise and fall of a cam 434, but when deenergized, holds the roller 433 from following the cam. The cam and roller control movement of code sensing pins 439 under the relatively light pressure of a spring 442 associated with each reading pin.

The tape which has been prepared in the tape punch 15 is inserted edgewise into the reading throat 441 of the tape reader 16, and, during operation, the tape is fed by a pin wheel 455 intermittently past the sensing pins 439. The pin wheel 455 may also be turned manually to move the tape either forwardly or backwardly. Each sensing pin 439 is connected to a pivoted interposer 428 (Fig. 42). The cam 434 operates on an interposer bail arm 432 to control the movement of all of the interposers 428 and, in turn, allows all of the pins 439 to move against the tape when in movement an interposer bail 431 is rocked out of contact with the interposers 428.

The pins 439 as previously mentioned are urged toward the tape by light springs 442 so that the motion of a pin will be stopped by the tape, but this motion will continue, if there is a hole in the tape opposite the pin. As the interposers 428 and the sensing pins 439 move toward the tape, contact arms 417 are allowed by the interposer bails to move toward the interposers in a direction at right angles to the direction of movement of the interposers. These contact arms 417 are operated by the force of their respective contact springs 416, and if the motion of the interposer is stopped by its associated pin engaging the tape, the contact arm 417 is in turn stopped by engaging the interposer. However, if the pin passes through a hole in the tape, the interposer moves out of the path of travel of the contact arm, allowing the contact to operate effectively.

The interposer bail 431 is then positively rocked by its cam 434 to first restore all the contact levers 417 and then move the interposers and pins away from the tape to normal position. As soon as the pins are withdrawn clear of the tape, a spring-operated feed pawl 458 (Fig. 43) moves the ratchet wheel shaft 456 to feed the tape one space. A feed cam 463 positively returns the feed pawl, and a latch 468 allows an effective feeding movement of the pawl 458 only when the interposer bail 431 operates. This prevents feeding of the tape when the previously mentioned control magnet DCR is deenergized.

The arrangement of the contact arms 417 operating at right angles to the interposers 428, allows a heavy contact load to be controlled by each pin and yet retain a light pressure of the pin against the tape. Thus, a group of any number and arrangement of contacts required may be controlled by each code hole in the tape, and yet the tape may be run through the reader an indefinite number of times without damage by the pins.

The contacts of the tape reader 16 control the translating unit 14 in its selection of the key levers that are to be operated. The cam shaft 492 of the translating unit is driven from the gear wheels 26 and it is under the control of a one-revolution magnetic clutch 539. The unit is removably mounted beneath the keyboard of the writing machine. The clutch control magnet is energized by a common reader contact RCC. The speed of the translator shaft 492 is the same as the speed of the reader shaft 456, and although the translator clutch 539 is a single revolution clutch, the energization of the clutch magnet by the reader is so timed that the translator shaft rotates continuously while the reader is operating continuously.

The translator operates the key levers by vertically disposed seekers 489 (Fig. 48), each seeker being operably connected to one of the key levers. The seekers are mounted for both a horizontal pivoted motion for selection and a vertical sliding motion for key lever operation.

The selection of the proper one of the seekers 489 is determined by six permutation bars PB1, PB2, PB3, PB4, PB5 and PB6 which are mounted for horizontal sliding motion transversely of all the seekers 439. Each permutation bar is differently notched (Fig. 45) opposite the seekers 489 so that for any combination of positions of the six bars PB1–PB6, only one seeker will be allowed to move forwardly into a position to be operated downwardly by a seeker operating bail 533 and in turn operate its key lever. Each permutation bar is operated by a spring 502 from its normal position upon energization of a corresponding magnet TM controlled by the reader contacts RC1–RC6.

In addition to the seeker operating bail, a cam operated seeker restoring bail 523 (Figs. 44 and 48) is provided for controlling the pivotal motion of all the seekers into and out of cooperative relation with the permutation bars. Another cam 493 (Fig. 49) operates a permutation bar restoring bail 512. When the permutation bars are restored, the downwardly projecting lugs 501 rock armature knock-off bails 540 and force the armatures 509 away from the permutation bar magnets.

*Power frame and type action*

The machine is assembled around a sturdy four-sided base 10 formed by a right and left aluminum casting joined at the front by another aluminum casting and at the rear by an angular steel plate 11 extending over the top rear portions of the side castings to brace the entire assembly. A power frame assembly 12, a code selector 13 and a code translator 14 are mounted between the two side castings. A tape punch 15 and a tape reader 16 are mounted on the left hand side of the frame. A carriage and rail assembly is mounted between the top rear portions of the two side castings, and a space at the rear of the carriage is provided for auxiliary apparatus.

A single, constant speed 1/20 h. p. motor 17 is mounted on the inner face of the rear frame plate 11, and this motor is connected by a V-belt 18 to the power shaft. Power shaft 19 is connected by means of a chain drive 20 to a continuously rotating power roll 21 which is adapted to operate the type bars through a conventional cam arrangement as will be more fully pointed out. The motor 17 is also connected to drive the tape punch 15, the tape reader 16 and the translating mechanism 14. This drive is achieved through a series of gears as follows. The power shaft 19 through gear 22 drives a gear 23 on the drive shaft of the reader. A gear 24 fixed to the power roll shaft is in contact with a gear 25 on the drive shaft of the tape reader 16. A pair of gears 26 imparts driving power to the code translator mechanism 14. The individual gears for driving each of these units not only afford the proper relative speeds, but also permit easy removal of each unit from the base.

The power frame 12 which is mounted within the base 10 has assembled thereon the key levers 27 and the power operated type actions. The key levers 27 are operable to control their associated power cams with a minimum of effort. The manner in which the operating cams are energized by the power roll 21 will appear more fully hereinafter. A normally energized magnetic lock 28 adapted to rock a key lever locking bail 29 (see Fig. 3) is provided to prevent effective operation of the keys when the power for any reason is off, or when the keys should not be operated for any other reason.

Each key lever controls a cam assembly contacting with the constantly running power roll 21 whereby each lever control cam furnishes the power for operating a type bar through a bell crank and, in addition, operates a slide of the code selector mechanism 13.

The manner in which power is imparted to the operative mechanism of the machine will be only briefly described since the arrangement is generally shown in the International electric writing machine formerly known as the "Electromatic." It is in connection with electric writing machines of this type that the invention has been disclosed. However, it will be understood that the invention is not limited in application to the specific machine selected for purpose of illustration, but may be applied to other power operated writing machines.

Figure 3:
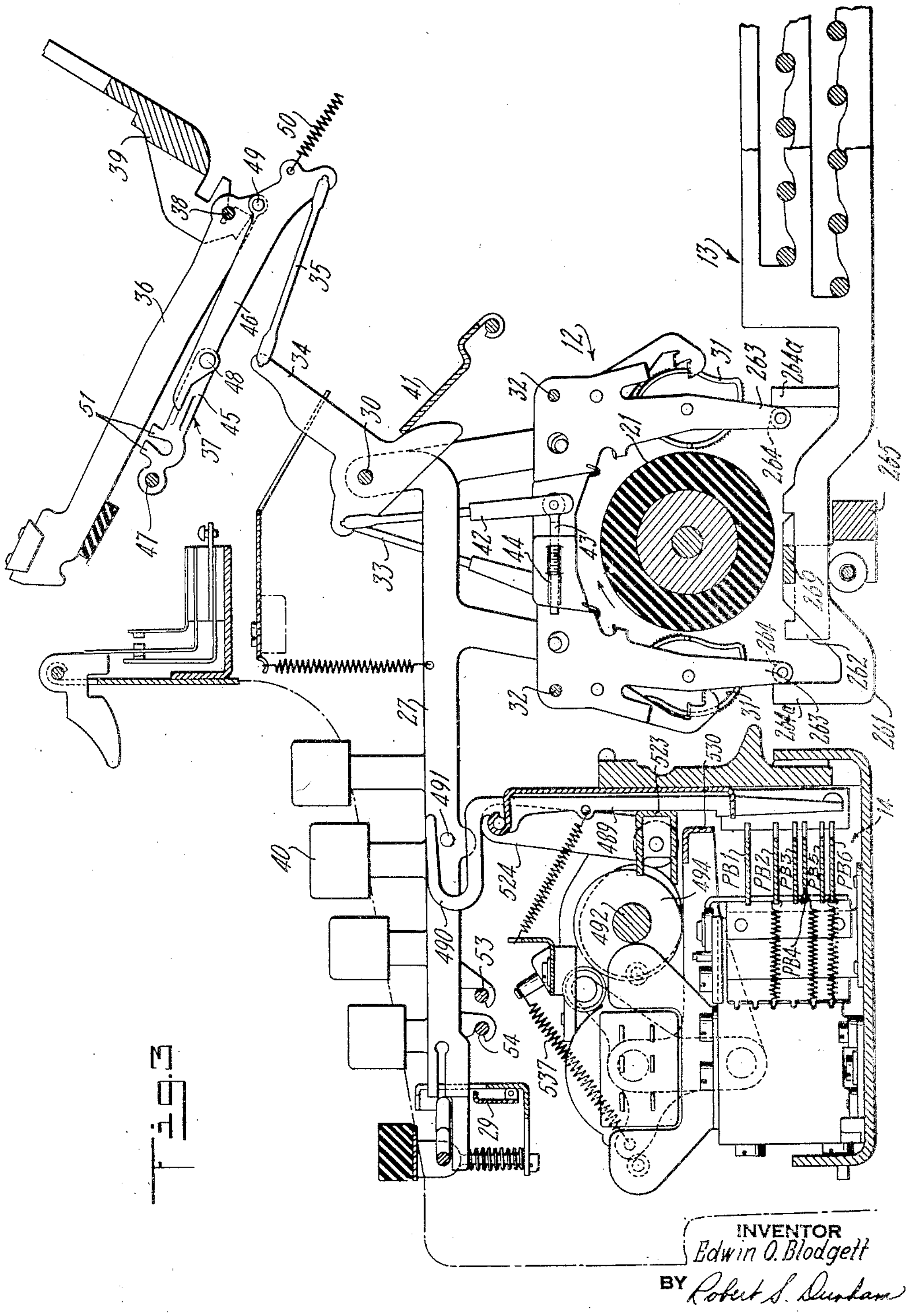
Fig. 3 is a vertical sectional view through the keyboard, the translating unit, the power roller, the type basket and part of the code selecting mechanism.

As shown in Fig. 3 of the drawings the key levers 27 are pivoted on a rod 30 which is supported by a cross member of the power frame assembly. The power roller 21 is mounted under the power frame assembly for rotation in the direction of the arrow (Fig. 3) by means of the drive connections to the motor previously described.

Cooperating with the power roll 21 are cam units 31 which are pivotally mounted on rods 32 extending parallel with the power roller 21. There is a cam unit 31 associated with each key lever 27 and each cam unit in control of a type bar is connected by a link 33 with a bell crank 34 pivoted on rod 30. The bell cranks 34 are connected by links 35 to the type bars 36 through the medium of toggles 37. The type bars 36 are pivoted on the usual wire segment 38 provided on a type bar segment 39 located in front of the conventional platen. The platen, as will appear hereinafter, is rotatably mounted in a carriage which is supported on front and rear rails by means of suitable anti-friction roller trucks.

When any character key 40 is depressed, its cam unit 31 is caused to operably engage the power roller 21 in a well known way, thereby rocking the cam unit 31 clockwise or counterclockwise, according to whether the operative cam unit is pivoted on the left or on the right hand rod 32, respectively. The rocking of the cam unit causes its link 33 to be drawn downwardly, thereby rocking the corresponding bell crank 34. This movement of the bell crank 34, through the corresponding link 35 and toggle 37, causes type bar 36 associated with the selected key to rock in a printing stroke and to make an impression of the type upon a work sheet carried about the platen. The type bar, near the end of its operative stroke, engages the usual universal bar 41 and causes the same to rock.

It may be pointed out that the operating linkage for the type bars 36 which has just been described includes several novel features which render the linkage system adjustable to secure an optimum and a uniform impression of the type. In Fig. 3 of the drawings, it will be noted that the downwardly depending link 42 is connected to its cam assembly 31 at the forward or keyboard side of the power roll by means of a turnbuckle 43, which is pivoted at one end to the link 42 and which is adjustably threaded at its other end into a socket 44 in the horizontal leg of the cam unit frame. The links depending downwardly from the bell cranks 34 are composed of two sections which are screwed into each other, thereby providing an adjustment by means of which the associated cams may be accurately spaced with respect to the power roll. It will appear, therefore, that the leverage asserted through the link and the cam unit may be adjusted through the turnbuckle 43. It may also be pointed out that the toggle 37 consisting of arms 45 and 46 is so arranged as to effectively inhibit rebound action of the type bars 36. One end of the arm 45 of the toggle is mounted on a fixed pivot rod 47, while the other end is pivoted to the arm 46 by means of a pivot pin 48. The operative connection of the arm 46 of the toggle to the type bar 36 is at a pivot pin 49. The operation of the toggle mechanism is stabilized by a spring 50 which is attached to the toggle arm 46 at one of its ends and to a fixed frame member at its other end. It will be observed that when the toggle linkage 45—46 is in its extended position the points 47, 48 and 49 are in a substantially straight line so that upon return of the type bar 36 to its position of rest, as shown in Fig. 3 of the drawings, the toggle linkage will in effect constitute a lock against the rebound action of the type bar 36. A fine adjustment of the toggle linkage may be obtained by either slightly shortening the arm 45 or by lengthening it. Such alteration of the arm 45 is easily achieved by either springing apart, or closing a pair of ears 51 which constitute the legs of a generally U-shaped portion of the arm 45.

*Case shift*

Figures 4, 5:
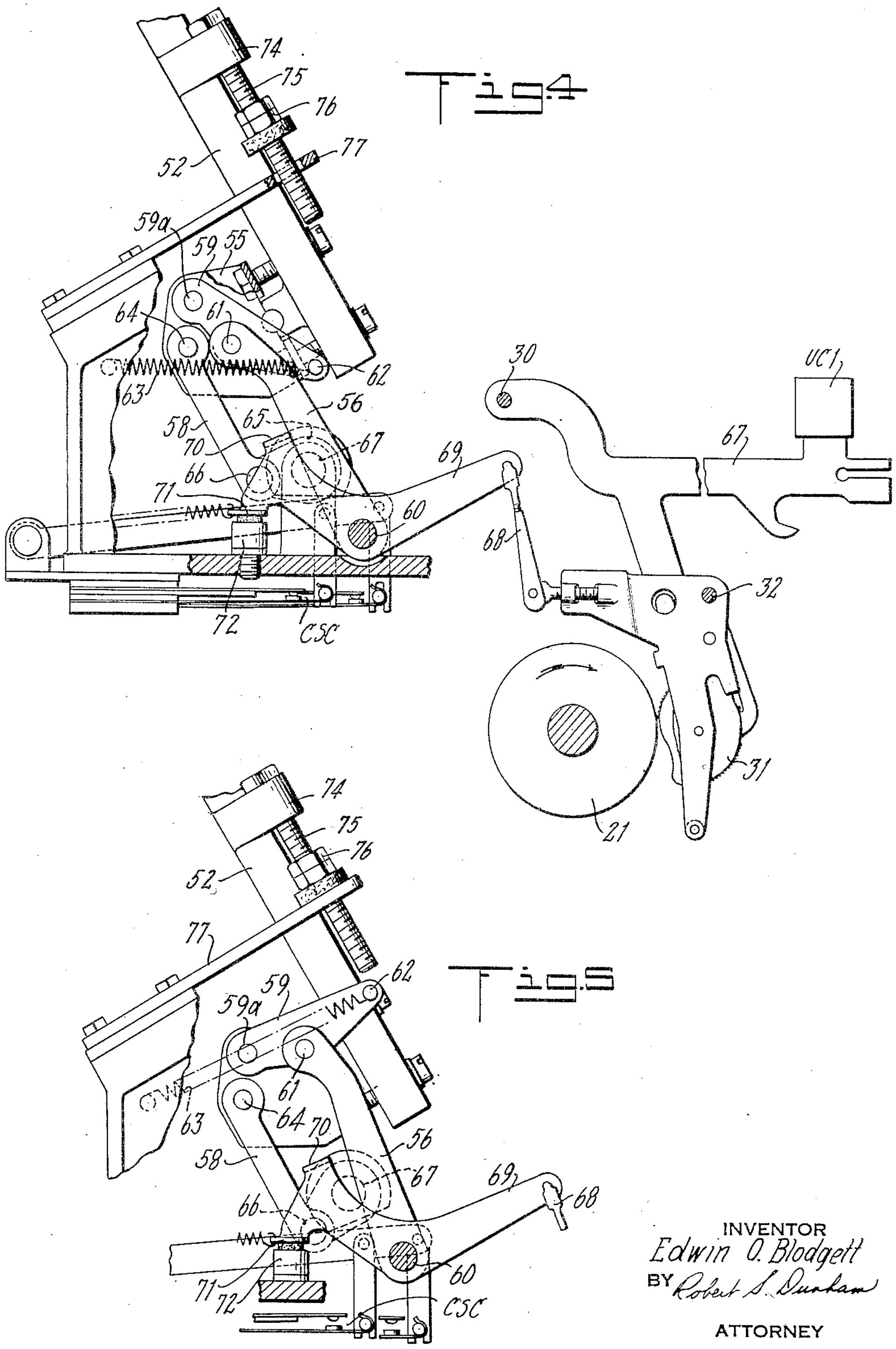
Fig. 4 is a detail view of toggle mechanism for shifting the type basket to lower case position.
Fig. 5 is a view similar to Fig. 4 and shows the toggle linkage in the released position assumed when the type basket is in upper case position.
Figures 6, 7:
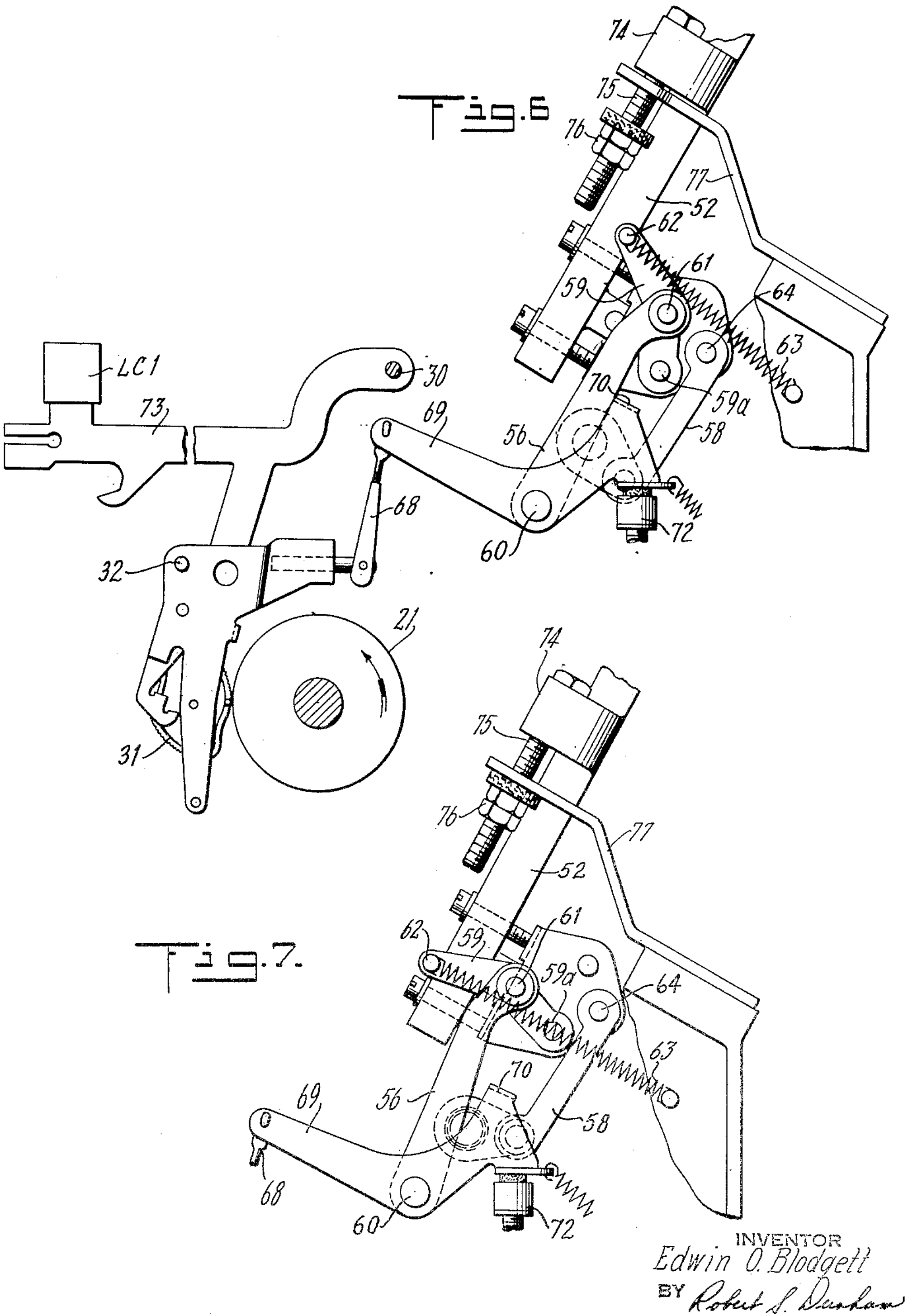
Fig. 6 is a detail view of the toggle mechanism for shifting the type basket to upper case position.
Fig. 7 is a view similar to Fig. 6 but shows the toggle linkage in the released position which it assumes when the basket is shifted to lower case position.

The type basket 52, see Figs. 4, 5, 6 and 7, is mounted for selective shifting between upper and lower case printing positions by mounting the same on two sets of parallel leaf springs in the well known manner. For the purpose of shifting the type basket, there has been provided herein improved power operated mechanism. A key lever and cam assembly is provided for shifting the basket to one position, and a separate key lever and cam assembly is provided for shifting it to the other position. This provides positive, fast, automatic operation of the type basket shift for selectively printing upper or lower case characters under the control of the code translator mechanism 14. Two oppositely disposed toggle mechanisms adjustably hold the basket in its two shifted positions, and the power from each basket shift cam unit is applied to move the basket by breaking its associated toggle. This imparts an easy, accelerated motion to the basket. Specifically, the manner in which the type basket is shifted from one position to another will be seen by reference to Figs. 4–7, wherein Figs. 4 and 5 illustrate the shifting mechanism at the left side of the type basket and Figs. 6 and 7 illustrate the shifting mechanism at the right side of the basket. Furthermore, Figs. 4 and 7 show the position of the shifting mechanism at the left and right side of the basket, respectively, when the basket has been moved upwardly for printing lower case characters, while Figs. 5 and 6 show the position of the mechanism at the left and right side, respectively, when the basket has been moved downwardly for printing of upper case characters. A lower case key LC1 is disposed at the right hand side of the keyboard, and depression of this key will operate a cam assembly as will be pointed out hereinafter. The key LC1 is connected by means of a transverse bail 53 (Fig. 3) with a lower case shift key LC2 disposed at the left hand side of the keyboard. An upper case shift key UC1 is disposed at the left hand side of the keyboard and depression of this key will operate an associated cam assembly, as will be pointed out hereinafter. The upper case shift key UC1 is attached to an upper case shift UC2 which is disposed at the right hand side of the keyboard by means of a transverse bail 54. It will appear, therefore, that depression of either of the case shift keys LC1 or LC2 on the one hand or UC1 or UC2 on the other hand will effect a shifting movement of the type basket.

Fig. 4 of the drawings shows the type basket 52 in its upper position in which lower case characters are printed. To the rear face of a side frame member of the basket 52 is attached a bracket by means of a pair of screws, and to the bracket 55 are pivoted three toggle levers 56, 58 and 59. One end of the toggle lever 56 is pivoted on a shaft 60 while the other end is pivoted to the lever 59 at an intermediate point thereof by means of a pivot pin 61. The free end of the lever 59 has a stud 62 extending from a face thereof to which is attached a spring 63 which is anchored at its other end to a fixed frame member. The other end of the lever 59 is pivoted to the bracket 55 by means of a pivot pin 59*a*. The lever 58 of the toggle system has one end thereof pivoted on a pivot pin 64 carried by the bracket 55. The opposite end of the arm 58 is pivoted to a short lever 65 by means of a pivot pin 66, the short lever 65 being secured to a rock shaft 67.

The toggle system as it is disposed in Fig. 4, when the type basket is elevated to its lower case position, has the pivot points 59*a*, 60 and 61 of the toggle system in substantial alignment and the spring 63 under substantial tension, and is effective to exert considerable turning force on finger 70 which holds the toggle arms 59 and 56 in their straightened relation, as shown in Fig. 4, wherein arm 56 engages the finger 70 of the release lever 69 which is in turn stopped by extension 71 and stop 72. This positively holds the basket in its upper position. The arrangement at the other side of the basket has a like function.

In order to release the basket 52 to its lower position for the printing of upper case characters, it is merely necessary to depress either key UC1 or UC2 to rock the key lever 67 about the rod 30, whereby its associated cam assembly is brought into contact with the power roll 21 and a connecting link 68 is thereby drawn downwardly. A toggle release lever 69 is pivoted for rocking movement about the rock shaft 60 and the upper free end of the release lever 69 has an inturned finger 70 which abuts the edge of the lever 56 to rock the same in a clockwise direction to break the toggle linkage into the position shown in Fig. 5 of the drawings. The release lever 69 has an extension 71 which is adapted to contact a stop member 72 when the release lever and its associated cam assembly are in normal or non-operated position.

As viewed in Fig. 5 of the drawings the case shift toggle linkage is in its released position wherein the force of the spring 63 is directed along a line from its point of anchorage 62 through the pivot point 59*a* of the lever 59. In this position the effect of the spring is substantially neutralized.

When the type basket is in its upper case position, the operating toggle at the right hand side of the basket is as shown in Fig. 6 of the drawings, while its position at that side of the basket for lower case printing is shown in Fig. 7 of the drawings. The toggle linkage at the right side of the basket which controls the shifting of the basket into the lower case position is in all respects similar to the shifting mechanism at the left hand side of the basket with the exception that the position of the lever 59 is reversed. That is to say, the pivot point 59*a* is disposed at the bottom edge of the bracket 55 while the free end of the lever 59 extends upwardly when the toggle system is in its extended or operative position. If, therefore, the basket is in its upper case position and it is desired to shift the same to lower case position, it is merely necessary to depress the lower case shift key LC1 and its associated key lever 73 to rock the lever downwardly about the rod 30. This will effectively release its cam assembly for contact with the power roll 21 with the result that the link 68 is moved downwardly and the release lever 69 will be rocked into contact with the toggle lever 56 so that the toggle system will be broken into the position shown in Fig. 7 of the drawings where the force of the spring 63 extends substantially from its point of connection 62 with the lever 59 through the pivot point 59*a* whereby its effect on the toggle linkage is substantially nullified.

The type basket 52 has lugs 74 extending forwardly from each side thereof, and these lugs carry stop screws 75 on which stop nuts 76 are threaded. The stop nut 76 at the left side of the basket is adapted in its upper case position to contact the face of a stop bar 77 fixed to and extending forwardly from a portion of the power frame. The stop nut 76 at the right hand side of the basket is adapted in its lower case position to contact the lower face of the stop bar 77 at the right hand side of the basket. The movement of the type basket 52 may, therefore, be accurately limited by adjusting the stop nuts 76, the one at the left hand side of the basket for limiting downward movement of the basket and the one at the right hand side of the basket for limiting upward movement of the basket.

When one set of toggles is operated to shift the basket a slight compression force is exerted on the stop members 75–76 (Fig. 7) at the opposite side of the basket. Thus, the force applied at one side of the machine is resisted to some extent at the other side. This is effective to take up all the play that may be in pivots 64, 66 and in the bearings of rock shaft 67.

The importance of the foregoing case shift control lies in the fact that the toggle linkage system is broken by power roll energy, whereby a mechanical advantage is realized and wear on the power roll is minimized. Furthermore, the movement of the type basket is rapid and positive under the influence of the breaking of the toggle linkage and the spring 63.

*Ribbon shift*

In order that the ribbon field or color may be shifted during automatic tape controlled operation of the machine, as to be pointed out hereinafter, there has been provided means herein for shifting the fabric ribbon by means of a key lever controlled cam. In this regard attention is directed to Figs. 8, 9 and 10 of the drawings. The machine is provided with conventional ribbon shift mechanism, but this mechanism has been placed under the influence of power cam mechanism. In Figs. 8, 9 and 10 a shaft 78 which is mounted for rocking motion in the power frame elements 79 and 80 is the shaft which is manually rocked in conventional writing machines for effecting color change or field shift of the writing ribbon. To the outer end of the shaft 78 has been fixed a rocker plate 81 which carries a control plate 82 in spaced relation in respect to the outer face thereof. Spacing pins 83 and 84 mount the control plate 82 in fixed relation to the rocker plate 81. The control plate 82 has a pair of forwardly extending diverging fingers 85 and 86, which serve to anchor one end of a pair of springs 87 and 88, the opposite ends of these springs being anchored at a common point in a laterally extending lug 89 carried by a lever 90. The rear end 91 of the lever 90 is T-shaped so that opposite ends of the T abut the spacing pins 83 and 84, respectively, depending on whether the lever 90 is shifted to an upper or a lower position under the influence of springs 87 or 88, respectively.

The forward end of the lever 90 is pivoted to an operating lever 92 which in turn is mounted for rocking movement on the rod 30. The other end of the lever 92 is connected by means of a link 93 to a cam unit adjacent the power roll 21. It will follow, therefore, that upon depression of the color shift key 94 and its related key lever 95 which is pivoted for rocking movement on the shaft 30, the associated cam unit will be released into engagement with the power roll 21, the cam unit will be rocked about the rod 32, and the link 94 will be operated to rock the lever 92 in a counterclockwise direction, thereby pulling forward on the lever 90 and applying operating force to either spacing pin 83 or spacing pin 84 depending on the position of the T-shaped end 91 at the time.

Assuming the rocker plate 81 to be disposed in the position shown in Fig. 8 of the drawings, the T-shaped end 91 of the lever 90 will engage the spacing pin 83 under the influence of spring 87. When the lever 90 is pulled forwardly as described, the T-shaped end thereof will urge the rocker plate 81 in a counterclockwise direction. A limited movement of the rocker plate 81 will cause the same to snap into its shifted position because of an overcenter spring 96 which influences its action. The spring 96 has one end thereof mounted on a fixed bracket 97 and the other end thereof on an arm 98 which is fixed to the shaft 78.

When the rocker plate 81 is shifted in a counterclockwise direction as viewed in Fig. 8, the spring 88 will shift the T-shaped end 91 of the lever 90 into contact with the spacing pin 84 so that it is conditioned to move the rocker plate in a clockwise direction upon a subsequent manipulation of the color shift key 94 and the operation of its associated mechanism. Fig. 9 of the drawings shows the rocker plate 81 shifted into the extreme position opposite from that shown in Fig. 8. In the position of the lever 90 as shown in Fig. 9, its T-shaped end 91 engages the lower spacing pin 84 whereby the T-shaped end 91 is conditioned to apply clockwise rocking motion to the rocker plate 81.

It will follow from the foregoing, therefore, that there has been provided herein simple and positive power mechanism for shifting the ribbon, and this is particularly important when it is desired to write text in more than one color by automatic operation of the machine under control of a record tape as to be described hereinafter.

A stub shaft 99 extends laterally from a face of the rocker plate 81 to a point that is accessible from the exterior of the machine for the purpose of permitting manual manipulation of the ribbon shift mechanism.

*Platen indexing*

Figures 11, 12:
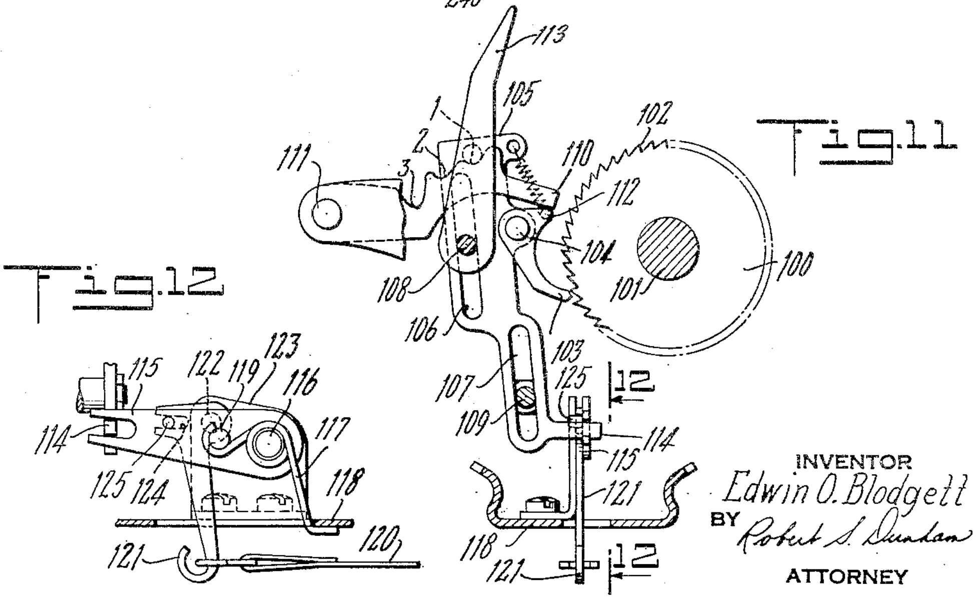
Fig. 11 is a detailed view of the platen indexing mechanism.
Fig. 12 is a view taken on line 12—12 of Fig. 11.

The writing machine platen is indexed about its longitudinal axis for the purpose of feeding the copy paper through the type impression zone by conventional mechanism which need, therefore, be only briefly described. In Figs. 11 and 12 is illustrated the mechanism by which the platen is indexed. The platen 100 is rotatably mounted on its axis 101 and has attached to one end thereof a ratchet wheel 102 which is adapted to be engaged by a feed pawl 103 for rotating the platen. The feed pawl 103 is pivoted on a pin 104, the pin 104 being carried by a sliding supporting member. The supporting member 105 has a pair of spaced slots 106 and 107 which embrace fixed guide studs 108 and 109, respectively. A finger 110 pivoted on the carriage frame at 111 has its free end resting on the top edge of the feed pawl 103. The upper edge of the finger 110 has a series of notches 1, 2 and 3 representing line spaces, and when the operating lever 113 which is mounted on the pivot pin 108 is moved into one of the line space notches 1, 2 or 3, the free end of the finger 110 bears on the top of the feed pawl 103 and alters the relation of the feed pawl 103 in respect to the ratchet wheel 102 by moving the supporting member 105 upward or downward so as to cause the feed pawl 103 to engage either every tooth, every second tooth or every third tooth of the ratchet wheel 102 in accordance with the setting of the hand lever 113.

The lower end of the support 105 has a laterally extending lug 114 which engages in the slotted free end of an operating lever 115. The operating lever 115 is pivoted on a fixed pivot stud 116 and is normally held in its raised position by means of a spring 117 which is wound about the pivot stud 116 and has one end thereof anchored to the carriage 118 and the other end to stud 119 extending from one face of the operating lever 115.

The platen indexing mechanism thus far described is operated through an indexing movement when the carriage is returned under the force of a carriage return tape 120. The end of the carriage return tape is attached to a downwardly projecting T-shaped lever 121 which is pivoted on a pivot stud 122. The studs 116 and 122 are carried by a fixed, upstanding bracket 123 secured to the carriage 118. One arm of the T-shaped lever 121 has a bifurcation 124 in which is received a pin 125 extending laterally from a face of the lever 115.

It will appear from the foregoing, therefore, that when the carriage is returned under the influence of the carriage return tape 120, the T-shaped lever 121 will be rocked in a counterclockwise direction about its fixed pivot 122 with the result that the bifurcated end 124 of the lever will move downwardly, and as a consequence of the connection between the bifurcation of the lever and the pin 125, the lever 115 will also be rocked downwardly, thereby drawing the supporting member 105 downwardly to the point where the slots 106 and 107 will engage with their upper extremities with the pins 108 and 109, respectively. Thereupon, in accordance with the setting of the control lever 113, the platen will be indexed 1, 2 or 3 line positions as the carriage is being returned.

*Variable spacing*

The machine is equipped with a standard carriage 126 (Fig. 13) and all of the spacing movements of the carriage are controlled by a rotary wheel escapement mechanism operated by the segment universal bar 41 (Fig. 3). Herein is disclosed proportional spacing mechanism wherein three differentially connected escapement wheels are used in combinations to provide from one to six units of spacing. The selection of the proper combination of operations of the three wheels is made for each character by three magnets EM1, EM2 and EM3 (Fig. 2), under the control of the code selector 13. Three contacts on the code selector control the lower case spacing and three other contacts on code selector control the upper case spacing as will be pointed out hereinafter. Case shift contacts CSC operated when the type basket is raised and lowered select which of the two groups of the three code selector contacts are to be effective to control the three magnets EM1, EM2 and EM3. Spacing between words and the like is controlled by dummy or non-printing type actions so that the same timing is retained as in printing.

The carriage escapement mechanism is designed to letter space in proportion to the width of the respective characters employed, and this mechanism is mounted in a frame casting 127 which is secured to the undersides of the front and rear rails 128, 129 (Fig. 14). The frame 127 supports three wheels which are designated 130, 131 and 132. A rod 133 on which the wheels 130, 131 and 132 are rotatably mounted is supported in parallel spaced frame members 134 and 135. A pinion 136 which is attached to a pinion 137 meshes constantly with a spiral rack 138 which is secured to the underside of the carriage 118.

Figure 18:
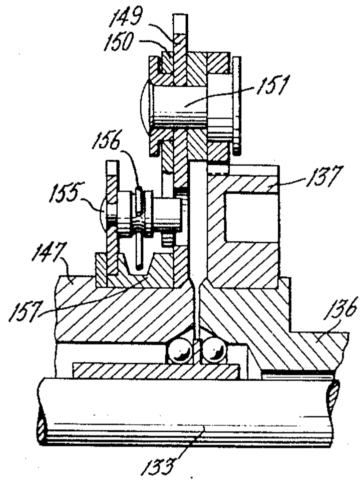
Fig. 18 is a sectional view on line 18—18 of Fig. 17.

The rear end of the pinion 136 is formed as a ball race (see Fig. 18) in cooperation with balls 139 whereby the pinion 136 and ratchet 137 rotate on the rod 133. The latter is relatively fixed in the frame members 134 and 135.

The hub of wheel 130 is integral with a pinion 140 located adjacent the hub of the wheel 131. The pinion 140 meshes with one of a pair of intermeshing sun pinions 141 rotatably mounted on bracket 142 carried by the wheel 131 while the other pinion 141 meshes with a pinion 143 which is secured to a pinion 144. The pinion 144 meshes with one of a similar pair of intermeshing sun pinions 145 mounted on brackets 146 carried by wheel 132, while the other pinion 145 meshes with a pinion 147.

Figure 17:
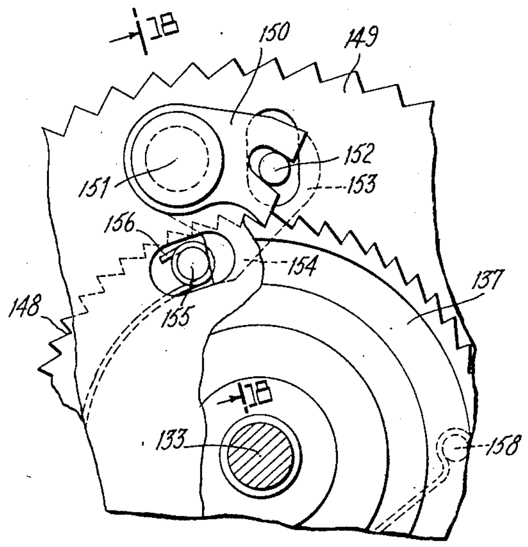
Fig. 17 is a large scale detail view of part of the carriage release mechanism.

Rotatably mounted on the pinion 147 is a ratchet wheel 148 which is of the same diameter as the ratchet 137 while secured to the pinion 147 is a ratchet 149 which is considerably larger in diameter than the ratchets 137 and 148. The ratchets 137 and 149 are normally connected for driving purposes by means best shown in Figs. 17 and 18, comprising a dog 150 pivoted on a stud 151 fixedly mounted on the ratchet wheel 149. The dog 150 normally engages the teeth of the ratchet wheel 137 whereby the ratchet wheel 149 will be rotated in a counterclockwise direction (Fig. 17) whenever the ratchet wheel 137 is similarly rotated by movement of the carriage. The dog 150 is slotted to embrace a stud 152 carried by a member 153 also pivotally mounted on the stud 151. The member 153 has a lug 154 engaging a stud 155 secured to the side of ratchet wheel 148. A torsion spring 156, hooked over the end of stud 155 and lying in a groove formed in a collar 157 on the pinion 147 and also anchored to a stud 158 (Fig. 17) on ratchet 149, normally tends to rotate the ratchet 148 in a counterclockwise direction (Fig. 17).

Figure 1:
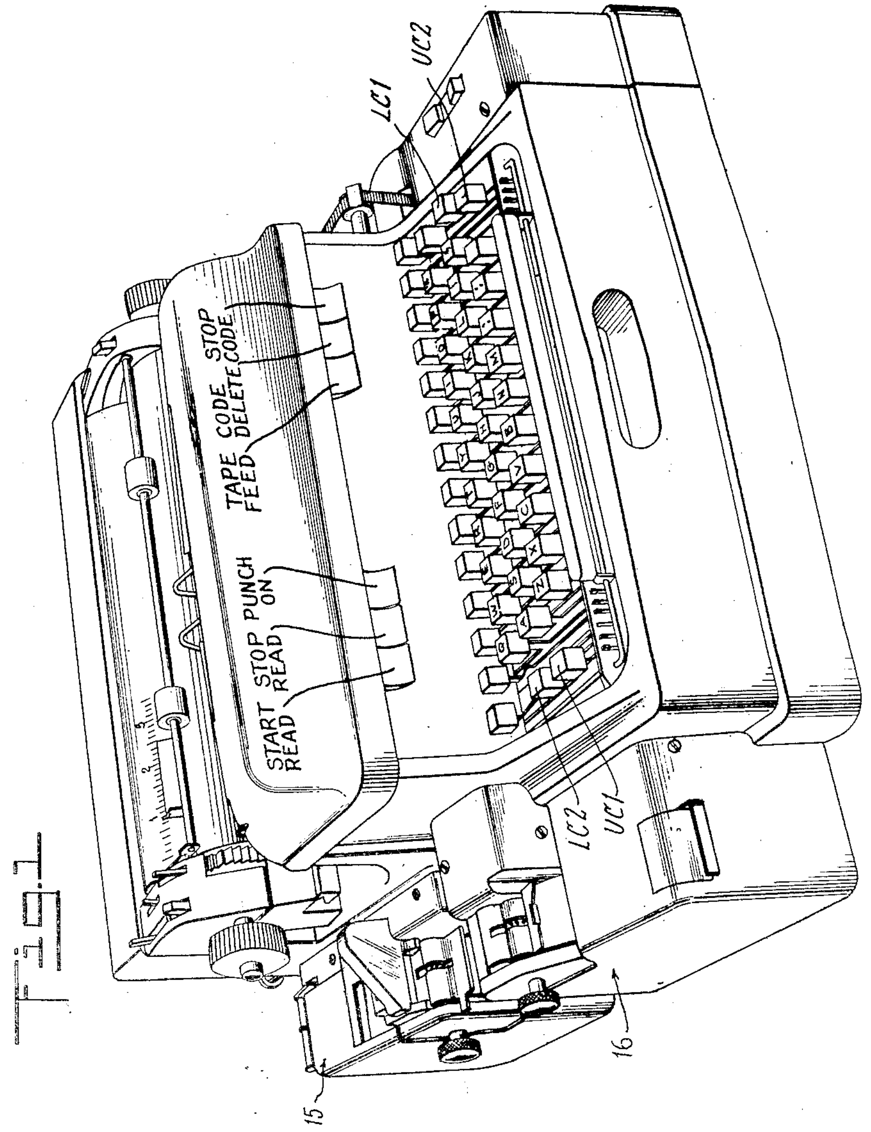
Fig. 1 is an exterior perspective view of the writing machine constituting the invention.
Figure 2:
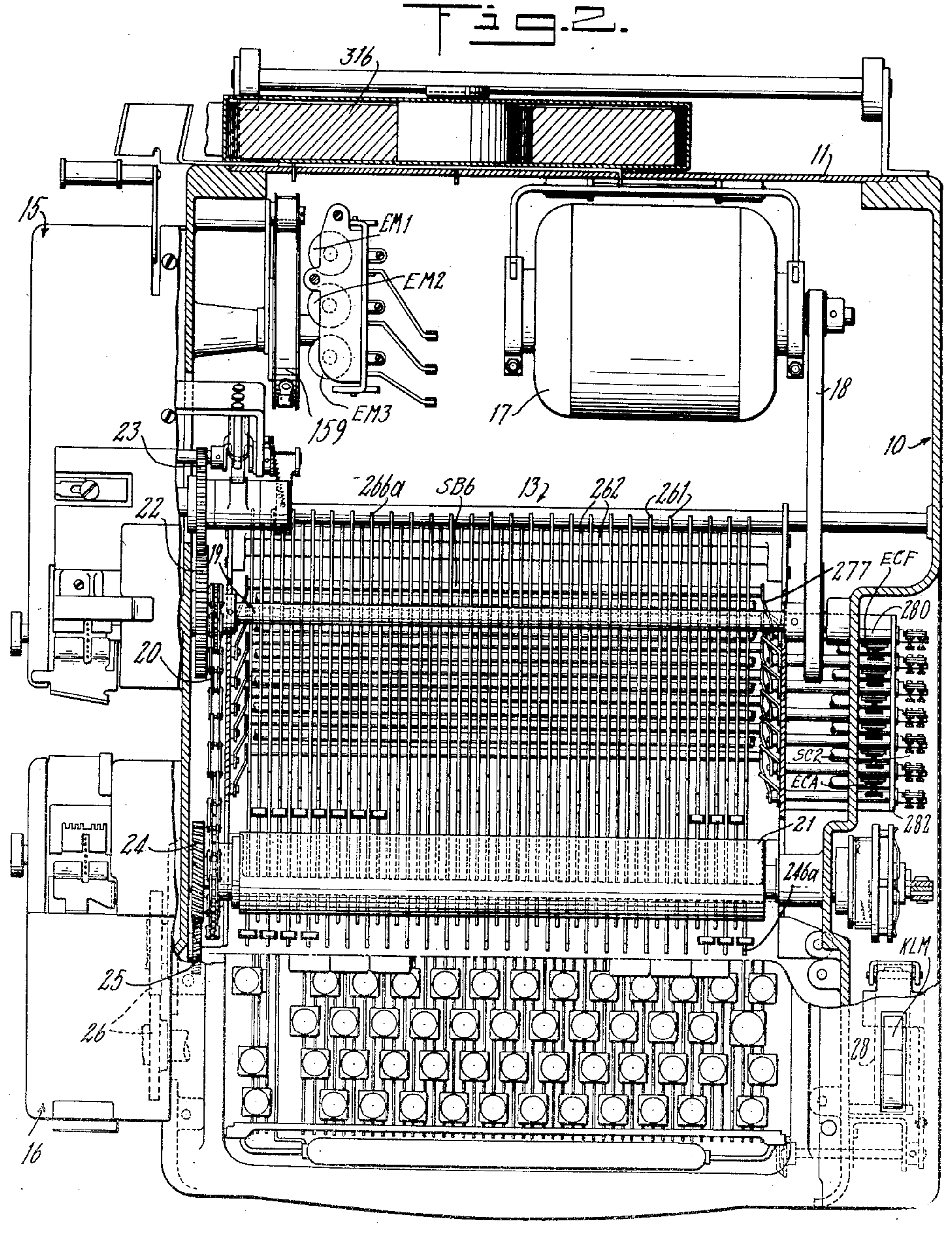
Fig. 2 is a horizontal sectional view through the machine at a point just above the keyboard.

Movement of the carriage is effected, as usual in typewriting machines, by means of a spring drum 159 partly shown in Fig. 2 on which drum is wound a tape 120a passing over a pulley 160 mounted on the rear rail 129 and thence to the right hand end of the rack 138 at which point the tape 120a is secured. Due to the constant tension produced in the tape 120a by the spring drum 159, the carriage 126 tends to move to the left. Thus the ratchet 137 tends to rotate the ratchet 149 and pinion 147 in a counterclockwise direction (Fig. 17). This rotational tendency of the pinion 147 is communicated to the wheels 130, 131 and 132 (Fig. 14) through the train of connections comprising the pinions 140, 141, 143, 144 and 145. Normally, however, this rotational tendency has no effect so far as movement of the carriage is concerned because the wheels 130, 131 and 132 are restrained from rotation by means of the loose dogs 161 (Fig. 16) of the escapement mechanism.

Reverse rotation of the ratchet 149 and pinion 147 is prevented by means of a dog 162 (Fig. 19) pivoted on a stud 163 carried by a plate 164 which is adjustably secured to the rear rail 129. Also pivoted on stud 163 is a bracket 165 having a bumper 166 composed of resilient material such as leather against which the dog 162 is normally held by a spring 167. The bracket 165 is adjustably rotated on the stud 163 until the free end of said dog 162 engages one wall of a tooth in the ratchet 149 but does not quite touch the other wall of the adjacent tooth, the object being to silence the clicking noise which ordinarily is experienced with similar ratchet-and-pawl mechanisms due to the end of the dog striking the side of the next succeeding tooth after riding over a given tooth.

The ratchet wheels 130, 131 and 132 have 54, 54 and 36 teeth, respectively, whereby the amount of feeding movement imparted to the carriage may be varied. Due to the method of interconnecting the ratchet wheels by means of intermeshing pinions, the ratchet wheels 130 and 132 rotate in a direction opposite to the ratchet 131. Assuming for the moment that the ratchet wheels 130 and 131 (Figs. 14 and 15) are fixed against rotation, the pinion 144 will be locked against rotation. Therefore, if ratchet wheel 132 is now permitted to rotate one tooth space, one of the pinions 145 will roll around said pinion 144 and by rotating the companion pinion 144 will permit the pinion 147 to rotate in the same direction as the ratchet wheel 132 but twice as much as ratchet wheel 132. Similarly, if the ratchet wheels 130 and 132 are locked against rotation and the ratchet wheel 131 is permitted to move, one of the pinions 141 will roll around the pinion 140 and cause pinions 143 and 144 to be rotated. The rotation of pinion 144 is communicated to pinion 147 through the intermeshing pinions 145. As in the case of ratchet wheel 140, pinion 147 rotates twice as much as ratchet wheel 131. However, when the ratchet wheels 131 and 132 are held against rotation and ratchet wheel 130 rotates, the same amount of movement will be communicated from the ratchet wheel 130 to the pinion 147 through the pinions 141, 143, 144 and 145 acting as idlers. It is possible, however, to permit the ratchet wheels 130, 131 and 132 to rotate in combinations to produce an accumulative effect upon the pinion 136 which, of course, will permit the carriage to move correspondingly.

Since the ratchet wheel 130 has fifty-four teeth, the pinion 147 and hence the pinion 136 will be rotated 1/54 of a revolution whenever the ratchet wheel 130 rotates one tooth space. Moreover, since the movement of the pinion 147 is twice that of the ratchet wheel 131 and the latter has fifty-four teeth, the pinions 147 and 136 will be rotated the equivalent of 1/27 of a revolution of the ratchet wheel 131. Likewise, the ratchet wheel 132 having thirty-six teeth, pinions 147 and 136 will be rotated 1/36 of a revolution of the ratchet wheel 132. It will be seen, therefore, that the movements of pinions 147 and 136 produced by the ratchet wheels 130, 131 and 132 are so designed and the spacing of the teeth on their ratchet wheels has been so selected that ratchet wheel 130 causes the carriage to move one unit of spacing, ratchet wheel 131 two units of spacing and ratchet wheel 132 three units of spacing.

It is thus possible to secure six different spacings of the carriage which, in terms of units of carriage spacing, are as follows: 1, 2, 3, 4, 5 and 6. Thus the spacing of the carriage can be accommodated to the different widths of letters employed. The means by which the wheels 130, 131 and 132 are selectively controlled will be described in the following paragraphs.

Figure 16:
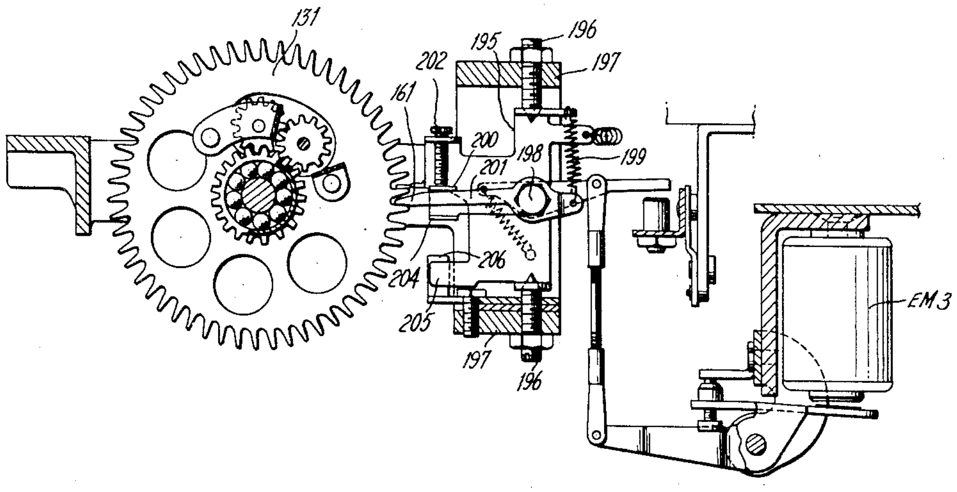
Fig. 16 is a vertical sectional view taken on line 16—16 of Fig. 15.

The rotation of the escapement ratchet wheels 130, 131 and 132 is controlled by means of three dog rocker mechanisms which are selectively controlled by magnets EM1, EM2, and EM3, respectively. Figure 16 shows the dog rocker mechanism for the ratchet wheel 131. Each dog rocker mechanism includes a dog rocker plate 195 which is pivotally mounted on vertically aligned conical studs 196 screwed into threaded holes in two parallel and horizontal portions 197 of the frame 127. The conical points of the studs are seated in conical holes in lugs formed in the dog rocker plate 195. Pivoted on a stud 198 carried by the rocker plate 195 is the usual loose escapement dog 161 mentioned hereinbefore which is actuated by a spring 199 so as to be urged in a counterclockwise direction (Fig. 16). The left hand end of the dog 161 engaging one of the teeth of the ratchet 131, however, is held in the position of Fig. 16 owing to the tension of the spring drum 159 (Fig. 14) being greater than the tension of the spring 199 (Fig. 16) whereby the dog 161 is forced against a stop 200 mounted on an arm 201 which is rotatably secured to the side of the rocker plate 195 by means of the stud 198. The upper left hand portion of the arm 201 is provided with a bent-over lug against which bears an adjusting screw 202 carried by a lug formed in the rocker plate 195. By turning the screw 202 in one direction or another, the arm 201 may be rotatably adjusted about the stud 198 as a pivot. The dog rocker plate 195 is provided with a lug 203 which is substantially in horizontal alignment with the left end of the dog 161 but does not normally engage the teeth of the ratchet wheel 131.

When the rocker plate 195 is rocked in a counterclockwise direction (Fig. 14), the lug 203 is moved into the tooth space occupied by the dog 161 before said dog is moved free of the ratchet wheel whereby when the dog ultimately clears teeth in the ratchet 131, the ratchet wheel is permitted to rotate counterclockwise a fraction of a tooth space in Fig. 16. The spring 199 then rocks the dog 161 in a counterclockwise direction until said dog strikes a resilient stop 204 mounted on the arm 201. The stops 203 and 204 on arm 201 are so spaced that the end of dog 161 assumes a position in horizontal alignment with the next lower tooth space of ratchet wheel 131.

When the plate 195 is restored to the position of Fig. 14, the end of dog 161 is moved into the path of the next lower tooth on ratchet wheel 131 before the lug 203 clears the teeth in ratchet 131. When the lug 203 finally clears the teeth in ratchet 131, the ratchet wheel 131 will be permitted to rotate in a counterclockwise direction (Fig. 16) the remainder of a tooth space, thereby bringing the end of dog 161 back against the resilient stop 203. Thus, by giving the plate 195 one complete oscillation the escapement ratchet 131 is permitted to turn one full tooth space.

The rocker plate 195 (Fig. 16) is formed with a lug 205 which extends between two resilient stops 206 and 207 (Fig. 14) mounted on adjustable arms 208 and 209, respectively, which arms are pivoted in scissors fashion on one of the conical studs 196. The stops 206 and 207 being located on opposite sides of the lugs 205, adjustably limit the oscillatory movements of the plate 195 on the studs 196 as pivots.

Similar mechanism is provided for the other two ratchet wheels 130 and 132 but, owing to the face that these two ratchet wheels rotate in a direction opposite to the ratchet wheel 131, the rocker plates 195 for the ratchet wheels 130 and 132 are in effect inverted. Normally, the plates 195 are held by torsion springs 210 with their lugs 205 abutting the stops 207, as shown in Fig. 14, with all of the dogs 161 engaging the teeth of their respective ratchets.

The rocker plates 195 are selectively and combinationally operated through power mechanism controlled by the keys 40 and the code selector mechanism 13 which will be described at a later point in this specification.

*Manual carriage release*

Figure 13:
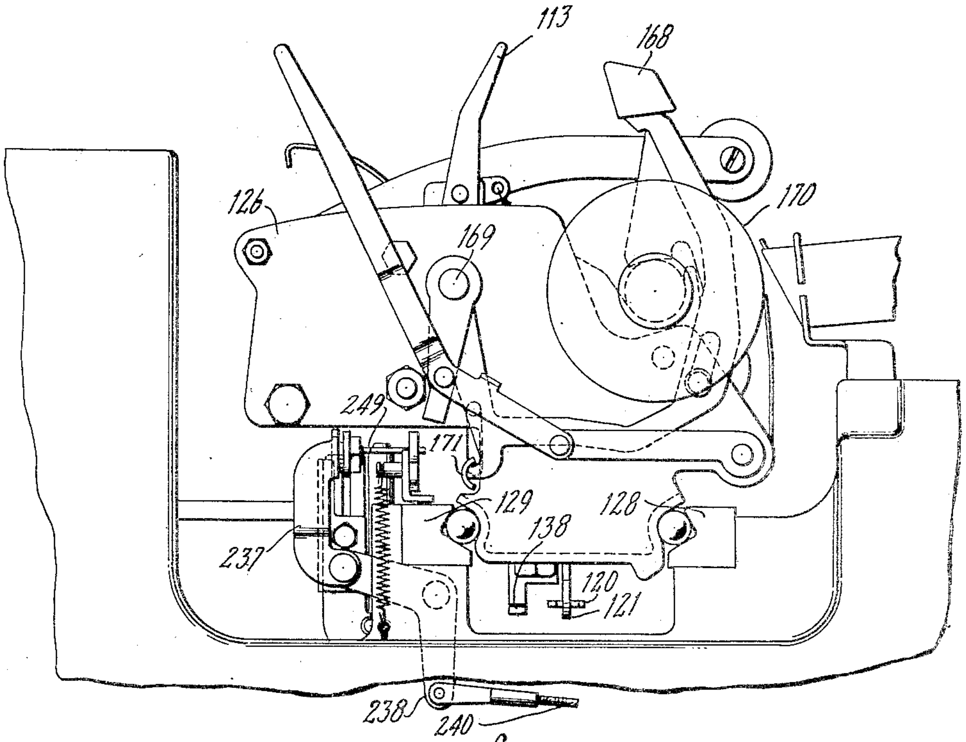
Fig. 13 is an end elevational view of the carriage.

It is desirable to be able to release the escapement mechanism from the carriage for the purpose of moving the carriage by hand, or when the carriage is to be returned by the usual power operated carriage return mechanism. For this purpose there is provided release mechanism which is operated by the usual carriage release levers 168, one of which is shown in Fig. 13, these levers being pivoted on studs 169 on the side plates of the carriage with the free ends of levers 168 adjacent the usual platen rotating knobs 170. Each lever 168 abuts one end of a bail 171 pivotally mounted in the side plates of the carriage. When either of the levers 168 is depressed, the bail 171 is rocked clockwise in Fig. 13 thereby causing the bail to move rearwardly of the platen. A lug 172 formed in a lever 173 (Fig. 19), pivoted on the top surface of the rear rail 129, is thereby moved rearwardly of the platen whenever the bail 171 is moved by the release levers 168.

Mounted on a bracket 174 (Fig. 19) is a lever 175 pivoted on a stud 176 carried by the bracket 174. A release dog 177 is pivoted to the lower end of the lever 175 by means of a stud 178. A spring 179, anchored to one end of the dog 177 and to a leg 180 of the bracket 174, normally holds a pin 181 in the outer end of said dog against a stop notch 182 formed in the leg 180. Whenever the lever 173 is moved forwardly in Fig. 19 by the bail 171 as a consequence of the operation of one of the release levers 168, the dog 177 is moved to the left in Fig. 19. By a clockwise pivotal movement of lever 175 on the stud 176 and a resulting movement of the dog 177, the ratchet 148 is moved in a counterclockwise direction relative to the ratchet 149 (Fig. 19).

Through the cooperation of the pin 155 on ratchet 148 with the lug on lever 153, and the cooperation of pin 152 with the slot in the dog 150, the latter is lifted out of engagement with the teeth of ratchet 137, thereby permitting said ratchet to be moved independently of the ratchet 149. Thus the carriage may be moved by hand or by the power operated return mechanism without disturbing the escapement mechanism and without the escapement mechanism interfering with the movement of the carriage.

*Carriage return*

The dog 177 is operated automatically whenever the usual power operated return mechanism operates to return the carriage prior to writing a new line. In the "International" electric writing machine, the carriage is returned by power mechanism very similar to one described in Patent No. 2,294,722 under control of a carriage return key. This mechanism is not shown in any great detail in the present case, because it is not directly involved in the operation of the invention claimed hereinafter..

A longitudinally yielding lever 189 (carried by the bracket 221) ultimately controls the release of the carriage return clutch, when a hooked end 194 of said lever 189 is engaged by the left hand marginal stop 190 carried by the usual marginal stop rack 191 mounted on the carriage. Through an arm 192 and a link 193, which interconnects said arm 192 with the lever 173, the dog 177 is operated to disengage the dog 150 from the ratchet 137. During a carriage return operation, the ratchet 137 rotates in a clockwise direction (Fig. 18) whereby, if the dog 150 were not released a clicking noise would result which is undesirable as it renders the operation of the machine noisy.

When the carriage approaches its left hand marginal position, the left hand marginal stop 190 strikes the hooked end 194 of the lever 189 and pulls said lever 189 to the left in Fig. 19 whereby the linkage system and its associated cam is operated to disengage the carriage return clutch (Fig. 22) as will be explained in greater detail at a later point herein. The dog 177 is then restored by spring 179 to the position shown in Fig. 19.

As noted hereinbefore, the return of the carriage is under control of a friction clutch and carriage return tape reel on one end of the power roll drive shaft. This mechanism is illustrated in detail, Fig. 22. The toggle mechanism is operated by the carriage return cam controlled by its key lever, and the cam immediately returns to normal position even though the toggle may be locked in its straightened position to hold the clutch engaged. At the end of the carriage return movement, the carriage margin stop 190 engages and moves the lever on the frame which in turn trips the cam to furnish the power for disengaging the clutch by breaking the toggle. This provides a closer control of the carriage and allows the clutch to slip momentarily while the cam is operating to disengage the clutch, thereby permitting the rebound force of the carriage to be dissipated before the clutch is disengaged. The carriage return tape reel, the clutch and its operating toggle is shown in Fig. 22 of the drawings wherein an extension 21a of the power roll shaft is journalled for rotation in the side member of the frame casting 10. The shaft 21a extends laterally beyond the outer face of the frame casting 10 where it rotatably carries the carriage return ribbon reel 196a. Immediately adjacent the reel 196a is a clutch disc 197a which is pinned to the shaft 21a for rotation therewith. In the normal non-operative position of the clutch, the adjacent face of the clutch disc 197a has little or no operative influence on the confronting flange 198a of the reel 196a. The opposite face of the clutch disc 197a is adapted for contact by an axially slidable plate 199a so that when pressure is applied to move the plate 199a inwardly against the clutch disc 197a a driving connection will be established between the confronting faces of the clutch disc 197a and the flange 198a of the carriage return tape reel.

Clutching pressure is transmitted to the plate 199a through a sleeve 200a, the outer end of which is engaged by the end of a toggle arm 201a. The toggle arm 201a is pivoted to a downwardly extending leg 202a constituting a part of a bracket 203a which is attached to the outer surface of the frame casting 10. The toggle arm is pivoted to the downwardly extending leg 202a by means of a pivot stud 204a, this pivot being established near the lower end of the toggle arm 201a. The upwardly extending portion of the toggle arm 201a has formed therein a U-shaped portion 205a, the bight of which is threaded to receive an adjusting screw 206a. The extreme upper end of the arm 201a is notched to receive one end of a spring 207a which has its other end anchored to the frame casting 10. Thereby, the toggle arm 201a is retained in normal operative relation with a second link 208a of the toggle system, this link also having its lower end pivoted on the pivot stud 204a. The rear edge of the link 208a is embraced by the U-shaped portion of the toggle arm 201a, and the adjusting screw 206a bears against that edge of the link. The link 208a has a forwardly extending portion 209a to which is pivoted one end of a short link 210a, the other end of said link being pivoted to an arm 211 which is adapted to rock on a pivot pin 212. The arm 211 has a forwardly projecting finger 213 adapted to engage the forwardly extending portion 209a of the lever 208a at a point below its pivotal connection with the short link 210a. As a consequence, the upward movement of the arm 211 is limited. An operating lever 214 is mounted to rock on the pivot stud 212, the pivot stud 212 being carried by an inwardly projecting portion 215 of the supporting bracket 203a. The operating arm 214 has a laterally extending flange 216 which is adapted to contact the upper edge of the inwardly extending bracket portion 215, thereby limiting the rocking motion of the operating lever 214 in a clockwise direction about its pivot pin 212. The arm 211 has an inwardly projecting flange 217 which underlies the bottom edge of the operating lever 214.

The operating lever 214 is provided at its inner free end with an eye 218 to which the cam controlled carriage return linkage is connected. Thus, upon operation of the carriage control cam the operating arm 214 will be drawn downwardly, thereby rocking the lever 211 in a counterclockwise direction through engagement of the lever 214 with the inturned flange 217 of the lever 211. This will be effective to straighten the toggle connection between the lever 211 and the inturned portion 209a of the lever 208a. The lever 208a will consequently be rotated in a clockwise direction, and by virtue of the previously described connection between the lever 201a and the lever 208a, the lever 201a will be rocked in a clockwise direction about its pivot 204a. This movement it will be observed is transmitted by the lower end of the lever 201a through the sleeve 200a and to the pressure plate 199a with the consequent coupling of the clutch disc 197a and the reel flange 198a to cause the reel 196a to rotate and wind the carriage return tape thereon.

The terminal member of the aforementioned stop lever linkage for disengaging by breaking the clutch toggle system is diagrammatically illustrated in Fig. 22 as a pivoted bell crank 219, the foot 219a of which is adapted to engage the bottom edge of the inturned flange 217 of the lever 211. It is clear from the foregoing description how the clockwise motion of the lever 211 will break the toggle system thereby permitting the toggle arm 201a to move in a counterclockwise direction about its pivot to release the clutch disc 197*a*. A more specific understanding of the several cam controlled operating linkage systems bearing on the engagement and disengagement of the clutch will be acquired as the description of the machine proceeds.

As intimated in the foregoing paragraph once the carriage return clutch toggle has been straightened and the clutch has been engaged for returning the carriage, it is necessary to provide means for breaking the clutch toggle and for disengaging the clutch. Herein the mechanism includes cam controlled levers and links shown in Fig. 25 of the drawings. When the hooked end 194 of the lever 189 (Fig. 19) is engaged by the margin stop 190 the lever 189 is drawn to the left with the result that the end 249*a* of the finger 249 which engages in a notch in the top edge of the lever 189 is rocked in a counterclockwise direction (Fig. 27). This causes the arm 251 to be similarly rotated, thereby pushing the link 252 to the right in Fig. 25, thus rocking the trip lever 253 for the trip cam unit in a clockwise direction. This causes the trip cam unit to be operatively coupled to the power roller 21. As a consequence the cam trip unit is rocked clockwise, thereby drawing down the link 254 and rocking the lever 255 in a clockwise direction. This draws the link 256 to the right in Fig. 25 and rocks the arm 257 (Fig. 26) in a counterclockwise direction. The arm 257 is connected to a bell crank lever 800 (Fig. 20). The opposite arm of the bell crank lever 800 has a link 801 connected thereto. The link 801 is attached to a lever 802 that is pivoted on a pin 803. One end of a clutch release link 185 is attached to the free end of the lever 802, the other end of the link 185 being pivoted to a bell crank 184. The bell crank 184 has pivoted thereto the rear end of the clutch reelase rod 183 and the opposite end of the release rod 183 is attached to the top of a bell crank 219 (Fig. 22). It will appear from the foregoing, therefore, that when the lever 189 (Fig. 19) is pulled to the left by engagement with the margin stop 190, the trip cam linkage (Fig. 25) is operated and it, through the intermediate link and lever system, including bell crank 800, link 801, lever 802 and the clutch release linkage 183, 184 and 185, will pull rearwardly on the top of the bell crank 219 (Fig. 22) and rock it about its horizontal pivot to lift its forwardly extending arm 219*a* into engagement with the inturned flange 217 of the toggle lever. This will serve to rotate the toggle lever 215 about the pivot 212 in a clockwise direction, thereby breaking the toggle link and permitting release of the clutch disc 197.

*Tabulating mechanism*

The tabulating mechanism is best shown in Figs. 23 and 24. Pivoted on a stud 220 carried by the extension 221 (Fig. 21) is the tabular lever or counter-stop 222 (Figs. 22 and 23), which extends horizontally parallel with the lever 189 (Fig. 19) and is provided with a tooth 223 normally out of the path of movement of the tabular stops 224. Also pivoted on the stud 220 is an operating lever 225 which has one arm extending almost straight downwardly and provided with a pin 226 in the plane of an arm 192 pivoted on a stud 187. The latter is carried by a bracket secured to the underside of the frame. A spring 229, connected to the arm 192 and to a fixed pin 230, holds the arm 192 in contact with pin 226. The arm 192 is connected by the link 193 to the lever 173 pivoted on the top of the rear rail. The lever 173 cooperates with the edge of the arm 175 and is operated by the carriage release levers which are mounted in the carriage, heretofore described.

Whenever the arm 225 is rocked clockwise (Figs. 19, 23 and 24), the pin 226, engaging the arm 192, will cause the latter to rock counterclockwise, thereby pushing the link 193 to the left and operating the arm 173. The arm 173, in turn operates the arm 175 to disengage the pinion 148 from the escapement mechanism, this operation being required during tabulating operations in order to release the carriage for free running movement by the spring motor 159.

The lever 226 is resiliently connected to the lever 222, whereby the foregoing movement of lever 225 also causes the lever 222 to be rocked clockwise to elevate the lug 223 into the path of a tabular stop 224. For this purpose, the horizontal arm of the lever 225 has a short downward extension provided with a pin 232 connected by a spring 233 to a pin 234 on the lever 222. A guard plate 235 is loosely pivoted on the pin 234 and slotted to embrace the pin 232 and is placed between the extension of the arm 225 and the spring 233. Opposite the front or upper face of the lever 222, there is provided a similar spring which, with spring 233, causes the levers 222 and 225 to normally move in unison. If the tooth 223 should strike the lower edge of a column stop 224 when the lever 225 is rocked clockwise, springs 233 stretch and prevent damage to any of the parts.

The lever 225 is pivotally connected at 236 to a link 237 (Figs. 23 and 24), having its lower end pivotally connected at 238 to a bell crank 239 (Fig. 25). The downwardly extending arm of the bell crank 239 is connected by a long link 240 to a rock lever 241 pivoted on the rod 30 which fulcrums the key levers including the tabulating key TK. The lever 241 is connected by a short link 242 to a conventional cam unit of the single-lobe type pivotally mounted on the rod 32. The cam unit cooperates with the usual power roller 21. The cam unit is controlled in a well known way by the tabulating key TK which, when depressed by the operator, causes the cam unit to be actuated by the power roller in a well known way, thereby rocking the cam unit in a clockwise direction. This results in drawing down the link 242, rocking the lever 241 clockwise, and drawing the link 240 to the right in Fig. 25, thereby rocking the bell crank 239 counterclockwise on its pivot 243. Link 237 is thus drawn downwardly depressing the right hand end (Figs. 23 and 24) of the horizontal arm of the lever 225. The arm 192 is operated as described above to free the carriage from the escapement mechanism and, at the same time, the lever 222 is rocked clockwise to elevate the lug 223 into the path of the nearest stop 224 immediately to the left of the lug 223.

When operated in this fashion, the lever 225 is latched to hold the lug 223 in the path of the column stop 224. As best shown in Fig. 26, there is provided a latch 244 pivoted on a stud 245 carried by the frame extension 221 and urged in a clockwise direction by a spring 246 which is anchored to a bracket 247 secured to the frame extension 221. Normally the latch 244 bears against the rear face or side of the lever 225 but, when the latter is operated as described above, it snaps over the upper edge of the lever 225 and thereby prevents said lever from returning to the position of Fig. 23. When the lever 225 is rocked as described above, a spring 248 connected to the pin 226 and to the same pin on bracket 230, tends to restore the levers 222 and 225 as a unit to the position of Fig. 23 but the latch 244 prevents this from taking place. Thus, the counter-stop 222 is maintained in the operative position in the path of the column stop 224 until the movement of the carriage brings the column stop into engagement with the lug 223.

The lever 222 is slotted horizontally at the point where the stud 220 passes through and normally the lever 222 occupies the left hand position of Fig. 19. The lever 222 is held in this position by means which include the finger 249 (Figs. 21, 27 and 28) secured to the upper end of a stub shaft 250 which is rotatably mounted in a horizontal portion of frame extension 221 (Fig. 21). Fixed to the lower end of the stub shaft 250 is an arm 251 connected by a link 252 to a trip lever 253 pivoted on the rod 30. This trip lever extends downwardly and at its lower end is shaped like that portion of a key lever which cooperates with the release lever of a cam unit and controls a trip cam unit (Fig. 25) in the well known manner. The trip cam unit is similar to the other cam units, and it is connected by a link 254 to a rock lever 255 somewhat similar to the rock lever 242. The rock lever 255 is connected by a horizontal link 256 to an arm 257 journalled on the stud 245 and engaging a bent-over lug 258 in the latch 244. A torsion spring 259 (Fig. 21) connected to the arm 251 and to a collar 260 secured by set screws to the shaft 250, tends to urge the shaft 250 and finger 249 in a clockwise direction with reference to Figs. 27 and 28, thereby holding lever 222 in its left hand position as shown in Fig. 19.

When the column stop 224 strikes the lug 223, it moves the lever 222 to the right in Fig. 28, thereby rocking the finger 249 in a counterclockwise direction (Fig. 28). This causes the arm 251 to be similarly rotated, thereby pushing the link 252 to the right in Fig. 25, thus rocking the trip lever 253 for the trip cam unit in a clockwise direction. This causes the trip cam unit to be operatively coupled to the power roller 21 in a well known way. As a consequence, the trip cam unit is rocked clockwise, thereby drawing down the link 254 and rocking the lever 255 in a clockwise direction. This draws the link 256 to the right in Fig. 25 and rocks the arm 257 (Fig. 26) in a counterclockwise direction, also, through the lug 258, rocking the latch 244 to disengage it from the depressed horizontal arm of lever 225. This permits the levers 222 and 225 to rock counterclockwise (Fig. 23) under the influence of spring 248, thereby removing lug 223 from engagement with the column stop.

In light of the fact that the machine is designed to space units as small as $\frac{1}{45}$ of an inch, it is of course quite important that carriage rebound upon tabulating movement thereof be minimized or avoided entirely. In order that the carriage rebound may be kept within very narrow limits, there has been provided a latch lever 810 shown in Figs. 19*a* and 19*b*. The latch lever is mounted for rocking movement on an eccentric sleeve 811 of a hexagonal spacer 812 which is secured by the screw 813 in bracket 221. The free end of the lever 810 is formed with an upwardly opening hooked portion 814 which is positioned substantially flush with the upturned end of the lever 222. The hooked end of the lever 810 has an external surface 815 which engages the tabular stops 224, thereby camming the lever 810 downwardly against the tension of a spring 816 which interconnects the levers 222 and 810. As the carriage proceeds in its tabulating movement the tabulating stop 224 engages the upturned end 223 of the lever 222 and moves such lever to the right as viewed in Figs. 19 and 19*b*. This movement of the lever 222 exposes the hooked portion 814 of the lever 810 and permits such portion to engage behind the tabular stop 224 as the free end of the lever is drawn upwardly behind the tabular stop under the influence of the spring 816. It will be noted that under such conditions the hooked end 814 of the lever 810 engages one face of the tabular stop 224 while the outer upturned end 223 of the lever 222 engages the opposite face of the tabular stop 224. By this means the carriage is afforded positive security against movement in either direction once the tabulating operation has been effected. It follows, therefore, that any carriage rebound is effectively avoided.

In the normal operation of the carriage return there is a line spacing operation of the platen as hereinabove described. The return of the carriage involves the tripping of a carriage return cam and the operation of a carriage clutch release cam. Since in the carriage return structure heretofore described there is no provision for tripping the carriage return clutch release cam a second time, there has been provided special mechanism which permits successive line spaces under the control of the carriage return clutch without the accompanying movement of the carriage; withal, there has been provided means for releasing the carriage return clutch after each such succeeding line spacing operation without resort to the carriage return clutch release cam which is effective during the initial line spacing operation which takes place at the return of the carriage.

Reference to Fig. 20 will perhaps best illuminate the mechanism which is operative upon second and subsequent line spacing operations when the carriage is in its returned position. A lever 820 is pivoted adjacent the lever 802 on the pivot pin 803. The downwardly extending leg of the lever 820 is connected to the lower end of the lever 802 by means of a spring loop 821 which has one end anchored to a pin 822 extending laterally from the lower end of the lever 820, and the other end of the spring 821 is anchored on a stud 823 extending laterally from the lower end of the lever 802. An upper leg of the lever 820 has pivoted thereto an angular shaped catch 824 which is normally held against a shoulder 825 formed in the upwardly extending portion of the lever 820, the force for holding the catch 824 in that position being provided by a spring 826 which has one end attached to the catch and the other end to a pin 827 extending laterally from the lever. The catch 824 has an inturned horizontal lip 828 which normally lies in the path of the margin stop 190. During the return of the carriage the margin stop 190 will engage the inturned lip 828 of the catch 824 and will rock the catch in a counterclockwise direction, thereby simply moving it out of the way so that the margin stop may engage the end of the lever 189 to effect operation of the carriage return clutch release cam as hereinbefore described. At such time the catch 824 will return to its normal position against the stop shoulder 825 and when in such position the horizontal lip 828 thereof will underlie the margin stop 190.

From the foregoing it follows that the lever 820 will be inhibited against rocking about its pivot pin 803. If, therefore, under such conditions the carriage return key is again depressed, the carriage return clutch will be engaged as heretofore described in connection with the return of the carriage. Since, however, the lever 820 is locked against movement, the carriage return clutch toggle linkage will be straightened under the influence of the carriage return control cam and the link 185 will be drawn to the left in Fig. 20 against the tension of the bow spring 821. At such time the carriage return clutch will be engaged and the tape reel 196*a* will be rotated sufficiently to effect a line spacing operation as hereintofore described.

The carriage return clutch toggle linkage will be broken immediately after its control cam has been operated by the expanding action of the bow spring 821 against the locked lever 820, this tending to move the lever 802 to the right in Fig. 20. The movement of the lever 802 results in drawing the link 185 to the right in Figs. 19 and 20 with the consequent operation of the finger 219 (Fig. 22) and the breaking of the clutch toggle linkage in a manner similar to that described in connection with the return of the carriage.

Back spacing of the carriage is under the influence of a back spacing cam which is not shown since it is identical in structure and function with the cams already described. Herein it is sufficient to say that when the back space key is depressed the associated cam will be released into contact with the power roll 21 and a link 830 (Figs. 14 and 19) will be drawn forwardly. The link 830 is connected to a bell crank 831 which is mounted for rocking motion about a stud 832 supported in the rail 129. One leg of the bell crank 831 is connected to a link 833 and the latter has its opposite end connected to a ratchet 834 (Fig. 14) which is mounted on the casting 127 adjacent the gear 137. Each time the linkage system now described is operated by its operating cam, the ratchet 834 is carried into engagement with the teeth of the gear 137 and moves said gear the space of one tooth in a retrograde direction to effect back spacing of the carriage.

The automatic control of the machine requires that certain control contacts be opened each time the carriage is returned or the carriage is back spaced. The contacts in question are the carriage return contacts CRTC (Fig. 19) and the back space contacts BSC (Fig. 14). By first referring to Fig. 19 it will be seen that the contacts CRTC are under the immediate control of a contact operator 850 which is under the influence of a stud 851 extending from a face of the plate 186, the plate 186 being pivoted on the pivot stud 187. The normal resilience of the movable leaf of the contact CRTC holds the contact closed and holds the plate 186 in its extreme clockwise rotative position. The lever 192 carries a pin 852 which engages the right hand edge of the plate 186 and which is effective, therefore, when the lever 192 is rocked in a counterclockwise direction during carriage return to rock the plate 186 in a counterclockwise direction about its pivot 187, with the result that the contact CRTC is broken.

By reference to Fig. 14 of the drawings it may be observed how the contact BSC is opened during back spacing movement of the carriage. The bell crank 831 has a stud 860 extending from a face thereof and this stud engages and operates a contact operating link 861, one end of the link 861 being connected to the movable leaf 862 of the contact BSC. Each time, therefore, that the link 830 is drawn forwardly and the bell crank 831 is rocked about its pivot 832 in a clockwise direction, the contact operating link 861 will be moved to the right with the result that the contact BSC will be opened.

It has been generally stated hereinabove that during carriage return the lever 173 is rocked to engage the lever 175 for the purpose of disconnecting the escapement clutch during such return movement. It is now possible to trace the specific mechanism by which this function is performed. The lever 820 (Fig. 20A) has a laterally spaced, generally rearwardly extending finger 870 from the face of which extends a stud 871. The stud 871 and the stud 852 extending from the outer face of the lever 192 (Fig. 20A) are interconnected by means of a loop 872. Consequently, when the connected levers 802 and 820 are rocked about the pivot pin 803 by movement of the link 185 to the left in Fig. 19, such motion is imparted to the lever 192 because of the pin and loop connection just mentioned. The lever 192 will rock about its pivot 187 in a counterclockwise direction, thereby moving the link 193 to the left in Fig. 19 and rocking the lever 173 into engagement with the lever 175 with the result that the escapement clutch mechanism is disengaged.

It is contemplated that the carriage return contact CRTC be opened also during tabulation and during extra line spacing operation when the carriage has been fully returned.

During tabulation it will be remembered the bell crank 239 will draw the right hand end of the lever 222 downwardly with the result that a downwardly extending portion 873 of that lever will be rocked in a clockwise direction. The free end of the downwardly extending portion of the lever 873 has a pin 226 which is adapted to engage the right hand edge of the lever 192, thereby rocking the latter lever in a counterclockwise direction and engaging the pin 852 thereon with the right hand edge of the plate 186. This will result in the counterclockwise movement of the plate 186 and the resultant opening of the contact CRTC through downward movement of the operating link 850.

Provision has also been made for opening the contact CRTC during extra line spacing operations when the carriage is in its returned position. In connection with such line spacing operations described before, it has been explained how the lever 820 is locked against movement by engagement between the latch 828 and the lower face of the margin stop 190. In such case only the lever 802 can be rocked about its pivot 803 and accordingly there has been provided a laterally spaced and generally downwardly extending finger 875. The finger 875 extends into the path of a pin 876 which is carried by and extends from the rear face of the plate 186. It follows, therefore, that when the lever 802 is rocked in a clockwise direction about its pivot 803 under the force of the link 185, the finger 875 of said lever will rock into engagement with the pin 876 and thereby rock the plate 186 about its pivot 187 in a counterclockwise direction, thereby opening the carriage return contact CRTC.

*Code selector unit*

Figure 51A:
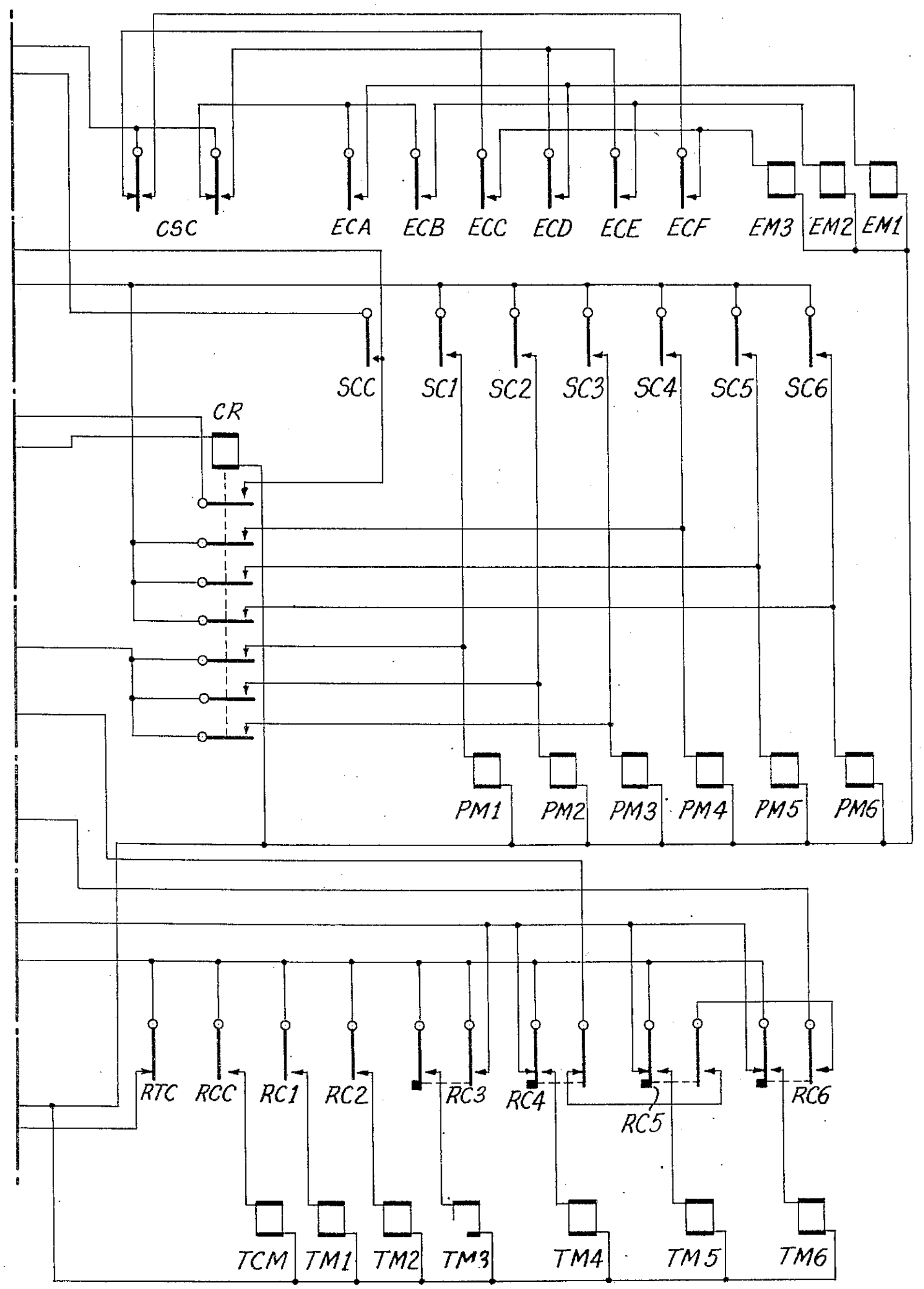

The operation of the punch 15 is also under control of the code selector unit. It will be appropriate at this time, therefore, to describe the manner in which the code selector unit controls not only the letter spacing magnets EM1, EM2 and EM3, but also how it controls the punch magnets PM1, PM2, PM3, PM4, PM5 and PM6 (Fig. 51A). The code selector unit 13 is shown best in Figs. 29 through 32. The unit is operated upon the actuation of each of certain keys of the main keyboard, to energize the punch magnets PM1–PM6, inclusive, singly and in combination so as to punch in a tape the code designation which corresponds to the particular key actuated.

The code selector unit 13 comprises a frame structure which is removably mounted at the base of the machine as shown in Fig. 3, and a plurality of selector slides 261 and 262 are mounted, respectively, for longitudinal sliding movement in the frame structure. The slides 261 and 262 correspond, respectively, to the keys of the keyboard which control the punch 15.

As explained previously, each time a key is depressed, a related one of the cam units 12 is tripped and the cam 31 of the tripped unit then engages the constantly rotating power roller 21. As a result such cam unit is rocked first away from the power roller 21 and then back toward the power roller and relatched in the position shown. The relationship of the several cam units 12 with respect to the power roller 21 is indicated in Fig. 3. The cam units 12 appearing to the right of the roller in Fig. 3 are referred to herein as front cam units and the units appearing to the left of the roller in Fig. 3 are referred to herein as the back cam units.

Each cam unit 12 which is tripped by a key of the main keyboard has a downward extension 263 carrying a pin 264 and each time such a cam unit is tripped and is operated, its pin effects a sliding movement of a corresponding one of the selector slides. The pins 264 engage upstanding lugs 264a at the forward end of the slides, whereby the slides are adapted for reciprocation by their related cams 31. The selector slides 261 are those which are operated by corresponding front cam units and the slides 262 are those which are operated by corresponding rear cam units. As the cam units 12 are arranged in staggered relation along the power roller 21, the slides 261 and 262 will be arranged alternately in the frame structure, as shown in Fig. 29. The frame structure for the selector unit includes a front guide comb 265 and a rear guide comb 266 and the selector slides are mounted, respectively, in aligned slots 267 formed in the two combs and are supported therein by suitably mounted antifriction rollers 268 (Figs. 30 and 31). A stop plate 269 overlies the front comb 265 and cooperates with spaced lugs 270 and 271 on the selector slides to limit the longitudinal sliding movement of the latter. Tension springs 272 (Fig. 29) connecting pins 273 projecting from adjacent slides 261 and 262 serve to urge such slides against the stop plate 269 and thereby maintain the slides in their respective positions shown. From the foregoing it will be apparent that each time a slide 261 (Fig. 29) is operated by its related front cam unit 31, it will be moved lengthwise forwardly of the machine and will be returned by the spring 272 attached thereto and that each time a slide 262 (Fig. 29) is operated by its related back cam unit, it will be moved rearwardly thereby and will be returned to the position shown by its spring.

The sliding movement of the selector slides 261 and 262, which results from each operation of their related cam units 31, provides for the energizing of the six punch selector magnets PM1 to PM6, inclusive, and also provides for energizing the punch clutch magnet PCM. This control of the punch by each of the selector slides is effected by the permutative closing of six selector code contacts SC1 to SC6, inclusive (Fig. 29) and by the closing of the common contact SCC. The code contacts SC1 to SC6, inclusive, control, respectively, the energizing of the punch magnets PM1 to PM6, inclusive. These code contacts SC1 to SC6, inclusive, are operated, respectively, by corresponding bails SB1 to SB6, inclusive. The common contact SCC is operated by a corresponding bail SBC.

As shown in Fig. 29, the bails SB1 to SB6, inclusive, and SBC are arranged in horizontally spaced relation and each such bail comprises a bail element 274 extending transversely through aligned elongated slots 275 formed in all of the selector slides. Each bail element 274 is connected at its two outer ends to supporting arms 276 and 277, respectively, the arm 276 being secured at its outer end to a pivot pin 278 carried by one frame 279, and the arm 277 being mounted on a pivot projection 280a extending from a bail shaft 280 which extends through aligned openings in the side frame plate 281 and in a vertical flange 282 of a frame plate 283. A yoke 277a, attached to the inner end of the shaft 280, connects the arms 277 with their respective bail shafts 280. An inturned portion of the yoke 277a embraces the arm 277, as best shown in Fig. 32, and provides a positive operating connection between the parts. The right hand end of each bail shaft as viewed in Fig. 29, extends outwardly of the flange 282 and an upstanding contact actuating element 284 is fixed thereto in position to close the corresponding set of contacts of the group SC1 to SC6, inclusive, and the contact SCC.

The bottom of the slot 275 of each of the selector slides 261 and 262 is formed with upstanding cam projections 285 which are permutatively located on the several selector slides and operate corresponding ones of the bails SB1 to SB6 and the bail SBC. Each cam projection 285 functions to cam upward a related bail element when the selector slide on which the cam projection is located is moved lengthwise by the operative movement of its corresponding cam unit 31, and the upward movement of each such bail element results in rotating the related bail shaft 280 to close the related set of selector code contacts of the group SC1 to SC6, inclusive, and the contact SCC.

Each of the selector slides 261 and 262 is provided with a cam projection 285 for raising the bail SBC and closing the common contact SCC each time such slide is operated. The cam projections 285 for operating the remaining bails SB1 to SB6, inclusive, are so located on each selector slide that they provide, when such slide is operated, for the closing of those code contacts of the group SC1 to SC6, inclusive, which correspond to the code hole positions for representing the character or functional operation corresponding to the character key which was actuated to operate such slide. Each selector slide is originally formed with lower cam projections 285 and the projections not to be used are removed by any suitable means. The respective positions of the cam projections which have been removed in the slide 261 of Fig. 30 are indicated by dotted lines.

It is noted that the slide 261 of Fig. 30 contains cam projections which will operate the bails SBC, SB4 and SB6, and the latter will therefore close the related contacts SCC, SC4 and SC6, respectively, when such slide is operated. From the previous description, it will be obvious that the closure of such contacts will energize the punch clutch magnet PCM and the punch selector magnets PM4 and PM6 and thereby operate the punch 15 to punch the 4—6 code designation in the tape. As shown in Fig. 52, the 4—6 designation represents the period.

The foregoing is a description of how the selector unit operates to select the proper punches for punching a code in a tape in response to the depression of either a character key or a functional key on the keyboard of the machine. It will be remembered that it was generally stated hereinbefore that the selector slides are also operative to energize the letter space selecting magnets EM1, EM2 and EM3. The following will, therefore, be an explanation of the structure resulting in these functions. Each of the selector slides 261 and 262 (Figs. 30 and 31) supports a second tier of bails *286a*, *286b*, *286c*, *286d*, *286e* and *286f*. These bails are supported in notches 287 which correspond in their general nature and function to the notches 275 heretofore described. Associated with certain of the bails *286a–286f*, inclusive, are cam surfaces 288 which are permutatively arranged in fashion similar to the cam surface 285 described in connection with the punch selection bails.

Since the escapement mechanism of the machine is under the control of three magnets EM1, EM2 and EM3, respectively, of one, two and three units of spacing, it is essential of course that these magnets be energized singly or in combination to obtain a letter space which is proportional to the unit width of the letter being struck. Accordingly, the bails *286a*, *286b* and *286c* control the closure of bail contacts ECA, ECB and ECC. These contacts are operative during the operation of the machine when the type basket is in lower case position. The bails *286d*, *286e* and *286f* control the closure of contacts ECD, ECE and ECF. These contacts are operative during operation of the machine when the type basket is in upper case position. A switch CSC (Figs. 4 and 5) which is operated by the shifting movement of the carriage selects either the lower case contacts ECA, ECB and ECC or the upper case contacts ECD, ECE and ECF depending on the position of the type basket.

*Tape punch and translator clutch*

The operation of the code translator 14 and the operation of the tape punch 15, both to be described presently, is each under the control of an electromagnetic clutch. The clutch as it applies to the translating mechanism is shown in Figs. 33 and 34, while its application to the tape punch is shown generally in Fig. 36 and Fig. 47. In each of these instances the electromagnetic clutches are identical in structure, and a specific understanding thereof may be attained by reference to Figs. 33 and 34. In these figures the shaft 289 may represent the cam shaft of either the code translating unit or the tape punching unit. The shaft 289 has provided a pair of bearing hubs 290 and 291 which are adapted for the free rotational support of the drive gear 292 (which may be either the drive gear for the translator unit or the tape punch) the latter having a hub extension 293 in contact with the outer bearing 291. The outer end of the shaft 289 is fitted with a bearing sleeve 294 which is affixed for rotation therewith by means of a set screw 295. The bearing sleeve 294 has an inwardly extending hub 296 of reduced diameter to which is fixed a sleeve 297 by means of a set screw 298. The sleeve 297 anchors one end 299 of a helically wound expansion clutch spring which is wound to surround the inwardly extending gear hub 293, as well as to surround a portion of sleeve 297 which is of the same diameter as the gear hub 293. The opposite end 300 of the clutch spring 301 is anchored on a sleeve 302 which is mounted in a recess formed in the gear hub 293 and in the sleeve 297. The gear 292 is constantly driven while the machine is in operation, and its power is transmitted to the shaft 289 because the clutch spring 301 normally grips the gear hub 293.

When it is desired to disconnect the shaft 289 from the gear 292, it is merely necessary to block rotation of the sleeve 302 whereby continued rotation of the sleeve 302 will expand the clutch spring 301 to release its grip on the gear hub 293 and the sleeve 297. The outer peripheral surface of the sleeve 302 has a latch shoulder 303 (Fig. 34) extending in an axial direction thereon, and when this shoulder is engaged by an armature 304, the sleeve 302 is held against rotation of an electromagnet 305. When the magnet 305 is energized, the armature 304 will be attracted thereto, thereby permitting rotation of the sleeve 302 under the influence of the spring 301, contraction of the clutch spring 301 into contact with the gear hub 293 and sleeve 297 and the consequent rotation of the shaft 289 with the gear 292.

The outer peripheral face of the sleeve 294 also has an axially disposed latch shoulder 306 formed thereon which is provided for engagement by a pivoted latch *306a*, the latch being pivoted on the magnet yoke 308 by means of a laterally extending pivot pin 309. The latch *306a* is normally urged in a clockwise direction by means of a spring 310 which has one end attached thereto and the other end to an anchor pin 311 extending from the magnet yoke 308. By reference to Fig. 46 the foregoing arrangement will be clear as well as the fact that the armature 304 is also pivoted on the pivot pin 309 and that it includes a rearwardly projecting extension 312 to which one end of a spring 313 is attached, the other end thereof being attached to a stud 314 extending inwardly from the magnet yoke 308.

From the foregoing it will be seen that both the armature 304 and the latch *306a* are spring-pressed into engagement with their respective latch shoulders 303 and 306. It will also be seen that the latch shoulders are so disposed in relation to the direction of rotation of the parts that the armature 304 prevents clockwise rotation of the sleeve 302 while the latch *306a* prevents counterclockwise rotation of the sleeve 294.

When the magnet TCM, as in the case of the translator, or the magnet PCM, as in the case of the punch, is deenergized, the armature 304 will be pulled down into contact with the sleeve 302 and will block rotation of the sleeve as soon as the end of the armature and the latch shoulder 303 come into contact with each other. The momentum of the shaft 289 will tend to cause some additional rotation which would result in recoil were it not for engagement of the latch *306a* with the latch shoulder 306. The latch shoulder 306 is so positioned in respect to the end of the latch *306a* that engagement between the armature 304 and the latch shoulder 303 is effected before the latch shoulder 306 passes beyond the end of the latch *306a*. After the latch shoulder 306 is carried beyond the end of the latch *306a* under momentum of the shaft 289, the recoil of the shaft is dampened by engagement between the latch *306a* and its related latch shoulder 306 as the shaft begins its retrograde movement under the normal tension of the clutch spring 301. The spring will, therefore, be expanded beyond its normal diameter to hold it free of the drive hub 293.

*Tape punch*

The tape punch 15 (Figs. 35, 36, 37, 38 and 39) is a power driven unit, removably mounted at the left hand rear portion of the main frame 10. A normally stationary rotary cam shaft 315 makes one revolution under control of the magnetically operated clutch hereinabove described and illustrated in Figs. 33 and 34 for each punch cycle. A tape from a supply spool 316 (Fig. 2), removably mounted at the rear of the machine, passes over the top of the punch unit 15, and the holes are punched upwardly at the front of the unit for convenient manipulation and observation of the tape by the operator. The tape is fed for spacing of the holes by a pin wheel during each punch cycle, and the pin wheel may be manually turned to move the tape in either direction. The tape may be easily inserted edgewise into the punch.

The selector contacts SC1 through SC6 select the code holes to be punched in the tape by energizing the associated ones of the six punch magnets PM1 through PM6, which, by attracting their armatures, release corresponding punch lever latches. The punch clutch magnet is jointly controlled by a contact operated by the releasing of any one or more of these latches, and by the common selector contact SCC. During the initial part of the punch shaft rotation, the latches which were released are locked in their released position, and the ones which were not released are locked in their normal position.

As stated hereinabove, the structural details of the tape punch 15 are shown in Figs. 35 to 39, inclusive. As shown, the punch comprises six vertically arranged code hole punches CP1 to CP6, inclusive, which correspond, respectively, to the six code hole positions of the code system employed. As shown in Fig. 36, the vertical code punches are arranged beneath and in a transverse row across the tape punching station where the coded data is recorded. The punch 15 also comprises a vertically disposed feed hole punch FP which is located between the code punches CP3 and CP4, and which functions during each operating cycle of the punch to punch the relatively small tape feed holes which are located in all record columns of the tape and which are engaged by the tape feed pins.

As shown in Figs. 35 and 37, the code punch CP1 is mounted for vertical reciprocatory movement in spaced aligned guide passages 318 in a fixed guide block 319 and in an aligned die opening 320 in a fixed die plate 321. The lower end of the punch CP1 is pivotally connected in a suitable manner to the right hand end of a related punch actuating lever 322, and the lever 322 is pivoted intermediate its ends on a rod 323 which extends transversely of and forms a part of a punch operating frame 324. The operating frame 324 also comprises spaced side arms 325 joined by a spacing sleeve 326 (Fig. 36) and pivotally supported on a transversely extending stop rod 327 which is suitably fixed at its ends to the punch frame structure. The left hand end of the punch lever 322, as viewed in Fig. 37, engages the top of the stop rod 327 when the punch CP1 is in its normal or inactive position shown. It will be appreciated that the remaining code punches CP2 to CP6, inclusive, and the feed hole punch FP are constructed the same as the punch CP1 and are mounted in the same manner in the guide block 319 and die plate 321 and are connected, respectively, at their lower ends to related actuating levers 322. Such related actuating levers are arranged side-by-side in the frame 324 and are pivoted on the transverse rod 323. The ends of all the levers, which are remote from their punches, rest on top of the stop rod 327 with the punches in their normal or inactive position. A tension spring 328 connects the right-hand end, as viewed in Fig. 37, of each punch operating lever to a fixed flange plate 329 and thereby constantly urges the several code punches and feed punch to their inactive or withdrawn positions shown in the drawings.

As shown in Fig. 37, the lower face of the guide plate 321 is spaced from the upper face of the guide block 319 to provide a passage through which a tape is fed lengthwise from left to right. The tape is further guided in its lengthwise movement across the top of the punch by a guide roller 330, shown in Fig. 35. After being punched, the tape passes over a tape feed sprocket 331 having pins 332 fitting within the feed holes formed by the feed hole punch FP. The sprocket 331 is indexed once for each operating cycle of the punch 15 so as to advance the tape to the next blank record column, as will be explained more fully hereinafter.

The punch 15 comprises an operating cam shaft 315 suitably journalled at its ends in the fixed frame structure of the punch and having a plurality of control cams 333, 334, 335 and 336 mounted thereon. Each revolution of the shaft and the cams thereon effects an operating cycle of the punch and each operating cycle is initiated by engaging a punch clutch 337 (Fig. 36) which is the same as the clutch illustrated in Figs. 33 and 44. The clutch 337 connects the constantly running drive gear 23 with the operating shaft 315 for one revolution of the latter and then disconnects the two and stops the operating shaft 315 in its home or inactive position shown in the drawings. The punch clutch is engaged by the energizing of a punch clutch magnet PCM. The structure and mode of operation of the punch clutch 337 has been described in detail hereinbefore.

The cams 335 and 336 are substantially complementary cams and are engaged, respectively, by followers 338 and 339 which are located in spaced relation, as shown in Fig. 35, on the outer end of an arm 325. The follower 339 is a roller carried by the upper fork 325*a* of the arm 325 while the follower 338 is a slight projection on the lower fork 325*b* of the arm 325 (Fig. 37).

From an examination of Figs. 35 and 37, it will be apparent that each time a punch operating cycle is effected by rotating the shaft 315 one revolution counterclockwise, the cam 335 engaging the follower 339 will first move the operating frame 324 upward or counterclockwise about its pivot rod 327, the cam 336 being so shaped as to permit such upward movement. Then, the cam 336 by its engagement with the follower projection 338 will insure movement of the operating frame 324 downwardly under the force of the springs 328, or clockwise, and back to the inactive position shown, the cam 335 being so shaped as to permit such return movement of the frame 324. The identical cams 335 and 336 at opposite sides of the frame 324 insure the even movement of the frame and prevent warping of the frame as it moves up and down. During such upward and downward movement of the frame 324, the rod 323, on which the punch actuating levers 322 are pivoted, is also moved upward and then restored to the position shown. It will be apparent that if, during such movement of the rod 323, the left hand ends of all punch actuating levers 322 are not held down against the stop rod 327, such actuating levers will be moved by the rod 323 clockwise about their pivotal connections with their related punches, the springs 328 being sufficiently strong to hold their right hand ends stationary. On the other hand, if the left hand end of any one of the punch actuating levers is held down against the fixed rod 327, the upward movement of the rod 323 will then effect a counterclockwise movement of the lever, or levers, so held, about the stop rod 327 as a pivot and, in so doing, the punch connected to each lever so held will be moved upward against the force of its spring 328 and through the tape, thereby punching a code hole in the corresponding code position of the tape, in the case of the code punches, and punching a feed hole in the tape in the case of the feed punch.

In the construction shown the lever 322 corresponding to the feed punch FP is permanently held down against the stop rod 327 by the outer end of an arm 340 (Fig. 35), the arm 340 being fixed at its other end to a fixed frame member 341. Thus, for each revolution of the shaft 315, a feed hole will be punched in the tape in the manner explained. The code designations are punched in the tape by the selective latching against the stop bar 327 of the adjacent ends of those actuating levers which are connected to the code punches corresponding to the code positions where it is desired to punch the code holes. Selective latching of the left hand end, as viewed in Figs. 35 and 37, of the six code punch actuating levers 322, against the stop rod 327, is effected, respectively, by the selective releasing of six corresponding latch levers 342. The releasing of the six latch levers is controlled by the selective energization of the six corresponding punch magnets PM1 to PM6, inclusive.

The six latch levers 342 are arranged in side-by-side relation and are pivoted on a transverse fixed rod 343. The upper ends of the six latch levers extend, respectively, through corresponding slots 344 of a comb plate 345 fixed to the frame member 341, and such latch levers are aligned, respectively, with the adjacent ends of their respective code punch actuating levers which also extend through the corresponding slots 344. The six latch levers are each urged clockwise as viewed in Figs. 35 and 37 by tension springs 346 connecting, respectively, projections on the latch levers and the flange of a transverse fixed frame plate 348 (Fig. 35). In the normal or inactive position of the parts as shown, each latch lever 342 of the group is held against clockwise movement by its upper pointed end 349 engaging the right hand end of a latching notch 350 cut in the under face of the pivoted armature 351 of its related selector magnet of the group PM1 to PM6, inclusive. A tension spring 352 holds each armature in the position shown.

When any one of the selector magnets of the group PM1 to PM6, inclusive, is selectively energized, in a manner which will be explained hereinafter, its related armature 351 is attracted and moves upward, thereby releasing its related latch lever 342, and the latter is then moved by its spring 346 clockwise as viewed in Figs. 35 and 37, and to a point where a latching notch 353 on the released latch lever engages over the left hand end of its related punch actuating lever, and thereby holds such engaged punch actuating lever down against the stop rod 327 so that upon subsequent rotation of the operating shaft 315, the cams 335 and 336, through the frame 324, will cause the right hand end of such punch actuating lever to move its related code punch of the group CP1 to CP6, inclusive, upward and punch a code hole in the corresponding code position of the tape, in the manner previously explained.

The selector magnets PM1 to PM6, inclusive, are disposed in staggered relation as shown in Fig. 35 so that such magnets and their armatures are aligned with their related latch levers. The armatures of adjacent selector magnets overlap at their outer ends so that their latching notches 350 are aligned in a transverse horizontal plane when the parts are in the inactive position shown.

During each operating cycle of the punch 15, a cam 354 (Fig. 36) on the punch operating shaft 315 functions to lock those latch levers which have been tripped by their related selector magnets, and also functions to lock the untripped latch levers in their inactive positions so that they cannot interfere with the punching during the same cycle of the selected code combination by the tripped levers. To this end, a latch lock bail lever 355 is rotatably mounted on a transverse rod 356 suitably fixed to the frame structure of the punch and includes a follower arm 357 carrying a roller 358 which is constantly urged against the face of the cam 354 by a tension spring 359 (Fig. 35) connecting the arm 357 with a suitable fixed part (not shown) of the punch frame. The bail lever 355 carries a locking bail 360 extending transversely across the spear-shaped ends 361 of arms 362, the latter being integrally formed, respectively, with the six latch levers 342. As the latch levers 342 are released by their associated magnets, the cams 354 and spring 359 move the locking bail 360 counterclockwise, as viewed in Fig. 37, and toward the ends 361 of the levers 342. As a result of such movement, the locking bail 360 will pass beneath the points of the ends 361 of any untripped latch levers and will engage the lower inclined surfaces thereof and thereby lock such untripped levers in their inactive positions. The ends 361 of any latch levers which have been previously tripped will then be so positioned that the locking bail 360 will pass above the points of such ends and will engage the upper inclined surfaces thereof and thereby lock any such tripped levers in latching relation with respect to their related punch actuating levers.

The cam 363 (Figs. 36 and 38) is the tape feed cam and it functions during each punch operating cycle to advance the tape feed sprocket 331 and tape an amount sufficient to move the punched record column out of punching position and to move a blank record column into punching position. A lever arm 364 carrying a follower roller 365 engaging the feed cam 363 is pivoted to a suitably fixed stud 366 and it has pivoted to its right hand end a feed pawl 367. A stud 368 on the pawl 367 engages an edge of the lever 364 and a tension spring 369 connects the stud 368 and a fixed pin 370 on the lever arm 364. A tension spring 371 urges the follower 365 upward and against the face of the feed cam 363. A ratchet wheel 372 is fixed to the tape feed sprocket 331 and is adapted to be engaged by the upper end of the pawl 367, when the latter is moved upward. It will be apparent that when the punch shaft 315 to which the cam 363 is fixed rotates, thereby rotating the cam 363 counterclockwise so that the roller 365 comes into contact with the high portion of the cam 363, the arm 364 will move the pawl into the path of the teeth of the wheel 372 and then downward into engagement with a tooth of the tape feed ratchet 372 and thereby index such ratchet and tape feed sprocket clockwise when the cam 363 again allows the arm 364 to rock in a clockwise direction about its pivot 366.

A detent lever 373, pivoted on a pivot stud 374, carries a detent roller 375 which is adapted to engage the teeth of a detent gear 376 which is fast on the shaft of the tape feed sprocket. A spring 377 keeps the detent roller 375 in contact with teeth of the detent gear 376 and thereby stabilizes the operation of the tape feed mechanism.

Immediately after a punching operation the latch levers are restored to their inactive or latched positions shown where they are held by the latching notches 350 of the armatures 351 of their related magnets of the group PM1 to PM6, inclusive. This is effected by a restoring bail 378 (Figs. 35 and 39) extending across the lower side of the right hand arms 362 of all latch levers 342. The bail 378 is formed integral with an arm 379 and the latter is fulcrumed at one end on the fixed rod 343 and is adapted to be engaged at its other and outer end by an eccentrically mounted roller 380 extending between and fixed at its ends to the tape feed cam 363 and the locking bail cam 334. During the mid part of the punch cycle, the locking bail 360 having been restored to ineffective position, the eccentric stud 380 engages the outer end of the lever arm 379. As a result, the arm 379 and bail 378 are moved counterclockwise about the rod 343. Thus, the bail 378 engages any previously tripped latch levers 362 and moves them counterclockwise and slightly past the latching position shown in Figs. 35 and 37. In moving the previously tripped latch levers past their latching position, the bail 378 will also engage and move the remaining or untripped latch levers counterclockwise. As the latch levers are thus moved counterclockwise, one of the levers engages a bail element 381 forming a part of a knock-off bail lever 382 which is pivoted on a rod 383. The knock-off lever 382 also includes a second bail element 384 which is arranged above and extends across the outer ends of all armatures 351 of the punch magnets PM1 to PM6, inclusive. Thus, the lever 381 is rocked clockwise and the bail element 384 thereof will engage and release any of the armatures 351 that may be stuck with the result that all armatures will be positioned against the ends 349 of their related latch levers and held there by their related springs 352. The restoring bail 378 is then permitted by the further rotation of the eccentric roller 380 to return to the position shown, and in so doing the springs 346 move their respective latch levers 342 clockwise until their upper pointed ends 349 again engage the right hand wall of the notches 350 in their related armatures and are thereby held in latched position.

Provision has been made for disabling the tape punch in case of abnormal condition of tape being punched therein, as for example, tape failure or excessive tape tension. Furthermore, the disabling mechanism includes a connection to a tape hold-down plate which cooperates with the tape feed sprocket so that the punch will be disabled should for any reason the hold-down plate be moved away from the tape feed sprocket.

Specifically, a tape hold-down plate 385 is mounted to cooperate with the tape feeding sprocket 331. The hold-down plate 385 has an arcuate portion which is adapted to overlie a segment of the tape feeding sprocket which serves to guide the tape about the sprocket. The plate 385 is carried by a lever 386 which is pivoted on a stud 387 extending from a wall of the punch frame. The lever 386 has a pin 388 extending from a face thereof, and this pin anchors one end of a spring 389. The spring 389 is looped and has its opposite end anchored at a fixed pin 390 which extends from one of the walls of the punch. The pivot points of the spring 389 are so arranged as to cause the spring to exert an over-center action against the lever 386. Consequently, when the lever 386 is moved in a clockwise direction about its pivot 387, the spring 389 will cause the lever to have a positive action as it approaches its limit of movement in a clockwise direction, and it then exerts a force on the lever to hold it open. In the counterclockwise movement of the lever 386, a similar action results from the spring 389 whereby the arcuate portion of the hold-down plate 385 is held against the feed sprocket 331. The lower end of the lever 386 has pivoted thereto a rearwardly extending arm 391 which by means of a slot 392 at its opposite end is connected with a stud 393, the stud being located in a downwardly projecting portion of a curved lever 394. The lever 394 is mounted for rocking movement about a pivot pin 395, and its free end 396 includes a laterally bent arm which is adapted to lie in contact with the upper surface of a tape passing through the punch. The lever 394 is connected by means of a pin 397 with the slot of a rearwardly extending lever 398. The connecting slot in the lever 398 affords a limited amount of lost motion between the lever and the pin 397. The rear end of the lever 398 is connected by means of a pin 399 to a bail lever 400. The bail lever 400 is mounted for rocking movement about a pivot pin 401 extending from the lower rear corner of the punch frame. The bail lever 400 has a transversely extending cross member 402 which terminates in a downwardly extending arm 403 which is apertured to embrace the pin 401. A forwardly extending arm 404 of the bail lever is connected to a flexible contact carrying leaf 405 whereby rocking movement of the arm 404 will make and break a contact PTC.

The tape guide roller 330 is carried by an upstanding lever 407 which is also pivoted on the pin 401 at the rear lower corner of the punch frame. The lever 401 has a laterally extending bail 408 which extends over the rear edge of the bail lever 400, the arrangement being such that clockwise rocking movement of the upstanding lever 407 about the pivot pin 401 will engage the left hand end of the lever 398 connected to lever 400 and rock the lever 400 in a clockwise direction as viewed in Fig. 35. This rocking motion of the bail lever 400 is possible by virtue of the pin and slot connection at the forward end of the lever 398. The upstanding lever 407 is normally urged in a counterclockwise direction by a spring 409 which connects the lower end of the lever with a fixed frame member. The lever 394 is urged in a counterclockwise direction about its pivot pin 395 by a spring 410 which interconnects that lever with a pin carried by a fixed frame member.

It will appear from the foregoing that when the hold-down plate 385 is rocked away from the tape sprocket 331 by moving the same in a clockwise direction about its pivot 387, the lower end of the lever will force the rearwardly extending arm 391 toward the rear of the punch until the forward end of the slot 392 engages the stud 393. When the arm 391 has engaged the stud 393, the lever 394 will be rocked about its pivot 395, thereby pulling forward on the lever 398 and thereby effectively rocking the bail lever 400 about its pivot 401. The clockwise movement of the bail lever 400 and its associated arm 404 will serve to open the contact PTC. Furthermore, when the tape hold-down plate 385 is rocked away from the sprocket 331, the plate 396*a* will be lifted and thereby position it so that a tape may be readily inserted in the punch. It will appear, therefore, that a control circuit to the punch may be opened when the hold-down plate 385 is rocked away from the tape feed sprocket 331. Should the supply of tape under the free end of the lever 394 for any reason fail, the lever 394 will drop under the influence of its spring 410, rocking about its pivot pin 395 in a counterclockwise direction. This likewise will exert a pull on the rearwardly extending lever 398 and cause the opening of the contact PTC in manner similar to that described before. The tension of the tape in contact with the tape roller 330 is normally insufficient to overcome the tension of the spring 409. Should, however, the tension in the tape be increased to the point where the lever 407 is rocked in a clockwise direction about its pivot pin 401 and against the tension of the spring 409, the bail 408 of the lever 407 will operate the bail lever 400 as described and rock the latter in a clockwise direction, thereby breaking the contact PTC. The PLC contact of the tape punch is operated at each punching cycle by the latch lock bail 360, and a bail 379*a* has a forwardly extending arm which is provided to operate the contact PTC.

A molded transparent plastic dome 321*a* is secured to the die plate 321 to overlie the die openings 320. The dome 321*a* is adapted to catch the chad punched from the tape, direct it in a lateral direction and guide it into a discharge tube 321*b*.

*Tape reader*

After a tape has been punched as hereinabove described, the same may be placed into the tape reader 16 for the automatic control of the writing machine in the reproduction of the text carried in code by the tape. The details of the tape reader are shown in Figs. 40, 41, 42 and 43 of the drawings.

The tape reader includes a plurality of paired electrical contacts 412 which are disposed in opposite rows on a supporting structure 413 which is mounted on a base casting 414. Inasmuch as the present device is designed to sense any one of six holes, or any combination thereof, in the control tape, there are six contacts under the control of tape perforations, a seventh contact constituting a tape run-out contact which will be described in greater detail hereinafter, and a common contact RCC operative in each reading cycle. The contacts in the oppositely disposed rows are arranged on the supporting structure 413 in staggered relation so that they may be individually controlled by interposer mechanism which will be more fully described at a later point.

Each pair of contact devices consists of a fixed conducting strip 415 on one end of which is a contact point, and a resiliently movable conducting strip 416 which carries a contact point in registration with the one on the fixed strip 415 with which it is paired. The resilient conducting strip 416 is normally biased to close the contact points. Each contact device, however, is held open, except when a corresponding tape perforation appears, by means of an offset contact lever 417 which is mounted for limited swinging movement on a pivot shaft 418 which forms part of the supporting structure 413. Each of the contact levers 417 has a free end 419 which when moved outwardly causes the contact operating end thereof to move outwardly. The contact operating end of each lever has pivoted thereto a short, outwardly extending projection insulating link 420 which is notched to engage an outwardly extending pin 421 of the associated resilient contact strips 416. As a result of this structure, when the free ends 419 of the contact levers 417 are moved outwardly the opposite ends move outwardly, whereby the contact points on the associated circuit maker are opened.

The contact levers 417 are guided in their movement by a pair of guide combs 422, and the movement of these levers is partially under control of a pair of contact lever bails 423, one such bail being associated with each row of contact levers, which are adapted to engage the free ends 419 of the contact levers. Thus, when the contact lever bails 423 are moved toward each other, any contact lever which is at such time otherwise free will permit its associated resilient conducting strip 416 to move inwardly to close the contacts thereof. The contact lever bail assembly includes a pair of yoke-like members 424, each comprised of a pair of spaced arms 425 interconnected by the contact lever bail 423. One end of each arm is pivoted on the pivot shaft 418, and the other end of each has mounted thereon a roller 426. The contact lever bail assemblies are urged toward each other under the influence of the resilient contact springs 416, but they are kept in normally separated position by means of interposer bail studs 427 which are adapted to move between the rollers 426 at each end of the assembly. When the studs 427 are disposed between the rollers 426, the contact lever bail assembly is separated, the contact lever bails 423 are in contact with the free ends of the contact levers 419, and as a consequence the contact points of the circuit makers are opened.

The studs 427 are carried by an interposer bail assembly 428 which in turn is pivoted on a pivot shaft 429. The interposer bail assembly 428 includes a pair of spaced side arms on the free end of each of which is located the stud 427 and from which it projects into position between the rollers 426. An interposer bail 431 interconnects the side arms of the interposer bail assembly and this bail is adapted to overlie and to control a series of interposers as will more fully appear hereinafter. Furthermore, the interposer bail assembly has attached thereto an interposer bail arm 432 by means of which the forwardly projecting arms 428 may be rocked about the pivot shaft 429 on which they are mounted. The free end of the interposer bail arm 432 has a cam follower 433 mounted thereon adapted to operate in contact with an interposer bail cam 434 when the interposer bail arm 432 is released from the influence of a control arm 435, as will be more fully explained hereinafter.

The operation of the tape controlled contact assembly is under the ultimate control of a series of interposer arms 437 (Fig. 41), and attached tape reading pins, one such arm being provided for each tape controlled contact lever. The interposer arms 437 are freely pivoted on the shaft 429 on which they are mounted, and each consists of a lever having a pair of interposer shoulders 438 (Fig. 42) formed at the free end thereof. One shoulder 438 of each interposer arm will be associated with the free end of its corresponding contact lever. In the inoperative or non-reading position of the device, the interposer arms will be positioned as shown in Fig. 42 of the drawings with one of its shoulders 438 in the path of movement of its associated contact lever, but normally out of engagement therewith. It will be seen, therefore, that even though the contact lever bails 423 are released, any contact lever whose interposer arm 437 is in blocking position will be restrained from movement and consequently its associated contacts will remain open.

Coupled to each interposer arm is a reading pin 439 which is guided for reciprocating movement in a reading pin guide block 440. The path of the reading pins 439 intersects a tape feed throat 441 in the guide block 440. As a perforated tape is intermittently fed through the tape feed throat 441, the reading pins 439 are allowed to come into light contact therewith by reason of the fact that each interposer arm 437 is under the influence of a light spring 442. The tension of the spring 442 is insufficient to cause any damage to a control tape being read. However, the spring tension is sufficient to cause a reading pin 439 to enter a tape perforation in alignment therewith at the reading station. When this relationship is present the corresponding pin 439 will enter the tape perforation, causing the interposer arm 437 to swing on its pivot shaft 429 sufficiently to withdraw the blocking interposer shoulder 438 from the path of its associated contact lever. Under these conditions when the contact lever bails 423 are moved inwardly away from the free ends of the contact levers, a contact lever thus freed will move sufficiently to close its associated contact points. In the absence of a perforation in the tape, the reading pins will rest lightly on the surface thereof, thus preventing the associated interposer arms 437 from moving out of the path of their associated contact levers, thereby blocking the levers against movement and avoiding the operation of their associated contacts. Whenever the interposer bail 431 is in its depressed position, the interposer arms 437 will be held in non-reading position. It will be noted that the interposer bail 431 overlies and is adapted to contact the upper edge of the aligned interposer arms.

The interposer arms 437 and consequently the reading pins 439 are retained in non-reading position by the interposer bail 431 until the interposer bail arm 432 is released by the control arm 435. Such release follows energization of a control magnet RM in connection with which operates an armature 445 which is pivoted on a stub shaft 444 and about which the armature may rock. The control arm 435 is likewise pivoted on the stub shaft 444. The armature 445 is a bifurcated structure having a laterally extending stop finger 446 adapted to limit its rocking movement about the shaft 444 by contact with an armature yoke 447. A second extension 448 of the armature structure lies substantially parallel but in spaced relation in respect to the stop finger 446, and the free end of this latter extension mounts a cam following roller adapted to contact an armature knock-off cam 449. A spring 450 normally biases the armature 445 away from the core of the control magnet RM, but in order to render the action of the armature 445 positive in overcoming residual magnetism in the core, the armature knock-off cam 449 is arranged to positively rock the armature away from the core immediately after the energizing impulses. The cam 449 is so designed that it operates to hold the armature away from its core for a definite and predetermined time during each cycle, thus insuring that in starting operation of the reader the interposers will not be released at a point in the rotation of shaft 453 where an abnormal contact operation would result. The conjoint action of the control arm 435 and the armature 445 is achieved by the use of an interconnecting spring 451 and the relative adjustment of the two members is achieved through an adjusting screw 452 mounted in a flange of the control arm in such position as to contact the free end of the armature.

The interposer cam 434 and the armature knock-off cam 449 as well as a tape feed cam, as will appear hereinafter, are mounted for rotation with a power shaft 453 which is driven through gears 24 and 25 (Fig. 2). The power shaft 453 and consequently the cams thereon are continuously rotated but tape reading operations are not performed until the control magnet RM is energized. When an energizing current is present in the control magnet RM, the armature 445 is attracted to the magnet core with the result that the control arm 435 is rocked in a clockwise direction, thereby releasing the interposer bail arm 432. The interposer bail arm 432 is under the influence of a spring 454 (Fig. 40) which is effective to draw the cam follower 433 of the interposer bail arm into contact with the interposer bail cam 434. As the interposer bail cam 434 rotates, the interposer bail arm 432 rocks about the pivot shaft 429 and raises the interposer bail assembly 431. As a result of this action the interposers 437 are permitted to rise under the influence of their respective springs 442, and the reading pins 439 will enter any tape perforations that are presented in alignment with the respective pins. When one or more of the pins enters a perforation in the tape, the interposer 437 associated therewith rises sufficiently to free the interposer shoulder 438 from blocking engagement in the path of its associated contact lever 419 so that when the interposer studs 427 move from between the contact lever bail rollers 426, the contact lever, or levers, thus freed of the interposer shoulders will move inwardly under the influence of the resilient contact strip 416 and permit contacts of such operated contact lever, or levers, to close.

As the interposer bail cam 434 rotates and its high point rides in contact with the interposer bail cam follower 433, the interposer bail arm assembly is rocked in a counterclockwise direction about its pivot shaft 429 and the control arm 435 is moved inwardly under the influence of the spring 451 (Fig. 40) so as to be in position to intercept the latch end of the interposer bail arm 432 as it is lowered, thereby holding it out of further contact with the interposer bail cam 434 and sustaining it against the influence of the spring 454. In this position the reading mechanism will again be latched, the interposer bail 431 having lowered the interposer arms 437 into contact lever blocking position and the contact levers having been separated by contact with the contact lever bails 423 upon separation of the contact lever bail assembly structure by the interposer bail studs 427. A second tape reading operation cannot follow, therefore, until the control magnet RM is once again energized. However, when the control magnet RM is continuously energized the reader operates continuously, reading a new code for each revolution of shaft 453. The common contact RCC under control of the arm 425*a* is permitted to operate during each reading cycle. The extension 425*a* is a downward extension of a bail arm 425.

The perforations in the tape are arranged in transverse rows that are equally spaced, and it is contemplated, therefore, that as the tape is moved through the reading throat 441 in step-by-step progression, the successive rows of perforations will present themselves at the reading zone in alignment with the reading pins. For the purpose of achieving a regulated feeding of the tape through the reading zone there has been provided a tape feeding mechanism which is shown in detail in Fig. 43 of the drawings to which reference may now be had. The tape is provided along its length with sprocket holes with which the teeth of a pin wheel 455 are adapted to engage for feeding the tape through the reading throat 441. The pin wheel 455 is carried by a shaft 456 which is rotated in a bearing in the support casting by a feed ratchet wheel 457. The feed ratchet wheel 457 has peripheral teeth which are periodically engaged by a feed pawl 458 for rotating the feed ratchet wheel as may be required for the proper feeding of the tape. The feed pawl 458 is pivoted on a stud 459 carried at one end of a feed pawl operating lever 460. The operating lever is mounted on the pivot shaft 429 for limited rocking movement thereabout and it includes a feed pawl operating arm 461 on the free end of which is mounted a cam follower 462 adapted to contact a tape feed cam 463 mounted for rotation with the power shaft 453. The feed pawl operating assembly includes a transverse tape feed yoke 464 extending between the feed pawl operating arm 461 and an extension 465 to which the feed pawl 458 is pivoted. The feed pawl 458 is moved through its feeding stroke by means of a relatively strong spring 458*a* which has one end thereof attached to the pawl and the other end thereof to a pin fixed in the support casting. It will appear, therefore, that whenever the feed pawl operating assembly is free to rock about the pivot shaft 429, the end of the feed pawl 458 will be forced into operating engagement with the teeth of the feed ratchet wheel 457 under the influence of the operating spring 458*a*.

A feed pawl stop 466 is carried by the feed pawl operating assembly extension 465 in such position as to limit the clockwise movement of the feed pawl 458. The support casting carries a stop 467 which is positioned to limit the counterclockwise movement of the feed pawl 458. Between the two stops 466 and 467 the feed pawl 458 is therefore restrained to a predetermined path of movement as it functions to drive the feed ratchet wheel 457.

Restoration of the feed pawl 458 to inoperative position is under the influence of the tape feed cam 463. When the tape feed cam 463 rotates with its high point in contact with its cam follower 462, the feed pawl 458 is withdrawn to its inoperative position.

In order that the tape feed mechanism may be operative only when tape reading is desired, there has been provided a feed pawl latch 468 which is pivoted for rocking movement about a pivot shaft 469. The feed pawl latch 468 is urged to rock about its shaft 469 in a counterclockwise direction under the influence of a spring 470, but the same is normally held against such rocking movement by one of the contact lever bails 423.

Pivoted on the feed pawl latch 468 is a latch control lever 471 which has an extension 472 normally adapted to lie in contact with one of the contact lever bails 423. The spring 470 interconnects the feed pawl latch 468 and its control lever 471 so that clockwise movement of the control lever 471 imparted thereto by the contact lever bail 423 is transmitted to the feed pawl latch. The feed pawl latch has a hooked free end 473 adapted to engage over a shoulder 473*a* provided on the end of the feed pawl operating assembly 461.

It will appear, therefore, that as the feed pawl operating assembly is rocked into inoperative position under the influence of the tape feed cam 463, and as the contact lever bail 423 moves outwardly, the hooked end 473 of the feed pawl latch 468 will engage over the shoulder of the member 465 and hold the feed pawl operating assembly in inoperative position. Upon the next succeeding tape reading operation the contact lever bails 423 will move inwardly, thereby releasing the control lever 471 and permitting separation of the feed pawl latch 468 and the shoulder under the influence of a feed pawl latch spring 474. This will free the feed pawl operating assembly for a tape feeding operation. The timing of the respective parts is such that the reading of the perforation in the tape by the reading pins 439 takes place during the first part of the cycle and the feeding of the tape takes place during the latter part of the cycle.

A feed ratchet wheel detent 475 is pivoted on the support casting by means of a pivot screw 476, and it is rocked in a clockwise direction under the influence of a spring 477 so that a roller 478 on the free end of the detent arm is in contact with the teeth of the feed ratchet wheel 457, thereby providing a stabilizing influence for the rotary operation of the feed ratchet wheel and consequently its associated tape feeding pin wheel.

In order that the tape may be held in cooperative relation with the pin wheel 455, there has been provided a tape hold-down arm 479 which has an arcuate surface 480 disposed in proximity to the pin wheel 455 and which serves the purpose of holding the tape in contact with the feed pins of the pin wheel.

In order that threading of the tape may be facilitated, the tape hold-down arm 479 is pivoted for rocking movement on the pivot shaft 429. By virtue of the pivotal mounting of the tape hold-down arm, it may be rocked away from the pin wheel 455, thereby exposing the pin wheel to facilitate threading of the tape thereabout.

It is, of course, desirable that a tape run-out contact be opened and retained in open position while the tape hold-down arm 479 has been rocked away from the pin wheel 455 and to the end that a contact RTC may be opened and held against inadvertent closure during tape threading operations, there has been provided a camming surface 482 on an inwardly projecting portion of the tape hold-down arm. The camming surface 482 is so disposed in relation to a tape run-out contact lever stud 483 that upon rocking of the tape hold-down arm into its open position, it will contact the stud 483 and move the lower end of a tape run-out contact lever 484 in a counterclockwise direction, thus opening the contacts RTC.

In order that the tape hold-down arm be somewhat positively held in both its open and in its closed position, there is provided a spring loop 485 which has one end thereof attached to a stud 486 extending from the face of an extension finger 487 forming part of the tape hold-down arm assembly. The other end of the spring loop is attached to a stud 488 fixed in and extending from the base casting. When the tape hold-down arm is in its closed position, as shown in Fig. 43, the spring bow 485 exerts a clockwise force against the extension 487 and thereby moves the arcuate portion 480 of the tape hold-down arm against the pin wheel 455. When the tape hold-down arm is swung into the open position, the spring bow 485 tends to force the extension finger 487 in a counterclockwise direction, thus tending to hold the tape hold-down arm in its open position.

It will appear from the foregoing, therefore, that the tape controlled contacts 412 are permitted to close when a tape reading pin 439 associated with a contact lever 417 enters a perforation in the tape. Several sets of contacts are in certain instances under the control of each contact lever, and the aggregate force of the resilient contact strips 416 is considerable. It will follow from the foregoing description and explanation that the interposer structure sustains this force and avoids transmission thereof to the reading pins; even though the reading pins are the ultimate control instrument for the pin controlled contacts, there is only the force of the interposer spring 442 imposed on the reading pin 439 with the result that the reading pins offer no obstruction to the even passage of the tape through the reading zone. The tape may consequently be used repeatedly without fear of damage or undue wear by contact with the reading pins.

*Translator*

As explained hereinabove, the keys composing the keyboard of the writing machine are selectively actuated by means of a translator which is located under the keyboard and which is under the control of code designations recorded in the columns of a tape in the tape reading unit 16.

The translator is of the type known in this art as a mechanical translator; i. e., the type bars of the writing machine are operated from the power roll 21 under control of their key levers, and the selection of the key lever to be operated is made by the relative positioning of longitudinally slidable permutation members of the translator. The relative positioning of the permutation members is controlled electrically by the sensed code designation in the tape. The translator is disclosed in detail in Figs. 3, 44, 45, 46, 47, 48 and 49, inclusive.

The translator comprises generally six code or permutation bars corresponding, respectively, to the six positions of a predetermined code system. These bars are indicated respectively, by the reference characters PB1 to PB6, inclusive. The translator also comprises six selector magnets TM1 to TM6 controlling, respectively, the relative positioning of the six permutation bars PB1 to PB6, and a plurality of seeker members 489 corresponding, respectively, to the keys composing the main keyboard of the machine. The seekers 489 function to actuate their respective key levers, each seeker member 489 comprising an upper hooked end 490 engaging a stud 491 on the side of its corresponding key lever and being adapted to be pulled down to operate such key lever. The translator also includes an operating or power shaft 492 having control cams 493, 494 and 495, mounted thereon, and the translator also comprises mechanism operated by the cams for effecting a cycle of operation during which the selected key lever is actuated and the parts then restored to a normal or inactive position.

As shown, the six permutation bars PB1 to PB6, inclusive, are arranged horizontally and extend transversely beneath the keyboard and in spaced parallel relation with respect to one another. The permutation bars are supported at their two ends for limited longitudinal sliding movement by vertically disposed end comb plates 496 (Fig. 45) suitably fixed to side flange members 497 of a main frame plate and being guided intermediate their ends by vertical comb plates 498 and 499 also suitably fixed to the frame. Suitable tension springs 500 serve to hold integral projections 501 of the bars against the front wall of the guide slots of the intermediate comb plates 498 and 499. Each permutation bar is normally urged to move to the left as viewed in Fig. 45 by a corresponding compression spring 502 surrounding an operating pin 503 which is slidably mounted in spaced flanges 504 of a bracket at the right hand side of the unit, each such pin 503 engaging the right hand end of its corresponding permutation bar. Each permutation bar of the group PB1 to PB6, inclusive, is normally held in an inactive or latched position against the force of its related compression spring 502 by means of a corresponding armature 505 of a corresponding selector magnet of the group TM1 to TM6, inclusive. The permutation bars are shown in the drawings in their inactive or latched positions where they are at the end of their movement toward the right as viewed in Fig. 45. In the latter view, the bar PB1 is shown as provided with an integrally formed lug 506 having a latching point 507 engaging the left hand end of a groove 508 formed in the outer end of the pivoted armature 509 of its related selector magnet TM1. It will be appreciated that each of the other permutation bars is provided with a similar latching lug 506 which engages a similar groove 508 in the armature 509 of its related translator selector magnet. From the foregoing it will be apparent that when any one of the selector magnets of the group TM1 to TM6 is energized, its related armature is attracted, thereby releasing its related permutation bar of the group PB1 to PB6, inclusive, and each such released bar is then moved longitudinally toward the left as viewed in Fig. 45 by its related compression spring 502 and until a lug 510 formed thereon engages a normally stationary restoring bail 511. All released permutation bars are returned at the end of each operating cycle of the translator to their latched positions by means of the restoring bail 511, the latter being mounted on a lever 512 and being operated by a follower lever 512*a* engaging the cam 493 on the power shaft 492 (Figs. 44 and 49). The manner in which the permutation bars are returned and relatched will be presently described in detail.

There is one seeker for each of the key levers of the keyboard. As shown in Figs. 3 and 48, the seeker members 489 extend downwardly from their related key levers and the straight lower ends 513 thereof are arranged transversely of the six permutation bars PB1 to PB6, inclusive, and the seekers are disposed at the sides of the bars which are opposite to that occupied by the translator selector magnets TM1 to TM6, inclusive. The seeker members 489 are maintained against movement in a direction extending lengthwise of the permutation bars by spaced upper and lower comb plates 514 and 515, respectively, which are formed as integral flanges of a rigid frame plate 516 extending transversely beneath the keyboard. The upper comb plate 514 is bent over as indicated at 517 to provide a means for holding a rod 518 which extends transversely of and beneath the key levers and serves both as a fulcrum and as a retaining means for the upper ends of the seeker members 489, each of the seeker members being formed with a lug 519 which is adapted to engage the underside of rod 518 and thereby limit upward movement of such seeker member 489. A tension spring 520 connects each seeker member 489 with a flange 521 of a fixed frame plate 522 and thereby constantly urges its related seeker 489 against a seeker positioning bail 523, the latter extending transversely across all of the seeker members and being connected at its two outer ends, respectively, to the lower ends of a pair of arms 524 which are in turn pivotally supported at their upper ends to the ends of the fixed support rod 518. There are two cams 495 (Fig. 44) identical with one another, and they are carried, respectively, on opposite ends of the power shaft 492 and at points adjacent the two arms 524. Each of the arms 524 carries a follower roller 526 which is held in continuous engagement with a related one of the cams 495 by the tension springs 520 holding the seeker members 489 against the positioning bail 523. The two cams 495 function as positioning means for the bail 523 and the seeker members 489. In the normal or inactive position of the translator, the cams 495 hold the positioning bail 523 in the position shown in Fig. 3, thereby holding the lower straight ends 513 of the seekers 489 out of seeking relation with respect to the permutation bars PB1 to PB6, inclusive.

As indicated by the showing of permutation bar PB1 in Fig. 45, the longitudinal edge thereof facing the seeker members 489 is formed as a series of tabs 527 which before assembling may be removed by a suitable tool; and, when so removed, provide permutation slots 528. The remaining permutation bars are similarly formed. Each seeker member is disposed opposite either a tab 527 or a slot 528 in each permutation bar, when such bar is both in its latched and in its released position. In a manner which is well known in this art, the tabs 527 of the six permutation bars are permutatively removed according to a predetermined plan so that for each positional relationship of the six permutation bars, the lower straight edge 513 of only one of the seeker members 489 at any given time will be oposite a slot 528 in each of the six bars and such one seeker member is, therefore, the only one that can be operated, for actuating its related key in response to the code designation which effects such positional relationship of the bars. The code designations used in the illustrated embodiment for effecting the different relative positions of the permutation bars for operating the typewriter keys appear at the top in Fig. 50 and in Fig. 52. As an example, it is noted that the M key has noted in connection therewith the translator code 3-4-5. This means that when the permutation bars PB3, PB4 and PB5 are released by the energizing of their related selector magnets TM3, TM4 and TM5, respectively, and with all other permutation bars remaining in their latched position, the lower edge 489 of the seeker member attached to the M key lever will be opposite a slot in each of the six permutation bars, and no other seeker member will be opposite a continuous vertical row of such slots.

At a selected point in each cycle of operation of the translator, the cams 495 and springs 520 will provide for movement of the positioning bail 523 to the left as viewed in Fig. 48 so that the seeker members 489 may pivot about the rod 518 and the lower ends 513 thereof may move into seeking relationship with respect to the six permutation bars. The seeker member 489 which is opposite a continuous vertical row of slots 528 in the permutation bars will then move into such vertical row of slots and all other seekers will be stopped by a tab 527 in one or more of the permutation bars. The selected seeker 489 which moves into the continuous row of slots, moves far enough for a ledge portion 529 thereon to be beneath and in the path of an operating bail 530.

The operating bail 530 extends across all of the seeker members 489 and is fixed at its two outer ends, respectively, to a pair of operating bail levers 531. The two bail levers 531 are pivoted, respectively, on fixed studs 532 projecting inwardly from the translator frame. Each bail lever 531 is composed of two parts (Fig. 48), one part 533 carrying the operating bail 530 and the other part 534 being adjustably secured by a suitable means indicated at 535 to the part 533 and carrying a follower roller 536 engaging an operating cam 495. As shown in Fig. 44, there are two such cams 495 engaged, respectively, by the two rollers 536 of the two bail levers 534 and each bail lever 534 is kept in engagement with its related operating cam by a tension spring 537 connecting an extension of each lever 534 and a pin 538 of the fixed transverse frame plate 521.

From the foregoing, it will be apparent that during each revolution of the power shaft 492, which comprises an operating cycle of the translator, and after the cams 495 have positioned a selected seeker 489 beneath the operating bail 530, the cams 494 and springs 537 will provide for moving the bail levers 533 clockwise as viewed in Fig. 48 and during such movement the operating bail 530 will engage and pull down the selected seeker member 489 and thereby pull down the key lever to which such selected seeker is attached. From the foregoing description of the power mechanism it will be apparent that such downward movement of the related key lever will result in actuating the related key by tripping its related cam unit 31 (Fig. 3).

In the illustrated embodiment, the cams 495, through the springs 520 and positioning bail 523, move the seekers 489 into seeking relationship with the six permutation bars at the outset of the operating cycle of the translator shaft 492 and move such seekers out of seeking relationship near the end of each such cycle. The operating bail cams 495 start moving the selected seeker member 489 downward soon after movement of the positioning bail 523. The operating bail 530 is restored to its inactive position near the end of each cycle. The positioning bail 523 disconnects the selected seeker 489 from the operating bail 530 when the seekers are engaged by the bail 523 just before the restoration of the operating bails 530.

Each operating cycle of the translator is initiated by engaging the translator clutch 539 which is the same as the clutch shown in Figs. 33 and 34. When the clutch 539 is engaged, it connects the gear 26 to the translator shaft 492. The translator shaft 492 is rotated for one revolution and is then disconnected from the power source by disengagement of the clutch 539. As stated, each revolution of the shaft 492 provides for one operating cycle of the translator. The clutch 539 is engaged by the energizing of the translator clutch magnet TCM. It is to be noted that four of the selector magnets shown in Fig. 45 are arranged in pairs with the outer ends of the armatures 509 of each pair disposed in alignment with each other. It will be appreciated that a third magnet is arranged with each pair to present its armature in overlapping staggered relation to the armatures of the paired magnets. A restoring and knock-off bail 540 is associated with each set of three armatures. The knock-off bails 540 are suitably pivoted on fixed studs 541 and each bail comprises a first bail element 542 extending across the magnet side of each of its associated armatures 509, and also comprises a second bail element 543 disposed above and across its associated armatures and coacting with the rear or right hand edge of the lugs 506 carried by the permutation bars corresponding to the three armatures and selector magnets with which such knock-off bail is associated. Each knock-off bail is urged toward the position shown in Fig. 45 by a tension spring 544. Each armature 509 is pivoted on an upstanding fixed member 545 and is urged away from its related coil by a tension spring 546.

The knock-off bail 540 coacts with the restoring bail 511 to relatch the permutation bars PB1 to PB6, inclusive, at the end of an operating cycle of the translator. As shown in Fig. 45, the lug 510 on any permutation bar will engage the bail 511 when released by the energizing of its related selector magnet. Near the end of each revolution of the shaft 492, the restoring bail cam 493 will start moving the follower 493*a* counterclockwise as viewed in Fig. 49. The follower 493*a* will then move the bail lever 512 clockwise as viewed in Fig. 45, and the bail 511 will start restoring movement, to the right, of any of the permutation bars which were previously released. The restoring bail 511 will engage the restoring lugs 510 on the permutation bars which were not previously released, and then the bail 511 will move all six of the permutation bars to the right as viewed in Fig. 45. The rear edges of the lugs 506 on the permutation bars engage the bail elements 543 of their corresponding knock-off bails 540. The restoring bail 511 will continue to move the permutation bars to the right as viewed in Fig. 45, until the knock-off bails 540 are moved clockwise and their bail elements 542 engage and move outward any of their related armatures which are stuck, thereby assuring the engagement of the latching points 507 of the lugs 506 on the permutation bars within the slots 508 of the related armatures 509. The springs 546 will then hold all armatures 509 against the lugs 501. The restoring bail 511 will start a counterclockwise movement back to the inactive position shown, with the result that the permutation bars PB1 to PB6, inclusive, and the knock-off bails 540 will follow the restoring bail in its return movement until the latching point 507 of the lug 506 of each permutation bar engages the latching left hand end of the slot 508 of its related armature 509.

*Tape punching and reading circuits*

In order to operate the tape punch, the Punch On switch must be pressed, and with the switch in this position, the writing machine key levers cannot be operated unless there is a supply of tape properly inserted in the punch. This is because the key lever lock magnet KLM must be energized to allow key lever operation, and with the punch switch on, the energizing circuit for magnet KLM includes the punch tape contact PTC. This contact PTC is in the tape punch unit and is closed only when there is tape in the punch and there is not excessive tension on the tape between the punch and the tape supply spool. A contact closed when the punch switch is off allows the key lever lock magnet to be energized regardless of whether the contact PTC is open or closed.

All circuits controlling the punching of the tape include the tape contact PTC, the contact points closed by punch switch in its on position and the normally closed points of the punch lock contact PLC. The contact PLC is operated momentarily during the first part of the cycle of operation of the tape punch, and the normally closed points of contact PLC are tungsten circuit breakers provided to eliminate arcing from other contact points in the circuit.

In feeding tape through the punch by punching only the small feed holes, the tape feed switch lever is pressed to close the normally open points of this switch and energize the punch clutch magnet PCM. This will cause continuous cycles of operation of the punch as long as the tape feed switch is held depressed even though the energization of magnet PCM is momentarily interrupted each cycle by the operation of contact PLC.

In the automatic operation of the tape punch by the writing machine through the code selector, the selector common contact SCC is operated by every selector slide, and the closing of these contact points establishes a circuit to the common side of all the selector code contacts SC1, SC2, SC3, SC4, SC5 and SC6. This circuit includes the previously mentioned normally closed points of contact PLC and also the normally closed points of a transfer contact on an anti-repeat relay ARR. This circuit further extends from these normally closed points of the relay transfer contact through another normally closed contact on relay ARR to the punch clutch magnet PCM. Thus, the punch clutch magnet is energized and the closing of certain ones of the selector code contacts according to the particular slide which is operated causes energization of the corresponding punch code magnets PM1, PM2, PM3, PM4, PM5 and PM6 to which the selector code contacts are respectively connected.

As the punch operates, the transfer contact PLC is operated to close its normally open points and complete a circuit for energizing relay ARR and the operation of contact PLC also breaks the energizing circuit for the punch clutch magnet and the punch code magnets. The contact PLC returns to its normal position at about mid-point in the punch cycle, and in this return movement, the movable contact engages the normally closed points before breaking the normally open points. Thus, if the selector common contact SCC is still closed, the anti-repeat relay ARR is held energized through the normally open points of its own transfer contact, and will remain energized as long as contact SCC remains closed to prevent energization of the punch magnets even though contact PLC has returned to normal. This prevents a repeat operation of the punch regardless of how long the selector contacts are held closed.

A code relay CR is used for deleting a code in the tape and also for punching a stop code. This relay is provided with seven normally open contacts, and is energized by pressing either the code delete switch or the stop code switch. When the code delete switch is pressed, a circuit is established through the normally closed points of the tape feed switch contacts, and through a normally open contact of relay CR to the two movable contacts of relay ARR the same as when the selector common contact SCC is closed. This energizes the punch clutch magnet PCM through the normally closed contact of relay ARR, and also energizes the punch code magnets P4, P5 and P6 through three normally open contacts on relay CR which are all connected to the normally closed points of the transfer contact of relay ARR the same as selector contacts SC4, SC5 and SC6. At the same time, punch code magnets P1, P2 and P3 are energized through respective normally open contacts of relay CR which are all connected through another normally closed contact on relay ARR and through normally closed points of the transfer contact operated by the stop code switch.

Thus the pressing of the code delete switch causes a punch operation in which all the six code holes are punched the same as if a selector slide were operated to close all the six selector code contacts. However, only one punch cycle will occur regardless of how long the code delete lever is held depressed. This is because the anti-repeat relay ARR will be energized during this punch cycle and will be held energized through the normally open contact of relay CR as long as the switch is held depressed in the same manner as relay ARR is held energized through the selector common contact SCC.

However, if it is desired to rapidly delete a series of codes without pressing and releasing the delete switch once for each code, both the delete switch and the tape feed switch may be pressed simultaneously. These two switches are located adjacent each other in the front panel and both may be easily pressed by placing the finger in a position to overlap both switch levers. This simultaneous operation of the two switches causes the punch to punch all six holes in the tape, but as the normally closed points of the tape feed switch are now open, the holding circuit for relay ARR is open and the relay is deenergized at the end of each punch cycle. This permits the punch to operate continuously and punch code delete holes as long as both switches are depressed.

In punching a stop code into the tape, the stop code switch only is depressed. This energizes relay CR by closing the normally open points of the stop code switch to cause a single cycle of operation of the punch and to hold relay ARR energized as long as the switch is held depressed. The circuits for accomplishing this single punch cycle are the same as when the code delete switch is pressed. However, when the stop code switch is pressed, the normally closed points of this switch are opened to prevent energization of punch code magnets PM1, PM2, and PM3. Thus, only punch code magnets PM4, PM5 and PM6 are energized to punch the stop code into the tape.

A punch common contact PCC on the tape punch is connected in parallel with the selector common contact SCC in the energizing circuit for the punch clutch magnet PCM. This contact PCC is closed whenever any one or more of the punch lever latches is tripped by energization of the associated ones of the punch code magnets. The closing of contact PCC will cause a punch cycle to occur by energizing magnet PCM regardless of whether or not the selector contact SCC is closed. Contact PCC thus acts to insure an operation of the punch in the event the selector contact SCC is closed for a short interval which is sufficient to trip the punch lever latches but insufficient to engage the clutch.

Each rotation of the reader shaft can operate to sense the code holes in the tape and subsequently feed the tape to the next reading position, but this operation only occurs when the reader magnet RM is energized. Energization of magnet RM is controlled both manually and automatically by a reader control relay RCR and a delay control relay DCR. The reader cannot be operated unless the tape hold-down arm is in a position to hold the tape against the pin wheel and thereby allow the tape contact RTC to close.

Each of the reader code contacts RC1, RC2, RC3, RC4, RC5 and RC6 have normally open points which are connected to control the energization of the corresponding translator code magnets TM1, TM2, TM3, TM4, TM5 and TM6. A reader common contact RCC is closed whenever any of the code contacts are allowed to close and this common contact RCC controls the energization of the translator clutch magnet TCM.

When the start read switch is pressed, a circuit for energizing relay RCR is completed through the normally open points of the transfer contacts of this switch and the normally closed contact of the stop read switch. Relay RCR has a holding circuit through its normally open contact in series with this normally closed contact of the stop read switch. This holding circuit is controlled by a code translating arrangement of reader contacts whereby the holding circuit is opened when the reader reads the 4-5-6 stop code. Thus, this arrangement of reader contacts comprises normally open points on contact RC3 and normally closed points on contacts RC4, RC5 and RC6. These four contacts are all connected in multiple so that the holding circuit for relay RCR is opened only when the reader reads code holes 4, 5 and 6 without reading code hole 3. All other codes used which include 4, 5 and 6 also include 3 so that no other code except 4-5-6 will open the holding circuit for relay RCR.

When the start read switch is allowed to return to normal position, a circuit is completed for energizing magnet RM through the normally closed points of the start read switch, through the normally closed carriage return and tab contacts CRTC, through the normally closed back space contacts BSC, through the normally closed points of relay DCR, and through the normally open contacts of relay RCR which is now energized. The reader then functions to read codes punched in the tape and by energizing the translator magnets accordingly causes automatic operation of the writing machine keyboard. When a 4-5-6 stop code is read the holding circuit for relay RCR will be opened and operation of the reader will be stopped by deenergizing magnet RM. In this case, operation of the reader can be resumed only by pressing the start read switch.

The execution of the carriage return, tabulating and back space operations of the writing machine requires a longer period of time than the time between reading successive codes in the tape. Accordingly, the reader is stopped upon reading any one of these codes and is again started only after the writing machine has completed its function. The stopping of the reader is accomplished by assigning codes to these carriage return, back space and tabulating operations which have a common characteristic.

Thus when a 5-6 code is read without the 4 code, a circuit is completed to energize relay DCR through normally open points on reader contacts RC6 and RC5, through normally closed points on reader contacts RC4, and through normally open contacts on relay RCR which is energized when the reader is operating. The energization of relay DCR deenergizes magnet RM to stop the reader, and after the reader contacts return to normal, relay DCR remains energized through its own normally open contact points and through the contacts CRTC and BSC.

Contacts CRTC are opened during a carriage return or tabulating operation of the machine and likewise contacts BSC are opened during a back space operation of the machine. Both contacts close at the completion of their respective machine operations. Accordingly, relay DCR is deenergized as soon as the carriage return, tabulating or back space operation starts, but the magnet RM is not energized to resume reader operation until the machine operation is completed and contacts CRTC and BSC are closed.

It will be noted that the pick-up circuit as well as the holding circuit for relay DCR includes the contacts CRTC and BSC. This insures that relay DCR will not become locked energized in the event contacts CRTC or BSC should complete their cycle of operation before the reader contacts complete their cycle of operation.

Operation of the reader may be stopped at any time by pressing the stop read switch to deenergize relay RCR. In this case, reader operation can be resumed only by pressing the start read switch. Operation of the reader may also be stopped by pressing the start read switch to open the circuit to magnet RM, but in this case, the reader will resume operation upon release of the switch. This latter operation allows the reader to be stepped under control of the operator by alternately pressing and releasing the start read switch.

In the present reader circuits, considerable apparatus is saved and greater reliability is obtained by the selection of codes for certain non-printing machine functions which may be distinguished from other codes by a simple reader contact arrangement. In other words, the reader automatically stops itself without the use of auxiliary code translating relays whenever certain code combinations are read.

From the foregoing it will be seen that the machine is assembled of various combinations of substantially self-contained units all mounted on or within a common main chassis. In particular, these units include the power frame assembly 12, the carriage and rail assembly, the code selector 13, the code translator 14, the tape punch 15 and the tape reader 16. Because the separate units are capable of easy assembly into the machine, there is imparted to the machine a flexibility which permits the easy assembly of the various units so that their combination may be modified to serve different purposes. The machine as described herein constitutes a recorder-reproducer and as such it includes the code selector 13, the tape punch 15, the tape reader 16 and the code translator 14. If it is desired to adapt the machine to recording functions only, such machine will include the code selector 13 and the tape punch 15. On the other hand, if the machine is to be adapted to reproducing functions only, it will include the tape reader 16 and the code translator 14. In whatever combination the units are assembled, the machine will include the printing mechanism so that it may be used in the manner of a conventional power driven typewriter.

While a specific form of the instrumentalities employed in the machine has been described for purpose of illustration, it is contemplated that numerous changes may be made without departing from the spirit of the invention.

What is claimed is:

1. In a tape controlled writing machine having type bars, a machine frame, a power roll in said frame for actuating said type bars, a control tape punch mounted on one side of said frame, a control tape reader mounted on said frame adjacent said tape punch, a code translator within said frame, a single power shaft in said frame, and drive connections from said power shaft to said power roll, tape punch, tape reader and code translator, said drive connections between said power shaft, said tape punch and said code translator including selectively operable drive clutches.

2. In a tape controlled writing machine having type bars, a machine frame, a power roll in said frame for actuating said type bars, a control tape punch mounted on one side of said frame, a control tape reader mounted on said frame adjacent said tape punch, a code translator within said frame, a single power shaft in said frame, drive connections from said power shaft to said power roll, tape punch, tape reader and code translator, said connections including a one-revolution clutch between said power shaft and said tape punch, and means responsive to operation of said type bars for engaging and disengaging said clutch.

3. In a tape controlled writing machine having type bars, a machine frame, a power roll in said frame for actuating said type bars, a control tape punch mounted on one side of said frame, a control tape reader mounted on said frame adjacent said tape punch, a code translator within said frame, a single power shaft in said frame, drive connections from said power shaft to said power roll, tape punch, tape reader and code translator, said connections including a clutch between said power shaft and said tape punch, and electromagnetic means responsive to operation of said type bars for controlling said clutch.

4. In a tape controlled writing machine having type bars, a machine frame, a power roll in said frame for actuating said type bars, a control tape punch mounted on one side of said frame, a control tape reader mounted on said frame adjacent said tape punch, a code translator within said frame, a single power shaft in said frame, drive connections from said power shaft to said power roll, tape punch, tape reader and code translator, said connections including a clutch between said power shaft and said code translator, and means responsive to operation of said tape reader for controlling said clutch.

5. In a tape controlled writing machine having type bars, a machine frame, a power roll within said frame for actuating said type bars, a code selector within said frame, a control tape punch mounted on one side of said frame, a control tape reader mounted on said frame adjacent said tape punch, a code translator within said frame, a single power shaft in said frame, drive connections from said power shaft to said power roll, tape punch, tape reader and code translator, said connections including a clutch between said power shaft and said tape punch, electromagnetic means for controlling said clutch, and means controlled by said code selector for energizing said electromagnetic clutch controlling means.

6. In a tape controlled writing machine having type bars, a machine frame, a power roll within said frame for actuating said type bars, a control tape punch mounted on one side of said frame, a control tape reader mounted on said frame adjacent said tape punch, a code translator within said frame, a single power shaft in said frame, drive connections from said power shaft to said power roll, tape punch, tape reader and code translator, said connections including a clutch between said power shaft and said code translator, and electro-magnetic means for controlling said clutch.

7. In a tape controlled writing machine having type bars, a machine frame, a power roll for actuating said type bars in said frame, a control tape punch mounted on one side of said frame, a control tape reader mounted on said frame adjacent said tape punch, a code translator within said frame, a single power shaft in said frame, drive connections from said power shaft to said power roll, tape punch, tape reader and code translator, said connections including a clutch between said power shaft and said code translator, electromagnetic means for controlling said clutch, and means controlled by said tape reader for energizing said electromagnetic clutch controlling means.

8. In a tape controlled writing machine, a main frame, type bars, a power roller for actuating said type bars in said frame, code selecting mechanism, a frame for said code selecting mechanism, control tape punching mechanism, a frame for said control tape punching mechanism, control tape reading mechanism, a frame for said control tape reading mechanism, code translating mechanism, a frame for said code translating mechanism, means for mounting all of said frames in said main frame, a single power shaft in said main frame, and drive connections from said power shaft to said power roller, tape punching mechanism, tape reading mechanism, and code translating mechanism.

9. In a tape controlled typewriter having type bars, a typewriter frame, a power roll in said frame for actuating said type bars, a control tape punch mounted on one side of said frame, a code selector within said frame for controlling said tape punch, a control tape reader mounted on said frame adjacent said tape punch, a code translator within said frame, a single power shaft within said frame, drive connections from said power shaft to said power roll, tape punch, tape reader and code translator, said drive connection between said power shaft and said tape punch including a drive clutch, an electromagnetic device for operating said clutch, means under control of said code selector for energizing said electromagnetic device, means for suppressing repeated operation of said punch during a single operation of said code selector, and means responsive to operation of said tape punch for rendering said suppressing means effective.

10. In a tape controlled typewriter having type bars, a typewriter frame, a power roll in said frame for actuating said type bars, a control tape punch mounted on one side of said frame, a plurality of punch selector magnets and means for energizing the same, a control tape reader mounted on said frame adjacent said tape punch, a code translator within said frame, a code selector within said frame for controlling said tape punch, a single power shaft within said frame, drive connections from said power shaft to said power roll, tape punch, tape reader and code translator, said drive connection between said power shaft and said tape punch including a drive clutch, an electromagnetic device for operating said clutch, an electric control circuit for said electromagnetic device, a code selector operated circuit maker in said control circuit adapted to close said circuit upon operation thereof, a relay for suppressing repeated operation of said electromagnetic device during a single operation of said code selector, a circuit for said relay including a normally open circuit maker, and a punch member operatively associated with said last named circuit maker for closing the same upon energization of any of said punch selector magnets.

11. In a tape controlled typewriter having type bars, a typewriter frame, a power roll in said frame for actuating said type bars, a control tape punch mounted on one side of said frame, a control tape reader mounted on said frame adjacent said tape punch, a plurality of punch selector magnets and means for energizing the same, a code translator within said frame, a code selector within said frame for controlling said tape punch, a single power shaft within said frame, drive connections from said power shaft to said power roll, tape punch, tape reader and code translator, said drive connection between said power shaft and said tape punch including a drive clutch, an electromagnetic device for operating said clutch, a code selector controlled circuit for energizing said electromagnetic device, a normally open second energizing circuit for said electromagnetic device, and means responsive to the energization of any one of said punch selector magnets for closing said second circuit.

12. In a tape controlled typewriter having type bars, a typewriter frame, a power roll in said frame for actuating said type bars, a control tape punch mounted on one side of said frame, a control tape reader mounted on said frame adjacent said tape punch, a plurality of punch selector magnets and means for energizing the same, a code translator within said frame, a code selector within said frame for controlling said tape punch, a single power shaft within said frame, drive connections from said power shaft to said power roll, tape punch, tape reader and code translator, said drive connection between said power shaft and said tape punch including a drive clutch, an electromagnetic device for operating said clutch, a code selector controlled circuit for energizing said electromagnetic device, a normally open second circuit for said electromagnetic device, a normally open circuit maker in said second circuit, and a punch element movable upon energization of any of said punch selector magnets associated with said circuit maker for closing said circuit upon energization of any of said punch selector magnets.

13. In a tape controlled writing machine having type bars, a machine frame, a power roll in said frame for actuating said type bars, mechanism mounted on one side of said frame for forming coded control indicia in a control tape, a control tape reader mounted on said frame adjacent said control indicia forming mechanism, a code translator within said frame, a single power shaft in said frame, and drive connections from said power shaft to said power roll, coded control indicia forming mechanism, tape reader and code translator, said drive connections between said power shaft, said coded control indicia forming mechanism and said code translator including selectively operable drive clutches.

14. In a tape controlled writing machine having type bars, a machine frame, a power roll in said frame for actuating said type bars, mechanism mounted on one side of said frame for forming coded control indicia in a control tape, a control tape reader mounted on said frame adjacent said control indicia forming mechanism, a code translator within said frame, a single power shaft in said frame, and drive connections from said power shaft to said power roll, coded control indicia forming mechanism, tape reader and code translator, said drive connections including a clutch between said power shaft and said coded control indicia forming mechanism, and electromagnetic means for controlling said clutch.

References Cited in the file of this patent

UNITED STATES PATENTS

| | | |
|---|---|---|
| 1,606,126 | Houston | Nov. 9, 1926 |

| | | |
|---|---|---|
| 1,643,057 | Crumrine | Sept. 20, 1927 |
| 1,661,710 | Thompson | Mar. 6, 1928 |
| 1,800,399 | Page | Apr. 14, 1931 |
| 1,935,436 | Crumrine | Nov. 14, 1933 |
| 1,945,097 | Thompson et al. | Jan. 30, 1934 |
| 1,950,762 | Thompson | Mar. 13, 1934 |
| 1,975,791 | Hopkins | Oct. 9, 1934 |
| 2,066,978 | Koca | Jan. 5, 1937 |
| 2,066,979 | Koca | Jan. 5, 1937 |
| 2,168,441 | Doty | Aug. 8, 1939 |
| 2,258,211 | Michelsen | Oct. 7, 1941 |
| 2,298,805 | Norton | Oct. 13, 1942 |
| 2,378,371 | Tholstrup | June 12, 1945 |
| 2,487,373 | Reppert | Nov. 8, 1949 |
| 2,540,029 | Hamilton | Jan. 30, 1951 |
| 2,543,435 | Buckley | Feb. 27, 1951 |